US 9,933,292 B2

(12) United States Patent
Tashiro et al.

(10) Patent No.: US 9,933,292 B2
(45) Date of Patent: Apr. 3, 2018

(54) THERMAL FLOW METER

(71) Applicant: Hitachi Automotive Systems, Ltd., Hitachinaka-shi, Ibaraki (JP)

(72) Inventors: Shinobu Tashiro, Hitachinaka (JP); Keiji Hanzawa, Hitachinaka (JP); Noboru Tokuyasu, Hitachinaka (JP); Takeshi Morino, Hitachinaka (JP); Ryosuke Doi, Hitachinaka (JP); Akira Uenodan, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/653,360

(22) Filed: Jul. 18, 2017

(65) Prior Publication Data
US 2018/0017422 A1 Jan. 18, 2018

Related U.S. Application Data

(63) Continuation of application No. 14/407,142, filed as application No. PCT/JP2013/064826 on May 29, 2013, now Pat. No. 9,746,362.

(30) Foreign Application Priority Data

Jun. 15, 2012 (JP) .................................. 2012-135304

(51) Int. Cl.
*G01F 1/684* (2006.01)
*G01F 15/18* (2006.01)
(Continued)

(52) U.S. Cl.
CPC ........... *G01F 1/684* (2013.01); *F02D 41/187* (2013.01); *G01F 1/6842* (2013.01);
(Continued)

(58) Field of Classification Search
CPC ........ G01F 15/006; G01F 15/02; G01F 15/04; G01F 15/043; G01F 15/14; G01F 15/185;
(Continued)

(56) References Cited

U.S. PATENT DOCUMENTS

2007/0227260 A1    10/2007    Ike et al.
2009/0078041 A1    3/2009     Ike et al.
(Continued)

FOREIGN PATENT DOCUMENTS

JP    2011-122984 A    6/2011
JP    2011-252796 A    12/2011
(Continued)

OTHER PUBLICATIONS

International Search Report (PCT/ISA/210) dated Jul. 2, 2013 with English translation (three pages).

*Primary Examiner* — Francis Gray
(74) *Attorney, Agent, or Firm* — Crowell & Moring LLP

(57) ABSTRACT

The present invention provides a thermal flow meter 300 which reduces a stress applied from a fixing portion 3721, which is used to hold and fix a circuit package 400 with respect to a housing 302, to the circuit package 400 and has high reliability. In the thermal flow meter of the invention, the circuit package 400 embedded with a flow rate measurement circuit is formed through a first resin molding process, the fixing portion 3721 is formed along with the housing 302 through a second resin molding process, and the circuit package 400 is enveloped by the fixing portion 3721, whereby the circuit package 400 is held by and fixed to the housing 302. In order to reduce the influence of a stress, generated based on a temperature change of the fixing portion 3721, on the circuit package 400, the fixing portion 3721 is constituted of a thick portion 4714 and a thin portion 4710. Since thickness of a resin of the thin portion 4710 is (Continued)

small, the stress to be generated is small, and a force applied to the circuit package 400 can be reduced.

5 Claims, 25 Drawing Sheets

(51) Int. Cl.
| | |
|---|---|
| *F02D 41/18* | (2006.01) |
| *G01F 1/696* | (2006.01) |
| *G01F 1/698* | (2006.01) |
| *G01F 1/699* | (2006.01) |
| *G01F 5/00* | (2006.01) |
| *G01F 15/00* | (2006.01) |
| *G01F 15/02* | (2006.01) |
| *G01F 15/04* | (2006.01) |
| *G01F 15/14* | (2006.01) |

(52) U.S. Cl.
CPC ............ *G01F 1/6845* (2013.01); *G01F 1/696* (2013.01); *G01F 1/698* (2013.01); *G01F 1/699* (2013.01); *G01F 1/6965* (2013.01); *G01F 5/00* (2013.01); *G01F 15/006* (2013.01); *G01F 15/02* (2013.01); *G01F 15/04* (2013.01); *G01F 15/043* (2013.01); *G01F 15/14* (2013.01); *G01F 15/185* (2013.01)

(58) Field of Classification Search
CPC ...... G01F 1/684; G01F 1/6842; G01F 1/6845; G01F 1/696; G01F 1/6965; G01F 1/698; G01F 1/699; G01F 5/00; F02D 41/187
See application file for complete search history.

(56) References Cited

U.S. PATENT DOCUMENTS

| | | | |
|---|---|---|---|
| 2009/0199632 A1* | 8/2009 | Toyoda | G01F 1/684 73/204.26 |
| 2011/0140211 A1 | 6/2011 | Kono et al. | |
| 2011/0296904 A1 | 12/2011 | Tagawa et al. | |
| 2012/0060599 A1* | 3/2012 | Morino | G01F 1/6842 73/204.11 |
| 2015/0122010 A1* | 5/2015 | Tokuyasu | F02D 41/187 73/204.22 |
| 2015/0187708 A1* | 7/2015 | Tashiro | F02D 41/187 257/467 |

FOREIGN PATENT DOCUMENTS

| | | |
|---|---|---|
| JP | 2012-58075 A | 3/2012 |
| WO | WO 2016/039019 A1 | 3/2016 |

\* cited by examiner

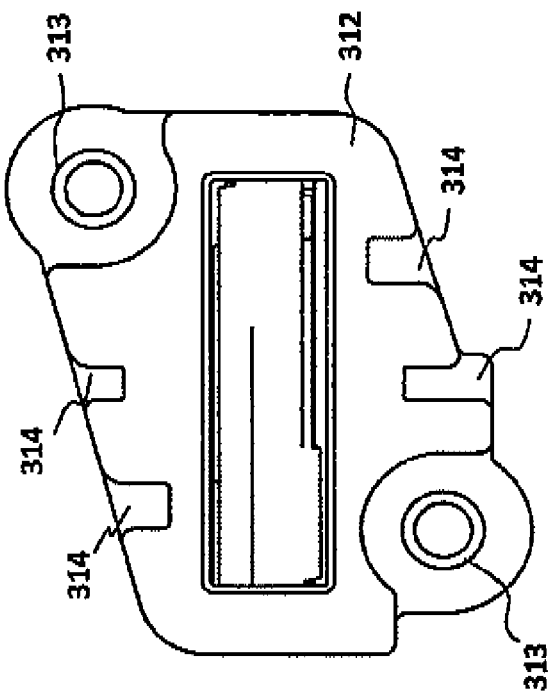
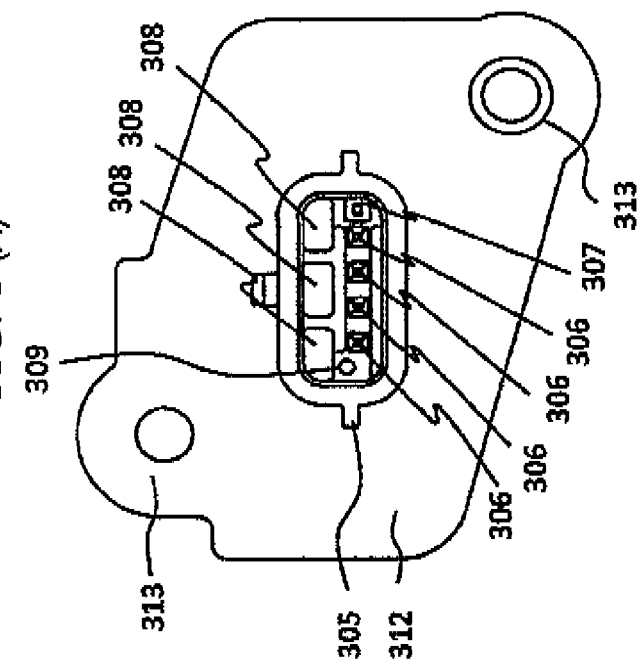
FIG. 4 (A)
FIG. 4 (B)

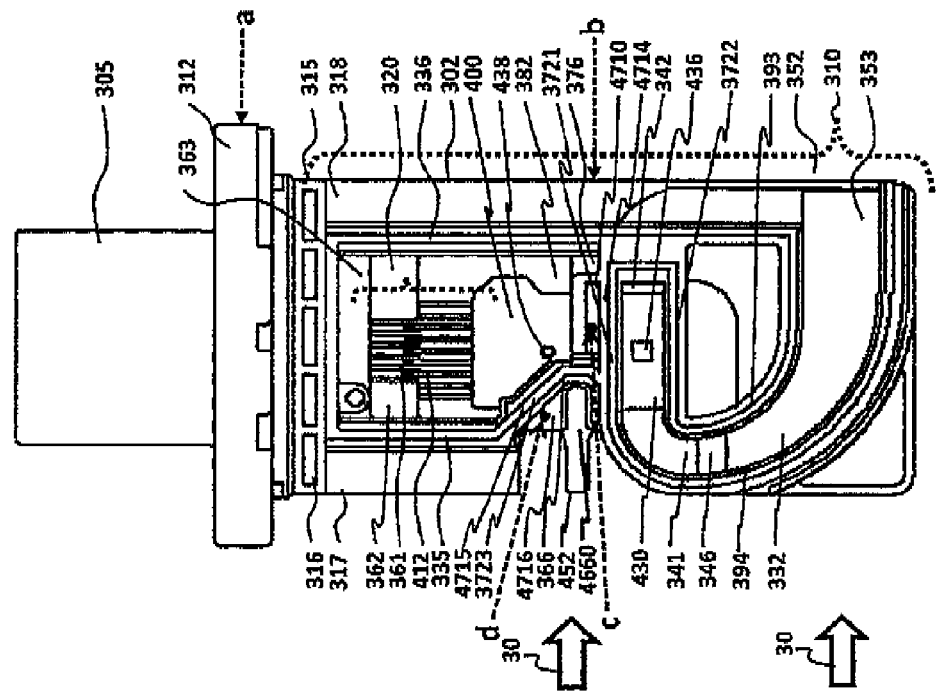
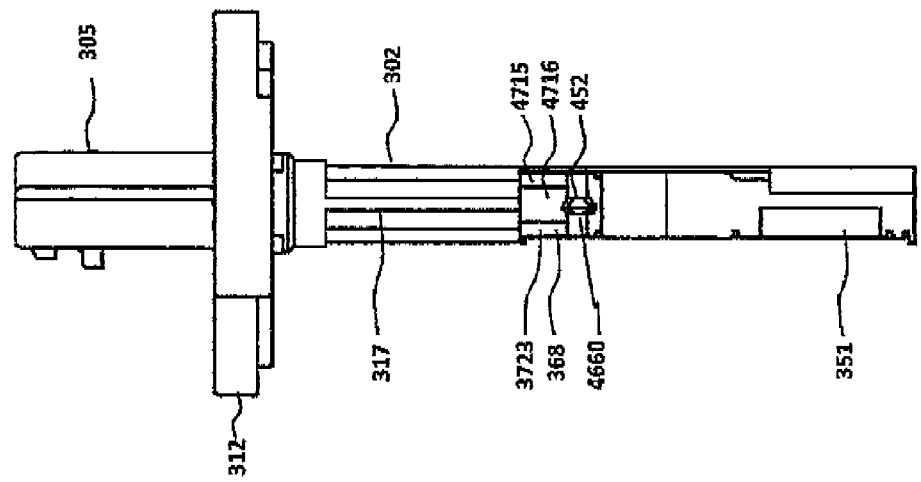
FIG. 5 (A)
FIG. 5 (B)

FIG. 7
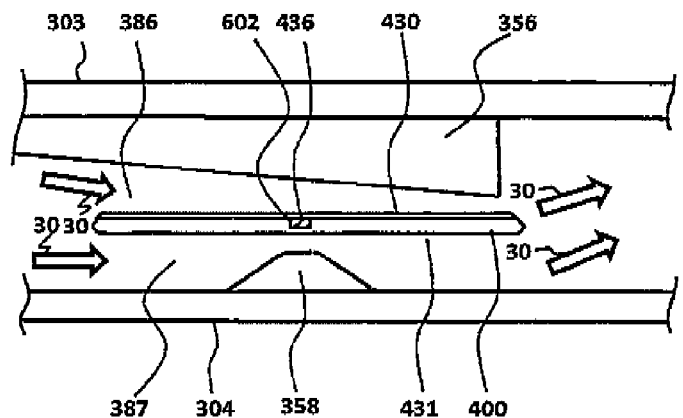
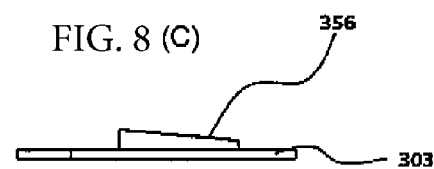
FIG. 8 (C)
FIG. 8 (A)
FIG. 8 (B)
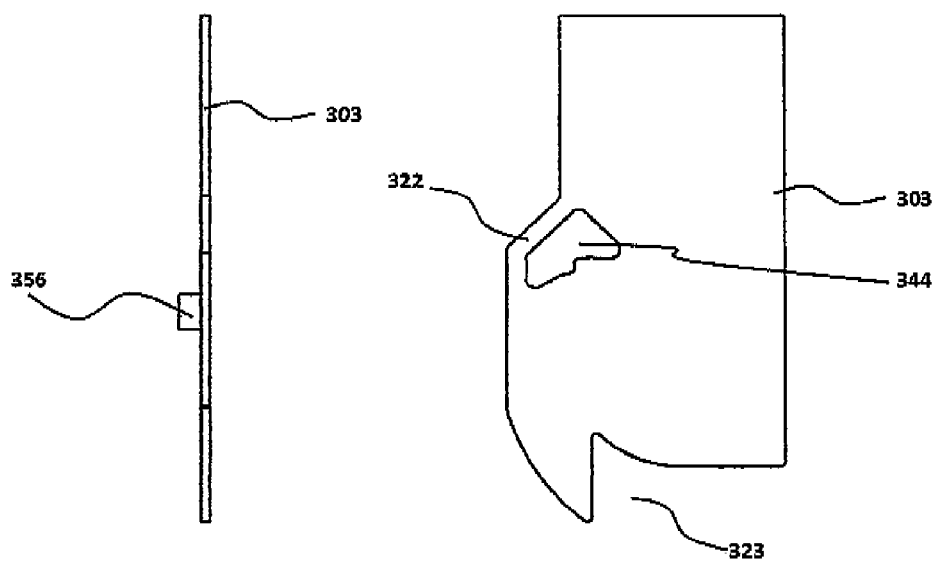

FIG. 9 (C)
FIG. 9 (A)    FIG. 9 (B)
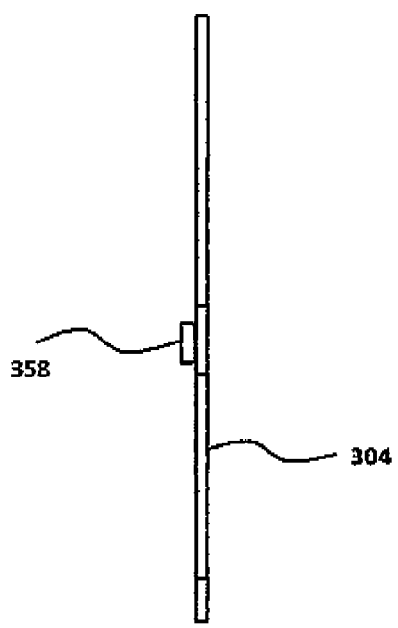
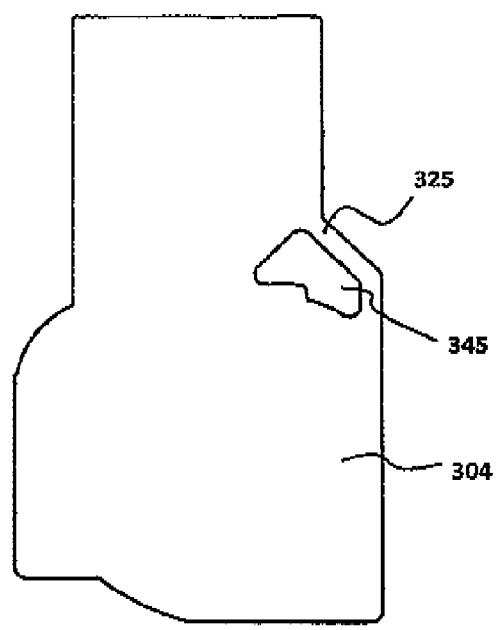

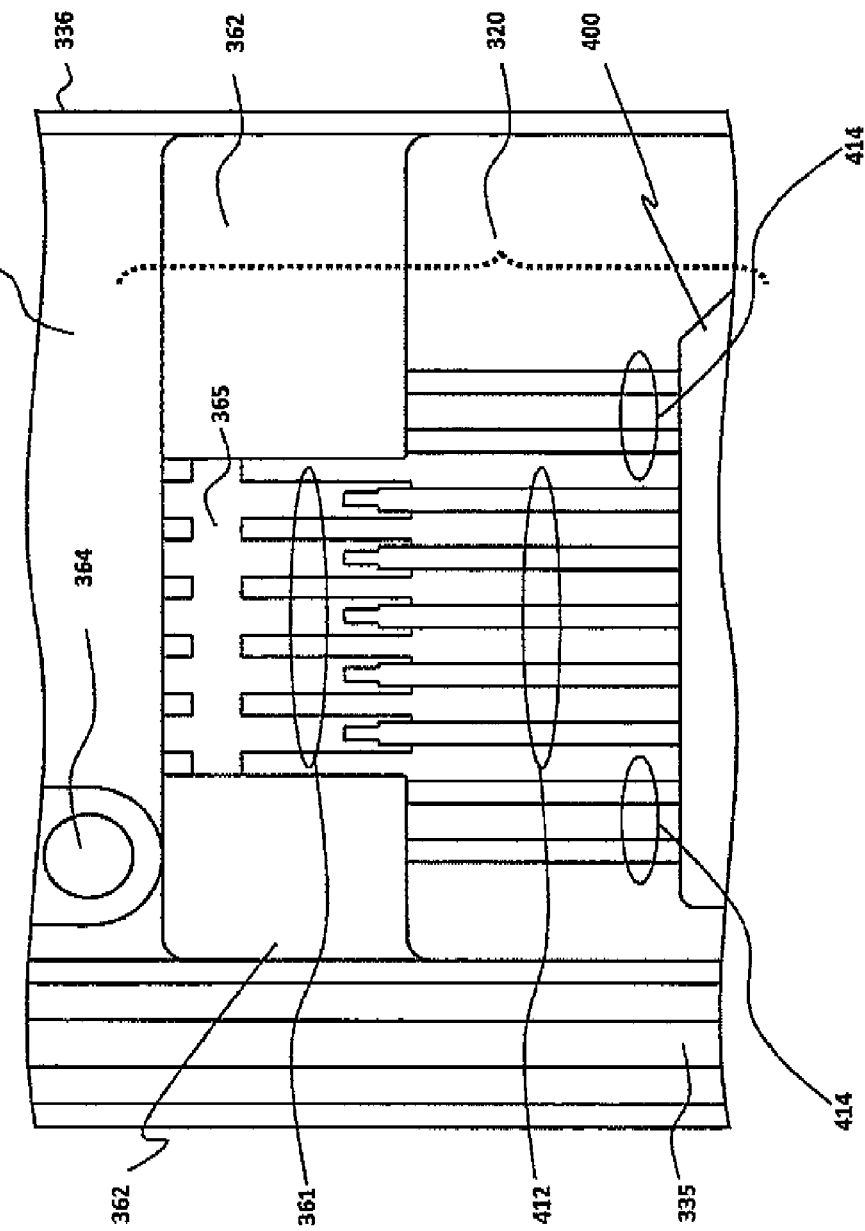

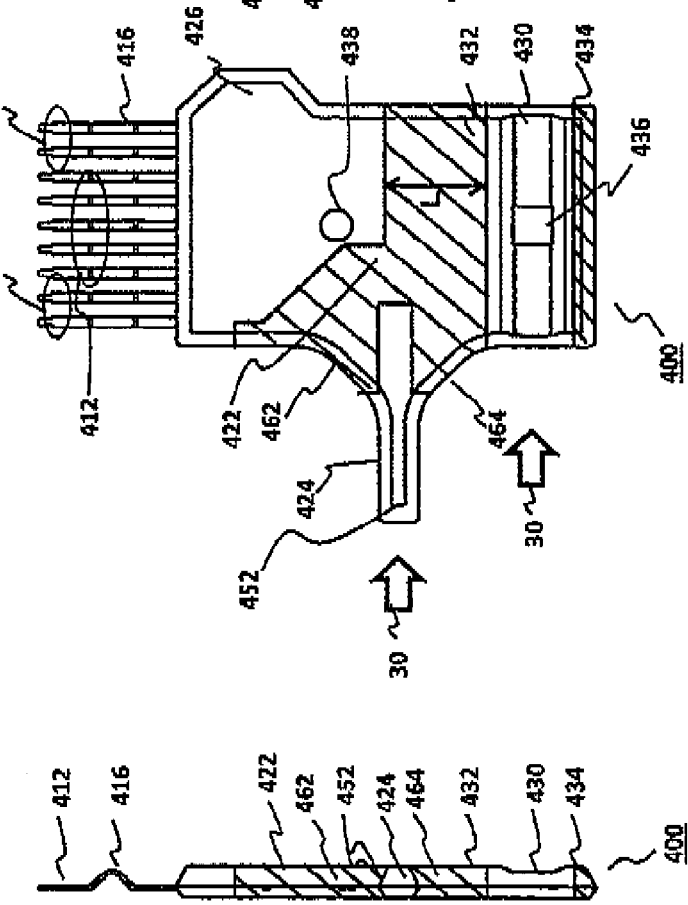
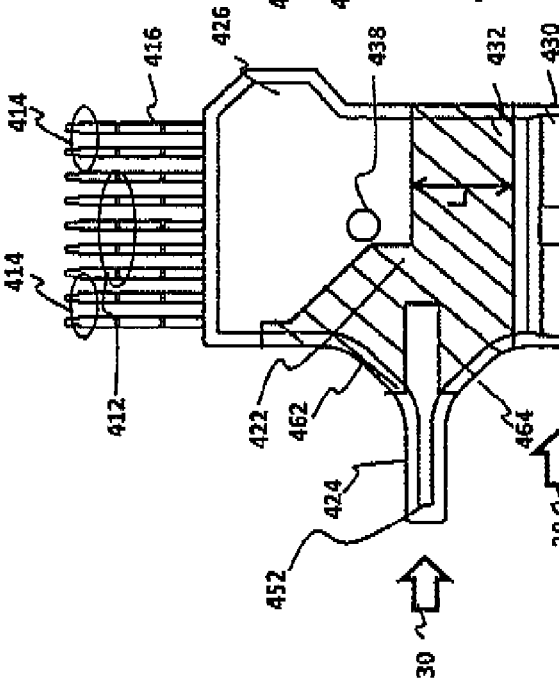
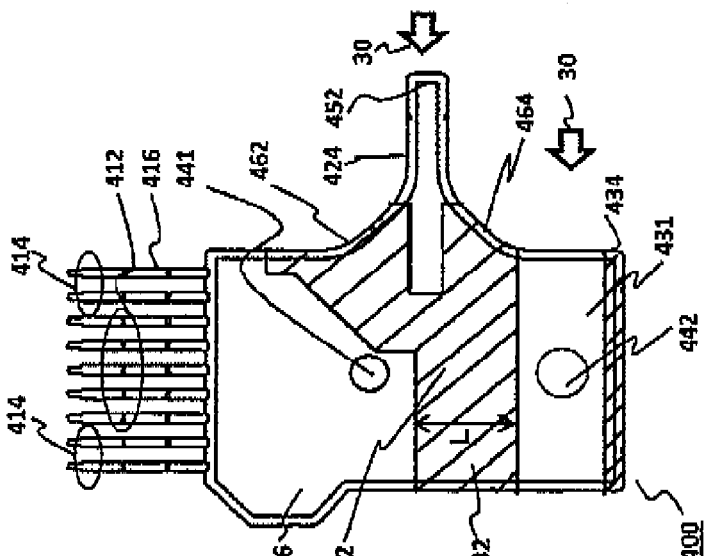
FIG. 11(A)
FIG. 11(B)
FIG. 11(C)

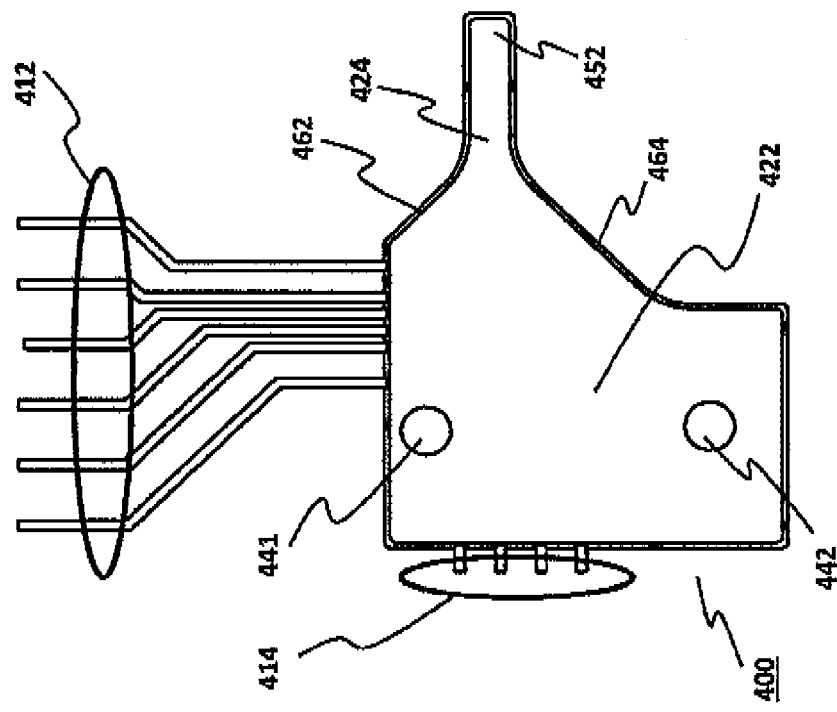
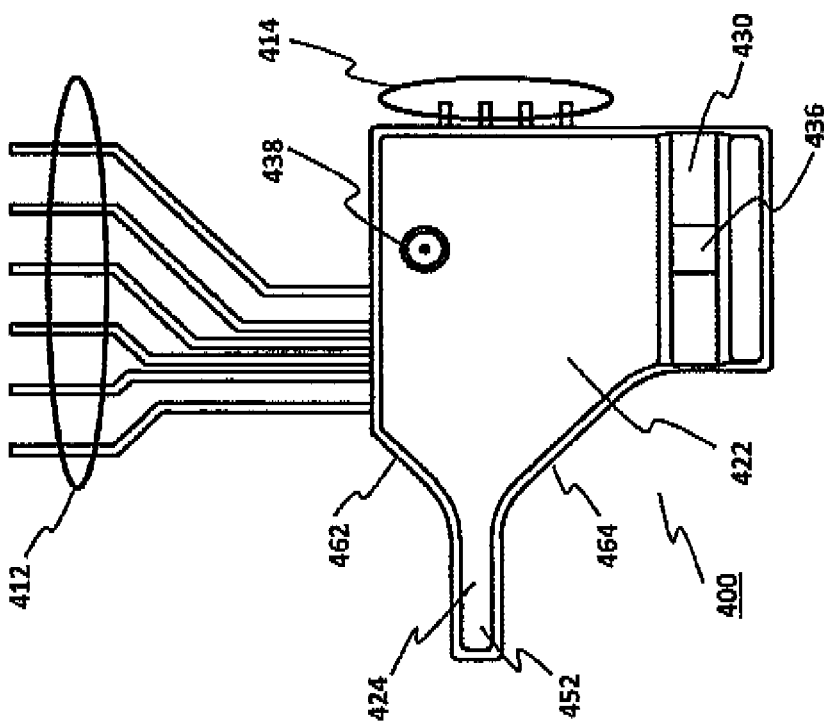

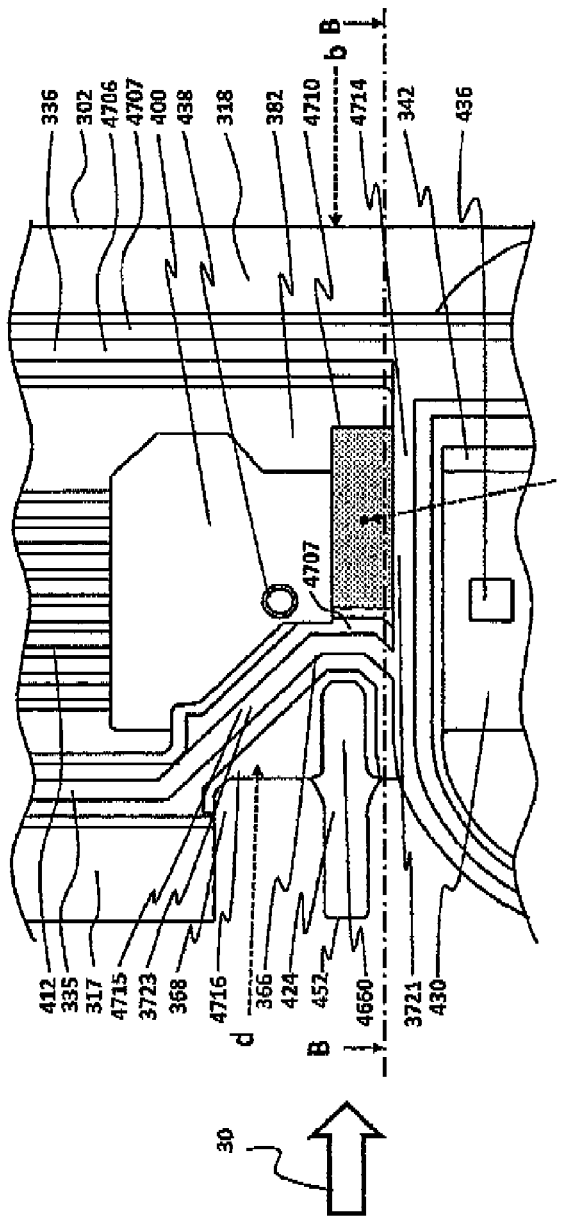
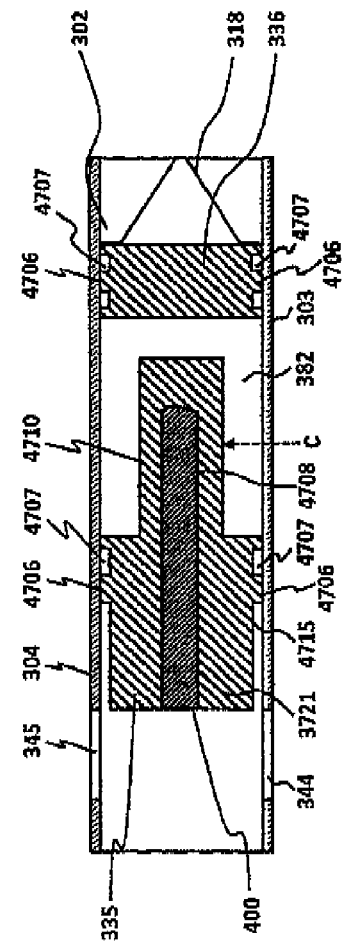
FIG. 22 (A)
FIG. 22 (B)

9,933,292 B2

THERMAL FLOW METER

CROSS REFERENCE TO RELATED APPLICATIONS

This application is a continuation of U.S. application Ser. No. 14/407,142, filed Dec. 11, 2014, which claims priority from International Application No. PCT/JP2013/064826, filed May 29, 2013, which claims priority from Japanese Patent Application No. 2012-135304, filed Jun. 15, 2012, the disclosures of which are expressly incorporated by reference herein.

TECHNICAL FIELD

The present invention relates to a thermal flow meter which measures a flow rate of a gas.

BACKGROUND ART

A thermal flow meter which detects a flow rate by performing heat transfer with a measurement target gas is widely used since the measurement accuracy is higher than that of other types of flow meters. The thermal flow meter has a bypass passage, which takes a part of the measurement target gas flowing through a main passage, flows the taken measurement target gas therein, and is formed of a resin, and a flow rate detection circuit which is used for detecting the flow rate of a gas by performing heat transfer with the measurement target gas flowing through the bypass passage and enveloped by a resin.

In the prior art, a hole is formed in the bypass passage formed of a resin, the flow rate detection circuit covered with a resin is inserted into the hole, and a gap between the hole and the resin covering the flow rate detection circuit is filled with an elastic adhesive. Such a technique is disclosed in Japanese Patent Laid-Open Publication No. 2011-252796 (Patent Literature 1).

CITATION LIST

Patent Literature

PTL 1: JP 2011-252796 A

SUMMARY OF INVENTION

Technical Problem

In the technique described in the Patent Literature 1, an elastic adhesive used for absorbing a mutual linear expansion difference is filled in a gap between the hole of the bypass passage and an air flow sensing portion and a gap of a portion where a sensor assembly is inserted into a casing. Due to the filling of the elastic adhesive, it is difficult to maintain a positional relationship between a bypass passage used for taking a gas flowing through a main passage and the flow rate detection circuit at a predetermined relationship with high accuracy. After the flow meter is assembled on a device using the flow meter and, for example, an intake pipe of a vehicle, a positional relationship between the bypass passage and the flow rate detection circuit is changed by elastic deformation of the elastic adhesive, and therefore, it is difficult to measure a gas flow rate with high accuracy.

As a countermeasure for solving the above problem, as described in Description of Embodiments (hereinafter referred to as embodiments) to be described later, the present inventors have developed a new technique for resin-molding the bypass passage which takes a part of a measurement target gas flowing through a main passage and fixing, with a resin forming the bypass passage, a circuit package in which a flow rate detection circuit used for measuring a flow rate is enveloped by a resin. The flow rate of the measurement target gas flowing through the main passage can be measured with high accuracy by the newly developed technique. In the newly developed countermeasure, it is found that it is desirable to further improve reliability of the fixation of the circuit package enveloped by the resin. The improvement of the measurement accuracy is thus achieved, and it is desirable to solve the problem to be described below that newly occurs accompanied with the solution of the problem related to improvement of the measurement accuracy and improve the reliability of a thermal flow meter.

An object of the present invention is to provide a thermal flow meter which can obtain high measurement accuracy and has high reliability.

Solution to Problem

In order to solve the above problem, a thermal flow meter of the present invention is provided with a resin-molded circuit package embedded with a flow rate detection circuit which measures a flow rate by performing heat transfer with a measurement target gas in a bypass passage which takes a part of the measurement target gas flowing through a main passage and flows the taken measurement target gas therein, a resin-molded housing provided with a bypass passage trench used for forming a fixing portion for holding the circuit package and the bypass passage, and a cover covering the bypass passage trench of the housing and forming the bypass passage, the circuit package is formed through a first resin molding process, the housing having the fixing portion and the bypass passage trench is formed through a second resin molding process, and the fixing portion has a thick portion and a thin portion enveloping and fixing a part of the circuit package.

Advantageous Effects of Invention

According to the invention, a thermal flow meter which can obtain high measurement accuracy and has high reliability can be obtained.

BRIEF DESCRIPTION OF DRAWINGS

FIGS. 2(A) and 2(B) are diagrams illustrating an appearance of the thermal flow meter, in which FIG. 2(A) is a left side view, and FIG. 2(B) is a front view.

FIGS. 3(A) and 3(B) are diagrams illustrating an appearance of the thermal flow meter, in which FIG. 3(A) is a right side view, and FIG. 3(B) is a rear view.

FIGS. 4(A) and 4(B) are diagrams illustrating an appearance of the thermal flow meter, in which FIG. 4(A) is a plan view, and FIG. 4(B) is a bottom view.

FIGS. 5(A) and 5(B) are diagrams illustrating a housing of the thermal flow meter, in which FIG. 5(A) is a left side view of the housing, and FIG. 5(B) is a front view of the housing.

FIGS. 6(A) and 6(B) are diagrams illustrating a housing of the thermal flow meter, in which FIG. 6(A) is a right side view of the housing, and FIG. 6(B) is a rear view of the housing.

FIG. 7 is a partially enlarged view illustrating a shape of a flow path surface arranged in the bypass passage.

FIGS. 8(A) to 8(C) are diagrams illustrating an appearance of a front cover, in which FIG. 8(A) is a left side view, FIG. 8(B) is a front view, and FIG. 8(C) is a plan view.

FIGS. 9(A) to 9(C) are diagrams illustrating an appearance of a rear cover 304, in which FIG. 9(A) is a left side view, FIG. 9(B) is a front view, and FIG. 9(C) is a plan view.

FIG. 10 is a partially enlarged view of a terminal connector.

FIGS. 11(A) to 11(C) are exterior views illustrating a circuit package, in which FIG. 11(A) is a left side view, FIG. 11(B) is a front view, and FIG. 11(C) is a rear view.

FIGS. 15(A) and 15(B) are views illustrating another embodiment of the circuit package shown in FIG. 11, FIG. 15(A) is a front view of the circuit package, and FIG. 15(A) is a rear view of the circuit package.

FIG. 21(A) is a front view, and FIG. 21(B) is a right side view.

FIGS. 22(A) and 22(B) are partially enlarged views illustrating the housing illustrated in FIG. 21, FIG. 22(A) is a front view, and FIG. 22(B) is a B-B cross-sectional view of FIG. 22(A).

FIG. 23(A) is a front view, and FIG. 23(B) is a C-C cross-sectional view of FIG. 23(A).

DESCRIPTION OF EMBODIMENTS

Figure 1:
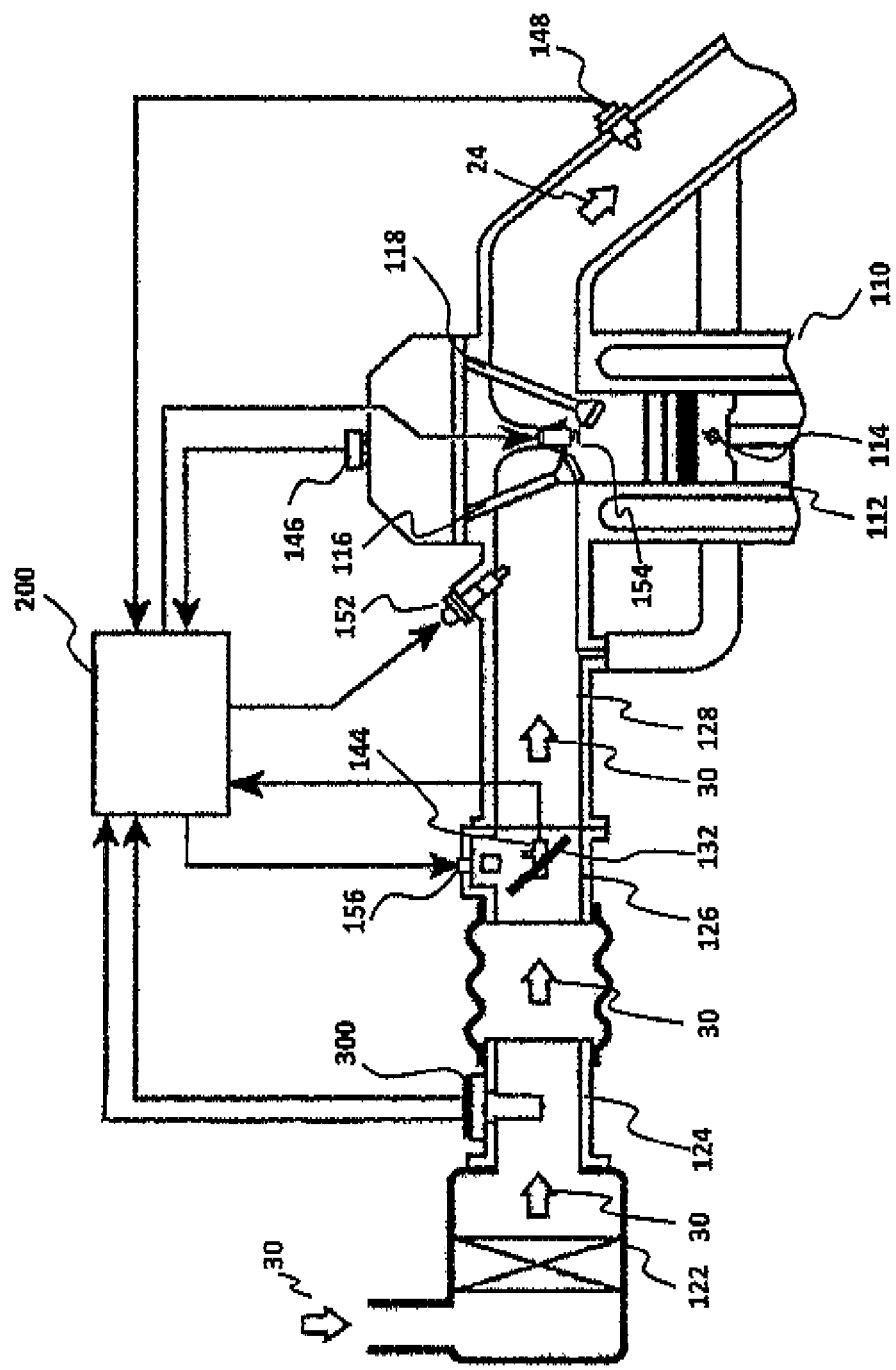
FIG. 1 is a system diagram illustrating an internal combustion engine control system where a thermal flow meter according to an embodiment of the invention is used.

In the description of embodiments (hereinafter referred to as embodiments) to be described below, the measurement accuracy of a flow rate is significantly improved, and, in addition, the problem has newly occurred related to the measurement accuracy has been solved. Although this point will be described in detail by the following embodiments, an overview thereof will be described next.

In the thermal flow meter of the present invention, a part of a measurement target gas whose flow rate is to be measured is taken in a bypass passage, and a flow rate detection circuit measures the flow rate by performing heat transfer with the measurement target gas flowing through the bypass passage. It is important for improvement of measurement accuracy of the flow rate to maintain a relationship between the bypass passage and the flow rate detection circuit at a predetermined relationship with high accuracy. In the following embodiments, in the formation of a bypass passage trench used for the bypass passage formation, the flow rate detection circuit is fixed to a housing having the bypass passage trench. More specifically, a circuit package formed of a resin enveloping the flow detection circuit is covered with a part of the housing having the bypass passage trench, whereby the circuit package is fixed to the bypass passage with an accurate positional relationship. The measurement accuracy of the flow rate can be improved by such a method.

In order to fix the circuit package to the housing, when an area in which the resin used to form the housing covers the circuit package is increased, due to a difference of a thermal expansion coefficient between the resin used to form the housing and the resin used to form the circuit package, a large force may be applied to the circuit package. On the other hand, when the area in which the resin used to form the housing covers the circuit package is reduced, the circuit package is not sufficiently fixed. Such new problems occur.

In the following embodiments, a fixing portion of the housing which is a portion in which the resin used to form the circuit package is covered with the resin used to form the housing is constituted of a thick portion and a thin portion. By virtue of the provision of the thin portion, an area enveloping the circuit package can be increased, and, in addition, thickness of the resin enveloping the circuit package is small, so that a force applied to the circuit package can be reduced.

When a contact area between the resin constituting the housing and the circuit package is increased, airtightness is easily maintained. For example, when an outer wall of the housing or a portion for maintaining an inside of the housing airtightly from the measurement target gas serves as the fixing portion enveloping the circuit package, it is desirable that a contact portion between the circuit package and the fixing portion maintains the airtightness. If the airtightness cannot be maintained, moisture and the like may intrude inside through the contact portion between the circuit package and the fixing portion. For example, when the housing includes terminals of the circuit package, the terminals of the circuit package may be eroded by the moisture intruding inside. The contact portion between the circuit package and the fixing portion can be widened by forming a thin portion, and the airtightness can be easily maintained.

The thin portion functions to restrict a flow of a mold resin in a resin molding process. When the flow of the mold resin is restricted, temperature reduction speed of the mold resin is reduced, and there is an effect that adherence between the thin portion or the fixing portion having the thin portion and a resin of the circuit package is easily improved.

When not only the thick portion but also the thin portion are provided in the fixing portion, volumetric shrinkage accompanied with cooling of the mold resin in the resin molding can be reduced, and there is an effect that warpage or the like of the housing formed by resin molding can be suppressed.

Further, in the following embodiments, a fixing portion for fixing the circuit package to the housing has an elongated shape, and a plurality of the elongated fixing portions are formed in the formation of the housing and are arranged so that longitudinal axes of the plurality of fixing portions cross each other. According to this constitution, the circuit packages can be further firmly fixed to the housing. The plurality of fixing portions are each provided with a thick portion and a thin portion. According, as described above, the adherence and the airtightness between the circuit package and the plurality of fixing portions become good.

Embodiments described below solve various problems desired as a practical product. In particular, the embodiments solve various problems for use in a measurement device for measuring an intake air amount of a vehicle and exhibit various effects. One of various problems addressed by the following embodiments is described in the "Problems to Be Solved by the Invention" described above, and one of various effects obtained by the following embodiments is described in the "Effects of the Invention." Various problems solved by the following embodiments and various effects obtained by the following embodiments will be further described in the "Description of Embodiments." Therefore, it would be appreciated that the following embodiments also include other effects or problems obtained or addressed by the embodiments than those described in "Problems to Be Solved by the Invention" or "Effects of the Invention."

In the following embodiments, like reference numerals denote like elements even when they are inserted in different drawings, and they have the same functional effects. The components that have been described in previous paragraphs may not be described by denoting reference numerals and signs in the drawings.

1. Internal Combustion Engine Control System Having Thermal Flow Meter According to One Embodiment of the Invention 1.1 Configuration of Internal Combustion Engine Control System FIG. 1 is a system diagram illustrating an electronic fuel injection type internal combustion engine control system having a thermal flow meter according to one embodiment of the invention. Based on the operation of an internal combustion engine 110 having an engine cylinder 112 and an engine piston 114, an intake air as a measurement target gas 30 is inhaled from an air cleaner 122 and is guided to a combustion chamber of the engine cylinder 112 through a main passage 124 including, for example, an intake body, a throttle body 126, and an intake manifold 128. A flow rate of the measurement target gas 30 as an intake air guided to the combustion chamber is measured by a thermal flow meter 300 according to the invention. A fuel is supplied from a fuel injection valve 152 based on the measured flow rate and is mixed with the measurement target gas 30 as an intake air, so that the mixed gas is guided to the combustion chamber. It is noted that, in this embodiment, the fuel injection valve 152 is provided in an intake port of the internal combustion engine, and the fuel injected to the intake port is mixed with the measurement target gas 30 as an intake air to form a mixed gas, so that the mixed gas is guided to the combustion chamber through an inlet valve 116 to generate mechanical energy by burning.

In recent years, in many vehicles, a direct fuel injection method having excellent effects in exhaust gas purification or fuel efficiency improvement is employed, in which a fuel injection valve 152 is installed in a cylinder head of the internal combustion engine, and fuel is directly injected into each combustion chamber from the fuel injection valve 152. The thermal flow meter 300 may be similarly used in a type in which fuel is directly injected into each combustion chamber as well as a type in which fuel is injected into the intake port of the internal combustion engine of FIG. 1. A method of measuring control parameters, including a method of using the thermal flow meter 300, and a method of controlling the internal combustion engine, including a fuel supply amount or an ignition timing, are similar in basic concept between both types. A representative example of both types, a type in which fuel is injected into the intake port is illustrated in FIG. 1.

The fuel and the air guided to the combustion chamber have a fuel/air mixed state and are explosively combusted by spark ignition of the ignition plug 154 to generate mechanical energy. The gas after combustion is guided to an exhaust pipe from the exhaust valve 118 and is discharged to the outside of the vehicle from the exhaust pipe as an exhaust gas 24. The flow rate of the measurement target gas 30 as an intake air guided to the combustion chamber is controlled by the throttle valve 132 of which opening level changes in response to manipulation of an accelerator pedal. The fuel supply amount is controlled based on the flow rate of the intake air guided to the combustion chamber, and a driver controls an opening level of the throttle valve 132, so that the flow rate of the intake air guided to the combustion chamber is controlled. As a result, it is possible to control mechanical energy generated by the internal combustion engine.

1.2 Overview of Control of Internal Combustion Engine Control System

The flow rate and the temperature of the measurement target gas 30 as an intake air that is received from the air cleaner 122 and flows through the main passage 124 are measured by the thermal flow meter 300, and an electric signal representing the flow rate and the temperature of the intake air is input to the control device 200 from the thermal flow meter 300. In addition, an output of the throttle angle sensor 144 which measures an opening level of the throttle valve 132 is input to the control device 200, and an output of a rotation angle sensor 146 is input to the control device 200 to measure a position or a condition of the engine piston 114, the inlet valve 116, or the exhaust valve 118 of the internal combustion engine and a rotational speed of the internal combustion engine. An exhaust pipe of the internal combustion engine is provided with an oxygen sensor 148 used for measuring a mixed ratio state between the fuel amount and the air amount from the condition of exhaust gas 24, and an output of an oxygen sensor 148 is input to the control device 200.

The control device 200 computes a fuel injection amount or an ignition timing based on a flow rate of the intake air as an output of the thermal flow meter 300 and a rotational speed of the internal combustion engine measured from an output of the rotation angle sensor 146. Based on the computation result of them, a fuel amount supplied from the fuel injection valve 152 and an ignition timing for igniting the ignition plug 154 are controlled. In practice, the fuel supply amount or the ignition timing is further accurately controlled based on a change of the intake temperature or the throttle angle measured by the thermal flow meter 300, a change of the engine rotation speed, and an air-fuel ratio state measured by the oxygen sensor 148. In the idle driving state of the internal combustion engine, the control device 200 further controls the air amount bypassing the throttle valve 132 using an idle air control valve 156 and controls a rotation speed of the internal combustion engine under the idle driving state.

1.3 Improvement of Measurement Accuracy of Thermal Flow Meter and Environment for Mounting Thermal Flow Meter Both the fuel supply amount and the ignition timing as a main control amount of the internal combustion engine are computed by using an output of the thermal flow meter 300 as a main parameter. According to need, a control parameter is corrected based on a temperature of an intake air, or the fuel supply amount supplied to the internal combustion engine and the ignition timing are corrected. Improvement of the measurement accuracy, suppression of aging, and improvement of reliability of the thermal flow meter 300 are very important for improvement of control accuracy of a vehicle in which the internal combustion engine is mounted or obtainment of reliability. In particularly, in recent years, there are a lot of demands for fuel saving of vehicles and exhaust gas purification. In order to satisfy such demands, it is significantly important to improve the measurement accuracy of the flow rate of the measurement target gas 30 as the intake air measured by the thermal flow meter 300. In addition, it is also important to maintain high reliability of the thermal flow meter 300.

A vehicle having the thermal flow meter 300 is used under an environment where a temperature change is significant or a coarse weather such as a storm or snow. When a vehicle travels a snowy road, it travels through a road on which an anti-freezing agent is sprayed. It is preferable that the thermal flow meter 300 be designed considering a countermeasure for the temperature change or a countermeasure for dust or pollutants under such a use environment. Furthermore, the thermal flow meter 300 is installed under an environment where the internal combustion engine is subjected to vibration. It is also desired to maintain high reliability for vibration.

The thermal flow meter 300 is installed in a main passage 124 as the intake pipe influenced by heat from the internal combustion engine. For this reason, the heat generated from the internal combustion engine is transferred to the thermal flow meter 300 via the intake pipe which is the main passage 124. The thermal flow meter 300 adopting a method for measuring the flow rate of the measurement target gas by performing heat transfer with the measurement target gas, and it is important to suppress influence of the heat from the outside as much as possible.

The thermal flow meter 300 mounted on a vehicle solves the problems described in "Problems to Be Solved by the Invention" and provides the effects described in "Effects of the Invention" as described below. In addition, as described below, it solves various problems demanded as a product and provides various effects considering various problems described above. Specific problems or effects solved or provided by the thermal flow meter 300 will be described in the following description of embodiments.

2. Configuration of Thermal Flow Meter 300

2.1 Exterior Structure of Thermal Flow Meter 300

Figure 2:
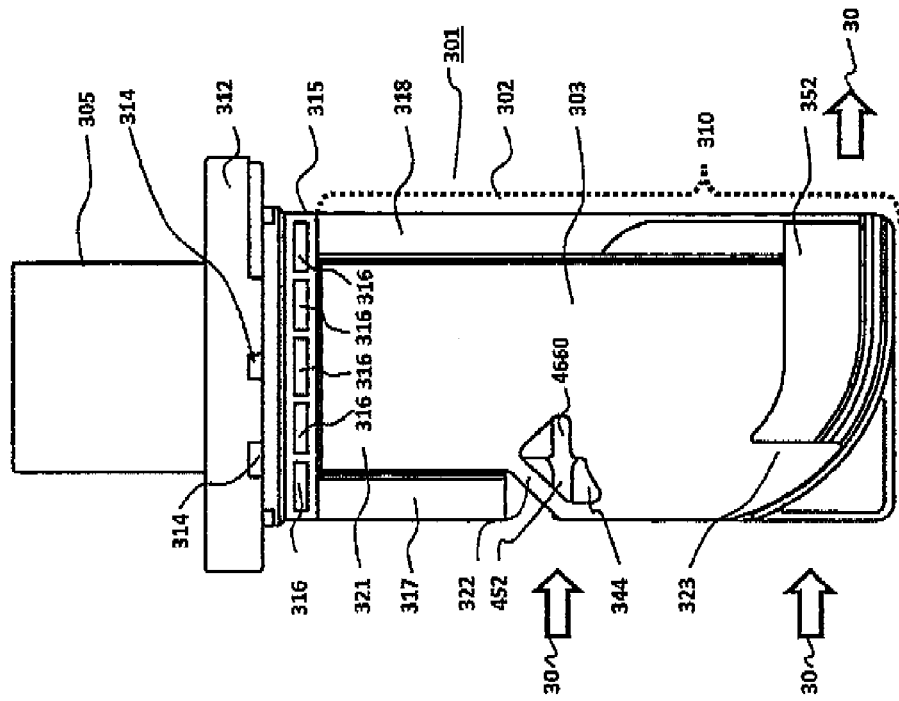
Figure 2:
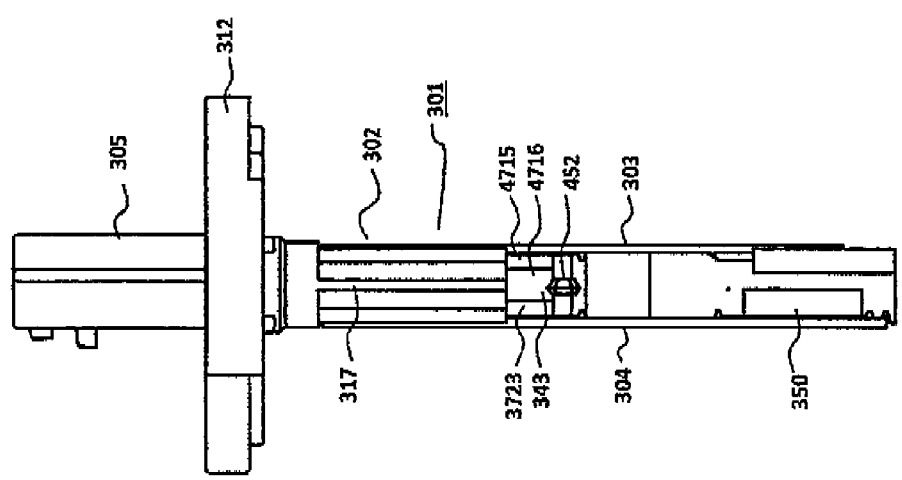
Figure 3:
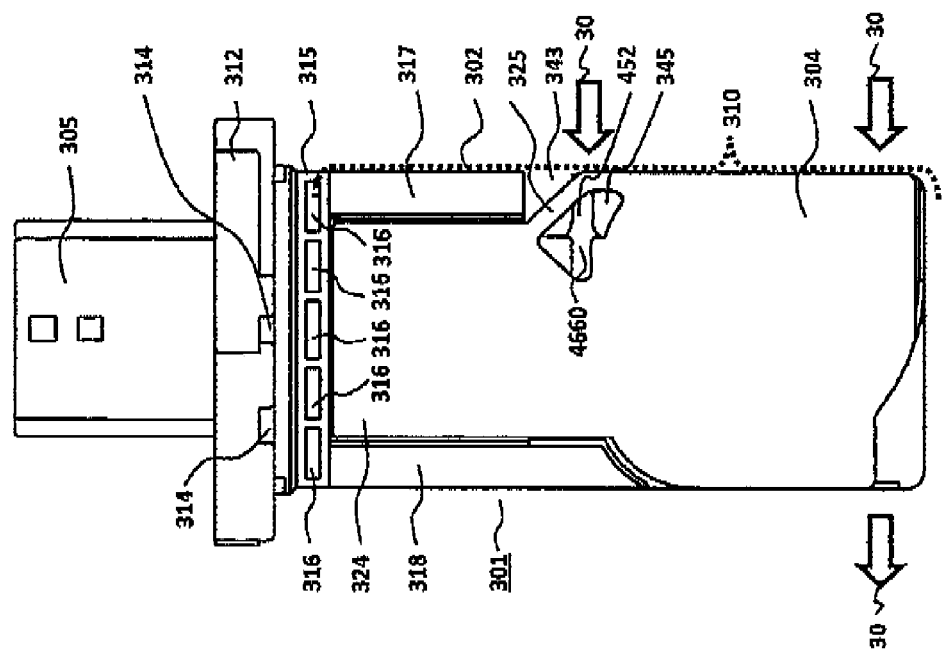
Figure 3:
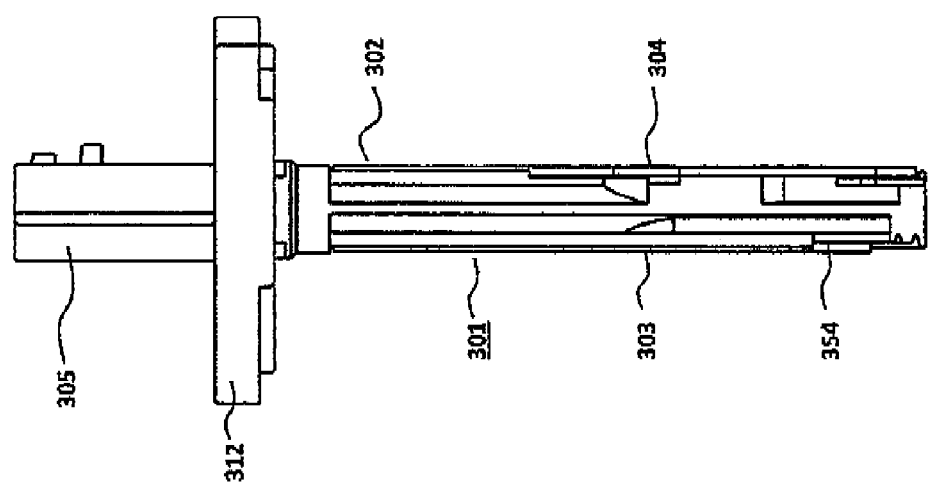

FIGS. 2(A), 2(B), 3(A), 3(B), 4(A), and 4(B) are diagrams illustrating the exterior of the thermal flow meter 300, in which FIG. 2(A) is left side view of the thermal flow meter 300, FIG. 2(B) is a front view, FIG. 3(A) is a right side view, FIG. 3(B) is a rear view, FIG. 4(A) is a plan view, and FIG. 4(B) is a bottom view. The thermal flow meter 300 has a case 301, and the case 301 is provided with a housing 302, a front cover 303, and a rear cover 304. The housing 302 includes a flange 312 for fixing the thermal flow meter 300 to an intake body as a main passage 124, an external connector 305 having an external terminal 306 for electrical connection to external devices, and a measuring portion 310 for measuring a flow rate and the like. The measuring portion 310 is internally provided with a bypass passage trench for making a bypass passage. In addition, the measuring portion 310 is internally provided with a circuit package 400 having an air flow sensing portion 602 (refer to FIG. 19) for measuring a flow rate of the measurement target gas 30 flowing through the main passage 124 or a temperature detecting portion 452 for measuring a temperature of the measurement target gas 30 flowing through the main passage 124.

2.2 Effects Based on Exterior Structure of Thermal Flow Meter 300

Since the inlet port 350 of the thermal flow meter 300 is provided in the leading end side of the measuring portion 310 extending toward the center direction of the main passage 124 from the flange 312, the measurement target gas 30 in the vicinity of the center portion distant from the inner wall surface instead of the vicinity of the inner wall surface of the main passage 124 may be input to the bypass passage. For this reason, the thermal flow meter 300 can measure a flow rate or a temperature of the measurement target gas 30 distant from the inner wall surface of the main passage 124 of the thermal flow meter 300, so that it is possible to suppress a decrease of the measurement accuracy caused by influence of heat and the like. In the vicinity of the inner wall surface of the main passage 124, the thermal flow meter 300 is easily influenced by the temperature of the main passage 124, so that the temperature of the measurement target gas 30 has a different condition from an original temperature of the gas and exhibits a condition different from an average condition of the main gas inside the main passage 124. In particular, if the main passage 124 serves as an intake body of the engine, it may be influenced by the heat from the engine and remains in a high temperature. For this reason, the gas in the vicinity of the inner wall surface of the main passage 124 has a temperature higher than the original temperature of the main passage 124 in many cases, so that this degrades the measurement accuracy.

In the vicinity of the inner wall surface of the main passage 124, a fluid resistance increases, and a flow velocity decreases, compared to an average flow velocity in the main passage 124. For this reason, if the gas in the vicinity of the inner wall surface of the main passage 124 is input to the bypass passage as the measurement target gas 30, a decrease of the flow velocity against the average flow velocity in the main passage 124 may generate a measurement error. In the thermal flow meter 300 illustrated in FIGS. 2(A), 2(B), 3(A), 3(B), and 4(A) to 4(C), since the inlet port 350 is provided in the leading end of the thin and long measuring portion 310 extending to the center of the main passage 124 from the flange 312, it is possible to reduce a measurement error relating to a decrease of the flow velocity in the vicinity of the inner wall surface. In the thermal flow meter 300 illustrated in FIGS. 2(A), 2(B), 3(A), 3(B), and 4(A) to 4(C), in addition to the inlet port 350 provided in the leading end of the measuring portion 310 extending to the center of the main passage 124 from the flange 312, an outlet port of the bypass passage is also provided in the leading end of the measuring portion 310. Therefore, it is possible to further reduce the measurement error.

The measuring portion 310 of the thermal flow meter 300 has a shape extending from the flange 312 to the center direction of the main passage 124, and its leading end is provided with the inlet port 350 for inputting a part of the measurement target gas 30 such as an intake air to the bypass passage and the outlet port 352 for returning the measurement target gas 30 from the bypass passage to the main passage 124. While the measuring portion 310 has a shape extending along an axis directed to the center from the outer wall of the main passage 124, its width has a narrow shape as illustrated in FIGS. 2(A) and 3(A). That is, the measuring portion 310 of the thermal flow meter 300 has a front surface having an approximately rectangular shape and a side surface having a thin width. As a result, the thermal flow meter 300 can have a bypass passage having a sufficient length, and it is possible to suppress a fluid resistance to a small value for the measurement target gas 30. For this reason, using the thermal flow meter 300, it is possible to suppress the fluid resistance to a small value and measure the flow rate of the measurement target gas 30 with high accuracy.

2.3 Structure of Measuring Portion 310 and Effects Based Thereon

In a direction of a flow of the measurement target gas 30 flowing in the main passage 124, an upstream-side protrusion 317 and a downstream-side protrusion 318 are provided in the upstream-side side surface and the downstream-side side surface, respectively, of the measuring portion 310 included in the thermal flow meter 300. The upstream-side protrusion 317 and the downstream-side protrusion 318 have a shape narrowed along the leading end to the base, so that it is possible to reduce a fluid resistance of the measurement target gas 30 flowing through the main passage 124. The upstream-side protrusion 317 is provided between the thermal insulation 315 and the inlet port 343. The upstream-side protrusion 317 has a large cross section and receives a large heat conduction from the flange 312 or the thermal insulation 315. However, the upstream-side protrusion 317 is cut near the inlet port 343, and a length of the temperature detecting portion 452 from the temperature detecting portion 452 of the upstream-side protrusion 317 increases due to the hollow of the upstream-side outer wall of the housing 302 as described below. For this reason, the heat conduction is suppressed from the thermal insulation 315 to the support portion of the temperature detecting portion 452.

The temperature of the measurement target gas 30 received from the inlet port 343 is measured by the temperature detecting portion 452, and the measurement target gas 30 flows in a cooling passage trench 4660 produced by an aforementioned outer wall hollow portion 366 (see, FIG. 5) of the housing 302 and is discharged to the main passage 124 from a front side outlet port 344 or a rear side outlet port 345. As described in FIG. 2(A), a thick portion 4715 and a thin portion 4716 of an aforementioned fixing portion 3723 of the housing 302 are provided deep in the inlet port 343. Although the fixing portion 3723 will be described in detail in the following, the fixing portion 3723 is provided for fixing the circuit package 400 (see, FIG. 5), which measures the flow rate, to the housing 302 and has the thick portion 4716 and the thin portion 4715 to reduce a stress applied to the circuit package 400. In the fixing portion 3723, a thermoplastic resin is used, and meanwhile, the circuit package 400 is formed of a thermosetting resin as a material, so that the thermal expansion coefficient of the resin material of the fixing portion is larger than that of the resin material of the circuit package 400. In the resin molding process, the fixing portion 3723 shrinks when the resin is solidified. When a shrinkage amount of a resin is large, a large shrinkage force is generated, and a large stress is applied to the circuit package 400, so that the circuit package 400 may be damaged. For example, a circuit embedded in the circuit package 400 may be adversely affected. In this embodiment, a part of the fixing portion 3723 is the thin portion 4715, whereby the thickness of the fixing portion 3723 can be partially reduced, the shrinkage amount of a resin material for molding accompanied with temperature reduction can be reduced, and the stress applied to the circuit package 400 can be suppressed.

Further, since the shrinkage amount of the fixing portion 3723 can be reduced by providing the thin portion 4715, an adverse effect of shrinkage of a resin, such as warpage or twist of the housing 302, can be reduced.

A gap 382 including the terminal connector 320 and the terminal connector 320 described below is formed between the flange 312 or the thermal insulation 315 and the temperature detecting portion 452. For this reason, a distance between the flange 312 or the thermal insulation 315 and the temperature detecting portion 452 increases, and the front cover 303 or the rear cover 304 is provided in this long portion, so that this portion serves as a cooling surface. Therefore, it is possible to reduce influence of the temperature of the wall surface of the main passage 124 to the temperature detecting portion 452. In addition, as the distance between the flange 312 or the thermal insulation 315 and the temperature detecting portion 452 increases, it is possible to guide a part of the measurement target gas 30 input to the bypass passage to the vicinity of the center of the main passage 124. It is possible to suppress a decrease of the measurement accuracy related to the wall surface of the main passage 124.

As illustrated in FIG. 2(B) or 3(B), both side surfaces of the measuring portion 310 inserted into the main passage 124 have a very narrow shape, and a leading end of the downstream-side protrusion 318 or the upstream-side protrusion 317 has a narrow shape relative to the base where the air resistance is reduced. For this reason, it is possible to suppress an increase of the fluid resistance caused by insertion of the thermal flow meter 300 into the main passage 124. Furthermore, in the portion where the downstream-side protrusion 318 or the upstream-side protrusion 317 is provided, the upstream-side protrusion 317 or the downstream-side protrusion 318 protrudes toward both sides relative to both side portions of the front cover 303 or the rear cover 304. Since the upstream-side protrusion 317 or the downstream-side protrusion 318 is formed of a resin molding, they are easily formed in a shape having an insignificant air resistance. Meanwhile, the front cover 303 or the rear cover 304 is shaped to have a wide cooling surface. For this reason, the thermal flow meter 300 has a reduced air resistance and can be easily cooled by the measurement target air flowing through the main passage 124.

2.4 Structure and Effects of Flange 312

The flange 312 is provided with a plurality of hollows 314 on its lower surface which is a portion facing the main passage 124, so as to reduce a heat transfer surface with the main passage 124 and make it difficult for the thermal flow meter 300 to receive influence of the heat. The screw hole 313 of the flange 312 is provided to fix the thermal flow meter 300 to the main passage 124, and a space is formed between a surface facing the main passage 124 around each screw hole 313 and the main passage 124 such that the surface facing the main passage 124 around the screw hole 313 recedes from the main passage 124. As a result, the flange 312 has a structure capable of reducing heat transfer from the main passage 124 to the thermal flow meter 300 and preventing degradation of the measurement accuracy caused by heat. Furthermore, in addition to the heat conduction reduction effect, the hollow 314 can reduce influence of contraction of the resin of the flange 312 during the formation of the housing 302.

The thermal insulation 315 is provided in the measuring portion 310 side of the flange 312. The measuring portion 310 of the thermal flow meter 300 is inserted into the inside from an installation hole provided in the main passage 124 so that the thermal insulation 315 faces the inner surface of the installation hole of the main passage 124. The main passage 124 serves as, for example, an intake body, and is maintained at a high temperature in many cases. Conversely, it is conceived that the main passage 124 is maintained at a significantly low temperature when the operation is activated in a cold district. If such a high or low temperature condition of the main passage 124 affects the temperature detecting portion 452 or the measurement of the flow rate described below, the measurement accuracy is degraded. For this reason, a plurality of hollows 316 are provided side by side in the thermal insulation 315 adjacent to the hole inner surface of the main passage 124, and a width of the thermal insulation 315 adjacent to the hole inner surface between the neighboring hollows 316 is significantly thin, which is equal to or smaller than ⅓ of the width of the fluid flow direction of the hollow 316. As a result, it is possible to reduce influence of temperature. In addition, a portion of the thermal insulation 315 becomes thick. During a resin molding of the housing 302, when the resin is cooled from a high temperature to a low temperature and is solidified, volumetric shrinkage occurs so that a deformation is generated as a stress occurs. By forming the hollow 316 in the thermal insulation 315, it is possible to more uniformize the volumetric shrinkage and reduce stress concentration.

The measuring portion 310 of the thermal flow meter 300 is inserted into the inside from the installation hole provided in the main passage 124 and is fixed to the main passage 124 using the flange 312 of the thermal flow meter 300 with screws. The thermal flow meter 300 is preferably fixed to the installation hole provided in the main passage 124 with a predetermined positional relationship. The hollow 314 provided in the flange 312 may be used to determine a positional relationship between the main passage 124 and the thermal flow meter 300. By forming the convex portion in the main passage 124, it is possible to provide an insertion relationship between the convex portion and the hollow 314 and fix the thermal flow meter 300 to the main passage 124 in an accurate position.

2.5 Structures and Effects of External Connector 305 and Flange 312

FIG. 4(A) is a plan view illustrating the thermal flow meter 300. Four external terminal 306 and a calibration terminal 307 are provided inside the external connector 305. The external terminals 306 include terminals for outputting the flow rate and the temperature as a measurement result of the thermal flow meter 300 and a power terminal for supplying DC power for operating the thermal flow meter 300. The calibration terminal 307 is used to measures the produced thermal flow meter 300 to obtain a calibration value of each thermal flow meter 300 and store the calibration value in an internal memory of the thermal flow meter 300. In the subsequent measurement operation of the thermal flow meter 300, the calibration data representing the calibration value stored in the memory is used, and the calibration terminal 307 is not used. Therefore, in order to prevent the calibration terminal 307 from hindering connection between the external terminals 306 and other external devices, the calibration terminal 307 has a shape different from that of the external terminal 306. In this embodiment, since the calibration terminal 307 is shorter than the external terminal 306, the calibration terminal 307 does not hinder connection even when the connection terminal connected to the external terminal 306 for connection to external devices is inserted into the external connector 305. In addition, since a plurality of hollows 308 are provided along the external terminal 306 inside the external connector 305, the hollows 308 reduce stress concentration caused by shrinkage of resin when the resin as a material of the flange 312 is cooled and solidified.

Since the calibration terminal 307 is provided in addition to the external terminal 306 used during the measurement operation of the thermal flow meter 300, it is possible to measure characteristics of each thermal flow meter 300 before shipping to obtain a variation of the product and store a calibration value for reducing the variation in the internal memory of the thermal flow meter 300. The calibration terminal 307 is formed in a shape different from that of the external terminal 306 in order to prevent the calibration terminal 307 from hindering connection between the external terminal 306 and external devices after the calibration value setting process. In this manner, using the thermal flow meter 300, it is possible to reduce a variation of each thermal flow meter 300 before shipping and improve measurement accuracy.

Figure 6:
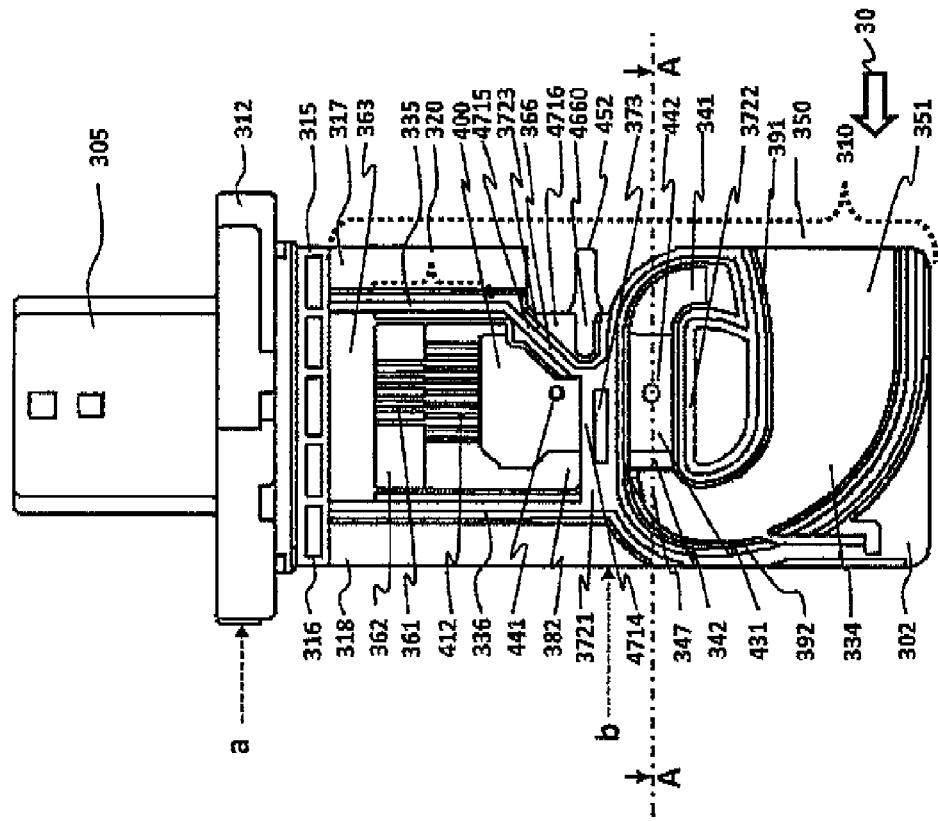
Figure 6:
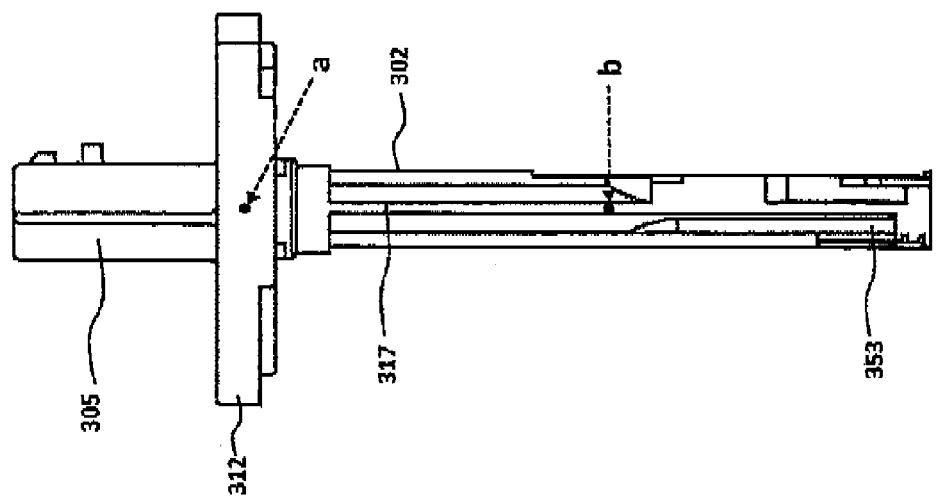

3. Entire Structure of Housing 302 and its Effects 3.1 Structures and Effects of Bypass Passage and Air Flow Sensing Portion FIGS. 5(A) to 6(B) illustrate a state of the housing 302 when the front and rear covers 303 and 304 are removed from the thermal flow meter 300. FIG. 5(A) is a left side view illustrating the housing 302, FIG. 5(B) is a front view illustrating the housing 302, FIG. 6(A) is a right side view illustrating the housing 302, and FIG. 6(B) is a rear view illustrating the housing 302. In the housing 302, the measuring portion 310 extends from the flange 312 to the center direction of the main passage 124, and a bypass passage trench for forming the bypass passage is provided in its leading end side. In this embodiment, the bypass passage trench is provided on both frontside and backside of the housing 302. FIG. 5(B) illustrates a bypass passage trench on frontside 332, and FIG. 6(B) illustrates a bypass passage trench on backside 334. Since an inlet trench 351 for forming the inlet port 350 of the bypass passage and an outlet trench 353 for forming the outlet port 352 are provided in the leading end of the housing 302, the gas distant from the inner wall surface of the main passage 124, that is, the gas flow through the vicinity of the center of the main passage 124 can be received as the measurement target gas 30 from the inlet port 350. The gas flowing through the vicinity of the inner wall surface of the main passage 124 is influenced by the temperature of the wall surface of the main passage 124 and has a temperature different from the average temperature of the gas flowing through the main passage 124 such as the measurement target gas 30 in many cases. In addition, the gas flowing through the vicinity of the inner wall surface of the main passage 124 has a flow velocity lower than the average flow velocity of the gas flowing through the main passage 124 in many cases. Since the thermal flow meter 300 according to the embodiment is resistant to such influence, it is possible to suppress a decrease of the measurement accuracy.

The bypass passage formed by the bypass passage trench on frontside 332 or the bypass passage trench on backside 334 described above is connecter to the thermal insulation 315 of the flange 312 through the outer wall hollow portion 366, the upstream-side outer wall 335, or the downstream-side outer wall 336. In addition, the upstream-side outer wall 335 is provided with the upstream-side protrusion 317, and the downstream-side outer wall 336 is provided with the downstream-side protrusion 318. In this structure, since the thermal flow meter 300 is fixed to the main passage 124 using the flange 312, the measuring portion 310 having the circuit package 400 is fixed to the main passage 124 with high reliability.

In this embodiment, the housing 302 is provided with the bypass passage trench for forming the bypass passage, and the covers are installed on the frontside and backside of the housing 302, so that the bypass passage is formed by the bypass passage trench and the covers. In this structure, it is possible to form overall bypass passage trenches as a part of the housing 302 in the resin molding process of the housing 302. In addition, since the dies are provided in both surfaces of the housing 302 during formation of the housing 302, it is possible to form both the bypass passage trench on frontside 332 and bypass passage trench on backside 334 as a part of the housing 302 by using the dies for both the surfaces. Since the front and rear covers 303 and 304 are provided in both the surfaces of the housing 302, it is possible to obtain the bypass passages in both surfaces of the housing 302. Since the front and bypass passage trench on frontside 332 and bypass passage trenches on backside 334 are formed on both the surfaces of the housing 302 using the dies, it is possible to form the bypass passage with high accuracy and obtain high productivity.

Referring to FIG. 6(B), a part of the measurement target gas 30 flowing through the main passage 124 is input to the inside of the bypass passage trench on backside 334 from the inlet trench 351 which forms the inlet port 350 and flows through the inside of the bypass passage trench on backside 334. The bypass passage trench on backside 334 gradually deepens as the gas flows, and the measurement target gas 30 slowly moves to the front direction as it flows along the trench. In particular, the bypass passage trench on backside 334 is provided with a steep slope portion 347 which steeply deepens near the hole 342, so that a part of the air having a light mass moves along the steep slope portion 347 and then flows to the measurement surface 430 illustrated in FIG. 5(B) through the hole 342. Meanwhile, since a foreign object having a heavy mass has difficulty in steeply changing its path due to an inertial force, it moves to the side of the backside of measurement surface 431 illustrated in FIG. 6(B). Then, the foreign object passes through the hole 341 and flows to the measurement surface 430 illustrated in FIG. 5(B).

In the bypass passage trench on frontside 332 of FIG. 5(B), the air as a measurement target gas 30 moving from the hole 342 to the bypass passage trench on frontside 332 side flows along the measurement surface 430, and heat transfer is performed with the air flow sensing portion 602 for measuring a flow rate using the heat transfer surface exposing portion 436 provided in the measurement surface 430 in order to measure a flow rate. Both the measurement target gas 30 passing through the measurement surface 430 or the air flowing from the hole 341 to the bypass passage trench on frontside 332 flow along the bypass passage trench on frontside 332 and are discharged from the outlet trench 353 for forming the outlet port 352 to the main passage 124.

A substance having a heavy mass such as a contaminant mixed in the measurement target gas 30 has a high inertial force and has difficulty in steeply changing its path to the deep side of the trench along the surface of the steep slope portion 347 of FIG. 6(B) where a depth of the trench steeply deepens. For this reason, since a foreign object having a heavy mass moves through the side of the backside of measurement surface 431, it is possible to suppress the foreign object from passing through the vicinity of the heat transfer surface exposing portion 436. In this embodiment, since most of foreign objects having a heavy mass other than the gas pass through the backside of measurement surface 431 which is a rear surface of the measurement surface 430, it is possible to reduce influence of contamination caused by a foreign object such as an oil component, carbon, or a contaminant and suppress degradation of the measurement accuracy. That is, since the path of the measurement target gas 30 steeply changes along an axis across the flow axis of the main passage 124, it is possible to reduce influence of a foreign object mixed in the measurement target gas 30.

In this embodiment, the flow path including the bypass passage trench on backside 334 is directed to the flange from the leading end of the housing 302 along a curved line, and the gas flowing through the bypass passage in the side closest to the flange flows reversely to the flow of the main passage 124, so that the bypass passage in the rear surface side as one side of this reverse flow is connected to the bypass passage formed in the front surface side as the other side. As a result, it is possible to easily fix the heat transfer surface exposing portion 436 of the circuit package 400 to the bypass passage and easily receive the measurement target gas 30 in the position close to the center of the main passage 124.

In this embodiment, the holes 342 and 341 penetrating through the bypass passage trench on backside 334 and the bypass passage trench on frontside 332 are provided in the front and rear sides of the flow direction of the measurement surface 430 for measuring the flow rate. The penetrating holes 342 and 341 are provided, and the bypass passage is formed such that the measurement target gas 30 moves from the bypass passage trench on backside 334 formed in one surface of the housing 302 to the bypass passage trench on frontside 332 formed in the other surface of the housing 302. According to this constitution, it is possible to form the bypass passage trench on both surfaces of the housing 302 through a single resin molding process and perform molding with a structure for matching both surfaces.

By virtue of the provision of the holes 342 and 341 on both sides of the measurement surface 430 formed in the circuit package 400, an inflow of the resin to the heat transfer surface exposing portion 436 formed in the measurement surface 430 can be prevented by utilizing a die used to form the holes 342 and 341. Further, while the formation of the holes 342 and 341 in the upstream and the downstream sides of the measurement surface 430 is used, when the circuit package 400 is fixed to the housing 302 by resin molding, a die is disposed using these holes, and the circuit package 400 can be positioned and fixed by the die.

In this embodiment, the two holes, that is, the holes 342 and 341 are provided as holes penetrating through the bypass passage trench on backside 334 and the bypass passage trench on frontside 332. However, even if the two holes 342 and 341 are not provided, a bypass passage shape connecting the bypass passage trench on backside 334 and the bypass passage trench on frontside 332 can be formed through a single resin molding process by providing either one of the holes.

An inside wall of bypass passage on backside 391 and an outside wall of bypass passage on backside 392 are provided in both sides of the bypass passage trench on backside 334, and the inner side surface of the rear cover 304 abuts on the leading end portions of the height direction of each of the inside wall of bypass passage on backside 391 and the outside wall of bypass passage on backside 392, so that the bypass passage on backside is formed in the housing 302. In addition, an inside wall of bypass passage on frontside 393 and an outside wall of bypass passage on frontside 394 are provided in both sides of the bypass passage trench on frontside 332, and the inner side surface of the rear cover 304 abuts on the leading end portions of the height direction of the inside wall of bypass passage on frontside 393 and the outside wall of bypass passage on frontside 394, so that the bypass passage on frontside is formed in the housing 302.

In this embodiment, the measurement target gas 30 dividingly flows through the measurement surface 430 and its rear surface, and the heat transfer surface exposing portion 436 for measuring the flow rate is provided in one of them. However, the measurement target gas 30 may pass through only the front surface side of the measurement surface 430 instead of dividing the measurement target gas 30 into two passages. By curving the bypass passage to follow a second axis across a first axis of the flow direction of the main passage 124, it is possible to gather a foreign object mixed in the measurement target gas 30 to the side where the curve of the second axis is insignificant. By providing the measurement surface 430 and the heat transfer surface exposing portion 436 in the side where the curve of the second axis is significant, it is possible to reduce influence of a foreign object.

In this embodiment, the measurement surface 430 and the heat transfer surface exposing portion 436 are provided in a link portion between the bypass passage trench on frontside 332 and the bypass passage trench on backside 334. However, the measurement surface 430 and the heat transfer surface exposing portion 436 may be provided in the bypass passage trench on frontside 332 or the bypass passage trench on backside 334 instead of the link portion between the bypass passage trench on frontside 332 and the bypass passage trench on backside 334.

An orifice shape is formed in a part of the heat transfer surface exposing portion 436 provided in the measurement surface 430 to measure a flow rate, so that the flow velocity increases due to the orifice effect, and the measurement accuracy is improved. In addition, even if a vortex is generated in a flow of the gas in the upstream side of the heat transfer surface exposing portion 436, it is possible to eliminate or reduce the vortex using the orifice and improve measurement accuracy.

Referring to FIGS. 5(A) to 6(B), an outer wall hollow portion 366 is provided, where the upstream-side outer wall 335 has a hollow shape hollowed to the downstream side in a neck portion of the temperature detecting portion 452. Due to this outer wall hollow portion 366, a distance between the temperature detecting portion 452 and the outer wall hollow portion 366 increases, so that it is possible to reduce influence of the heat transferred via the upstream-side outer wall 335.

Since the outer wall hollow portion 366 is provided in a neck portion of the temperature detecting portion 452, it is possible to reduce influence of the heat transferred from the flange 312 or the thermal insulation 315 through the upstream-side outer wall 335. Furthermore, the outer wall hollow portion 366 for temperature measurement formed by a notch between the upstream-side protrusion 317 and the temperature detecting portion 452 is provided. Using the outer wall hollow portion 366, it is possible to reduce heat transfer to the temperature detecting portion 452 through the upstream-side protrusion 317. As a result, it is possible to improve detection accuracy of the temperature detecting portion 452. In particular, since the upstream-side protrusion 317 has a large cross section, heat is easily transferred thereto, and a functionality of the outer wall hollow portion 366 which functions to suppress heat transfer becomes important.

3.2 Structure of Air Flow Sensing Portion of Bypass passage and Effects Based Thereon FIGS. 7(A) and 7(B) are partially enlarged views illustrating a state that the measurement surface 430 of the circuit package 400 is arranged inside the bypass passage trench as a cross-sectional view taken along the line A-A of FIGS. 6(A) and 6(B). It is noted that FIGS. 7(A) and 7(B) are a conceptual diagram omitted and simplified compared to the specific configuration of FIGS. 5(A) to 6(B), and details may be slightly modified. The left side of FIGS. 7(A) and 7(B) is a terminated end portion of the bypass passage trench on backside 334, and the right side is a starting end portion of the bypass passage trench on frontside 332. Although not illustrated clearly in FIGS. 7(A) and 7(B), holes 342 and 341 are provided in both the left and right sides of the circuit package 400 having the measurement surface 430, and the bypass passage trench on backside 334 and the bypass passage trench on frontside 332 are connected to the left and right sides of the circuit package 400 having the measurement surface 430.

The measurement target gas 30 which is received from the inlet port 350 and flows through the bypass passage on backside including the bypass passage trench on backside 334 is guided from the left side of FIG. 7. Apart of the measurement target gas 30 flows to a flow path 386 including the front side of the measurement surface 430 of the circuit package 400 and the protrusion 356 provided in the front cover 303 through the hole 342. The other measurement target gas 30 flows to a flow path 387 formed by the backside of measurement surface 431 and the rear cover 304. Then, the measurement target gas 30 flowing through the flow path 387 moves to the bypass passage trench on frontside 332 through the hole 341 and is combined with the measurement target gas 30 flowing through the flow path 386, so that it flows through the bypass passage trench on frontside 332 and is discharged from the outlet port 352 to the main passage 124. It is noted that the protrusion 358 provided in the rear cover 304 protrudes to the backside of measurement surface 431 in the flow path 387.

Because the bypass passage trench is formed such that the flow path of the measurement target gas 30 guided to the flow path 386 through the hole 342 from the bypass passage trench on backside 334 is curved wider than the flow path guided to the flow path 387, a substance having a heavy mass such as a contaminant contained in the measurement target gas 30 is gathered in the flow path 387 being less curved. For this reason, there is nearly no flow of a foreign object into the flow path 386.

The flow path 386 is structured to form an orifice such that the front cover 303 is provided successively to the leading end portion of the bypass passage trench on frontside 332, and the protrusion 356 smoothly protrudes to the measurement surface 430 side. The measurement surface 430 is arranged in one side of the orifice portion of the flow path 386 and is provided with the heat transfer surface exposing portion 436 for performing heat transfer between air flow sensing portion 602 and the measurement target gas 30. In order to perform measurement of the air flow sensing portion 602 with high accuracy, the measurement target gas 30 in the heat transfer surface exposing portion 436 preferably makes a laminar flow having a little vortex. In addition, with the flow velocity being faster, the measurement accuracy is more improved. For this reason, the orifice is formed such that the protrusion 356 provided in the front cover 303 to face the measurement surface 430 smoothly protrudes to the measurement surface 430. This orifice reduces a vortex in the measurement target gas 30 to approximate the flow to a laminar flow. Furthermore, since the flow velocity increases in the orifice portion, and the heat transfer surface exposing portion 436 for measuring the flow rate is arranged in the orifice portion, the measurement accuracy of the flow rate is improved.

Since the orifice is formed such that the protrusion 356 protrudes to the inside of the bypass passage trench to face the heat transfer surface exposing portion 436 provided on the flow path surface 430, it is possible to improve measurement accuracy. The protrusion 356 for forming the orifice is provided on the cover facing the heat transfer surface exposing portion 436 provided on the flow path surface 430. In FIG. 7, since the cover facing the heat transfer surface exposing portion 436 provided on the flow path surface 430 is the front cover 303, the heat transfer surface exposing portion 436 is provided in the front cover 303. Alternatively, the heat transfer surface exposing portion 436 may also be provided in the cover facing the heat transfer surface exposing portion 436 provided on the flow path surface 430 of the front or rear cover 303 or 304. Depending on which of the surfaces the flow path surface 430 and the heat transfer surface exposing portion 436 in the circuit package 400 are provided, the cover which faces the heat transfer surface exposing portion 436 is changed.

A distribution of the measurement target gas 30 between the flow paths 386 and 387 also relates to the high accuracy measurement. A distribution of the measurement target gas 30 between the flow paths 386 and 387 is adjusted by causing the protrusion 358 provided in the rear cover 304 to protrude to the flow path 387. In addition, since the orifice portion is provided in the flow path 387, it is possible to increase the flow velocity and guide a foreign object such as a contaminant to the flow path 387. In this embodiment, the orifice formed by the protrusion 358 is used as one of means for adjustment between the flow paths 386 and 387. Alternatively, the aforementioned distribution of the flow rate between the flow paths 386 and 387 may be adjusted by adjusting a width between the backside of measurement surface 431 and the rear cover 304 and the like. In this case, the protrusion 358 provided in the rear cover 304 is not necessary.

Referring to FIGS. 5(A) to 6(B), a press imprint 442 of the die used in the resin molding process for the circuit package 400 remains on the backside of measurement surface 431 as a rear surface of the heat transfer surface exposing portion 436 provided on the measurement surface 430. The press imprint 442 does not particularly hinder the measurement of the flow rate and does not make any problem even when the press imprint 442 remains. In addition, as described below, it is important to protect a semiconductor diaphragm of the air flow sensing portion 602 when the circuit package 400 is formed through resin molding. For this reason, pressing of the rear surface of the heat transfer surface exposing portion 436 is important. Furthermore, it is important to prevent resin which covers the circuit package 400 from flowing to the heat transfer surface exposing portion 436. For this viewpoint, the inflow of the resin is suppressed by enveloping the measurement surface 430 including the heat transfer surface exposing portion 436 using a die and pressing the rear surface of the heat transfer surface exposing portion 436 using another die. Since the circuit package 400 is made through transfer molding, a pressure of the resin is high, and pressing from the rear surface of the heat transfer surface exposing portion 436 is important. In addition, since a semiconductor diaphragm is used in the air flow sensing portion 602, a ventilation passage for a gap created by the semiconductor diaphragm is preferably formed. In order to hold and fix a plate and the like for forming the ventilation passage, pressing from the rear surface of the heat transfer surface exposing portion 436 is important.

3.3 Shapes of Covers of Thermal Flow Meter 300 and Effects Based Thereon

FIGS. 8(A) to 8(C) are a diagram illustrating an appearance of the front cover 303, in which FIG. 8(A) is a left side view, FIG. 8(B) is a front view, and FIG. 8(C) is a plan view. FIGS. 9(A) and 9(B) are diagrams illustrating an appearance of the rear cover 304, in which FIG. 9(A) is a left side view, FIG. 9(B) is a front view, and FIG. 9(C) is a plan view. In FIGS. 8(A) to 9(C), the front cover 303 and the rear cover 304 are provided on the front and rear surfaces of the housing 302, respectively, adhered to top sides of the upstream-side outer wall 335 and the downstream-side outer wall 336 shown in FIGS. 5(A) to 6(B), which are the outer walls of the housing 302, that is, the leading end portions of the height direction which are outermost on the front and rear sides, and adhered to the leading end portion of the height direction which is outermost on the front and rear sides of the fixing portion 3721, similarly. Further, the front cover 303 and the rear cover 304 are adhered to a portion along the thermal insulation 315 connecting the upstream-side outer wall 335 and the downstream-side outer wall 336 on the flange 312 side, and the sealed gap 382 is formed therein. Furthermore, the front cover 303 and the rear cover 304 are used to form the bypass passage by covering the bypass passage trench of the housing 302. In addition, the front or rear cover 303 or 304 is used to form an orifice in association with the protrusion 356. For this reason, it is preferable to increase formation accuracy. Since the front or rear cover 303 or 304 is formed through a resin molding process by injecting a thermoplastic resin into a die, it is possible to form the front or rear cover 303 or 304 with high formation accuracy. When the gap 382 is completely sealed, a pressure difference between the gap 382 and outside may be increased by temperature change, and thus it is not preferable. For this reason, as described below, a breathing mechanism is provided to prevent a pressure difference between the gap 382 and outside due to the temperature change from being increased.

The front protection portion 322 or the rear protection portion 325 is formed in the front cover 303 or the rear cover 304 illustrated in FIG. 8(A) to 8(C) or 9(A) to 9(C). As illustrated in FIG. 2(A), 2(B), 3(A), or 3(B), the front protection portion 322 provided in the front cover 303 is arranged on the front side surface of the inlet port 343, and the rear protection portion 325 provided in the rear cover 304 is arranged in the rear side surface of the inlet port 343. The temperature detecting portion 452 arranged inside the inlet port 343 is protected by the front protection portion 322 and the rear protection portion 325, so that it is possible to prevent a mechanical damage of the temperature detecting portion 452 caused when the temperature detecting portion 452 collides with something during production or loading on a vehicle.

The inner side surface of the front cover 303 is provided with the protrusion 356. As illustrated in FIG. 7, the protrusion 356 is arranged to face the measurement surface 430 and has a shape extending along an axis of the flow path of the bypass passage. An orifice is formed in the flow path 386 described above using the measurement surface 430 and the protrusion 356 so as to reduce a vortex generated in the measurement target gas 30 and generate a laminar flow. In this embodiment, the bypass passage having the orifice portion is divided into a trench portion and a lid portion which covers the trench to form a flow path having an orifice, and the trench portion is formed through a second resin molding process for forming the housing 302. Then, the front cover 303 having the protrusion 356 is formed through another resin molding process, and the trench is covered by using the front cover 303 as a lid of the trench to form the bypass passage. In the second resin molding process for forming the housing 302, the circuit package 400 having the measurement surface 430 is also fixed to the housing 302. Since formation of the trench having such a complicated shape is performed through a resin molding process, and a protrusion 356 for the orifice is provided in the front cover 303, it is possible to form the flow path 386 of FIG. 7 with high accuracy. In addition, since an arrangement relationship between the trench and the measurement surface 430 or the heat transfer surface exposing portion 436 can be maintained with high accuracy, it is possible to reduce a variation of the product and as a result obtain a high measurement result. Therefore, it is possible to improve productivity.

This is similarly applied to formation of the flow path 387 using the rear cover 304 and the backside of measurement surface 431. The flow path 386 is divided into a trench portion and a lid portion. The trench portion is formed through a second resin molding process that forms the housing 302, and then the rear cover 304 having the protrusion 358 covers the trench, so as to form the flow path 387. If the flow path 387 is formed in this manner, it is possible to form the flow path 386 with high accuracy and improve productivity. In addition, although the orifice is provided in the flow path 387 in this embodiment, the flow path 387 which does not use the protrusion 358 and has no orifice may also be used.

In FIG. 8(B), a notch 323 used for forming the outlet port 352 is provided on the leading end side of the front cover 303. As illustrated in FIG. 2(B), the notch 323 extends the outlet port 352 not only on the right side of the housing 302 but also on the front side of the housing 302. For this reason, a fluid resistance of the entire bypass passage is reduced, and the measurement target gas 30 guided into the bypass passage through the inlet port 350 is increased. Consequently, the measurement accuracy for the flow rate is improved.

3.4 Structure of Terminal Connector 320 and Effects Based Thereon

FIG. 10 is an enlarged view illustrating the terminal connector 320 of the housing 302 of FIGS. 5(A) to 6(B). However, the terminal connector 320 of FIG. 10 is different from that of FIGS. 5(A) to 6(B) in the following reasons. Specifically, in FIGS. 5(A) to 6(B), the inner socket of external terminals 361 are separated from each other. However, in FIG. 10, the inner socket of external terminals 361 are not separated from each other but are connected to each other through the link portion 365. While each of the inner socket of external terminals 361 protruding to the circuit package 400 side of the external terminal 306 is overlapped with or close to the corresponding connection terminals 412, each the external terminal 306 is fixed to the housing 302 through resin molding in the second molding process. In order to prevent deformation or a deviation of arrangement of each external terminal 306, according to an embodiment, the external terminal 306 is fixed to the housing 302 through the resin molding process (second resin molding process to be described below) for forming the housing 302 while the inner socket of external terminals 361 are connected to each other through the link portion 365. Alternatively, the external terminal 306 may be fixed to the housing 302 through the second molding process after the connection terminals 412 and the inner socket of external terminals 361 are fixed.

3.5 Inspection of Finished Product Through First Resin Molding Process

In the embodiment of FIG. 10, the number of terminals provided in the circuit package 400 is larger than the number of inner socket of external terminals 361. Out of the terminals of the circuit package 400, each of the connection terminals 412 is connected to each of the inner socket of external terminal 361, and the terminals 414 are not connected to the inner socket of external terminals 361. That is, although the terminals 414 are provided in the circuit package 400, they are not connected to the inner socket of external terminals 361.

In FIG. 10, in addition to the connection terminal 412 connected to the inner socket of external terminal 361, the terminal 414 not connected to the inner socket of external terminal 361 is provided. After the circuit package 400 is produced through the first resin molding process, it is inspected whether or not the circuit package 400 is appropriately operated, and whether or not an abnormality in electrical connection is generated in the first resin molding process. As a result, it is possible to maintain high reliability for each circuit package 400. The terminal 414 not connected to the inner socket of external terminal 361 is used in such an inspection of the circuit package 400. Since the terminal 414 is not used after the inspection work, these unused terminal 414 may be cut out at the neck portion of the circuit package 400 after the inspection or may be buried in the resin serving as the terminal side fixing portion 362 as illustrated in FIG. 10. By providing the terminal 414 not connected to the inner socket of external terminal 361 in this manner, it is possible to inspect whether or not an abnormality is generated in the circuit package 400 produced through the first resin molding process and maintain high reliability.

3.6 Communication Structure Between Gap 382 Inside Housing 302 and Outside and Effects Based Thereon As illustrated in the partially enlarged view of FIG. 10, a hole 364 is provided in the housing 302. The hole 364 is connected to the opening 309 provided in the inside of the external connector 305 illustrated in FIG. 4(A). According to the embodiment, both sides of the housing 302 are sealed with the front and rear covers 303 and 304. If the hole 364 is not provided, a difference is generated between the air pressure inside the gap 382 and the atmospheric air pressure due to a temperature change of the air inside the gap 382 including the terminal connector 320. It is preferable to reduce such a pressure difference. For this reason, the hole 364 connected to the opening 309 provided in the inside of the external connector 305 is provided inside the gap 382 of the housing 302. The external connector 305 has structure resistant to an adverse effect of water and the like in order to improve reliability of electrical connection. By providing the opening 309 inside the external connector 305, it is possible to prevent intrusion of water and a foreign object such as a contaminant or dust from the opening 309.

4. Fixation of Circuit Package 400 Using Housing 302

4.1 Fixing Structure for Fixing Circuit Package 400 to Housing 302

A fixing structure for fixing the circuit package 400 to the housing 302 will be described using FIGS. 5(A) to 6(B). The circuit package 400 embedded with a flow rate detection circuit 601 (see, FIG. 19) which measures the flow rate of the measurement target gas 30 flowing through the main passage 124 is fixed to the housing 302 having the bypass passage trench. In this embodiment, the flange 312 and the bypass passage trenches 332 and 334 are connected by the upstream-side outer wall 335 and the downstream-side outer wall 336, and a portion used to form the bypass passage trenches 332 and 334 is supported by the flange 312 through the upstream-side outer wall 335 and the downstream-side outer wall 336. It is noted that the upstream-side outer wall 335 is located on the upstream side in the flow of the measurement target gas 30 flowing through the main passage 124, and the downstream-side outer wall 336 is located on the downstream side. The fixing portion 3721 is provided to connect the upstream-side outer wall 335 and the downstream-side outer wall 336, and the fixing portion 3721 envelops the circuit package 400 across the entire circumference, whereby the circuit package 400 is fixed to the housing 302. Further, the gap 382 surrounded by the upstream-side outer wall 335, the downstream-side outer wall 336, and the flange 312 is formed on the flange side of the fixing portion 3721. The bypass passage trenches 332 and 334 are formed on the bypass passage side on the opposite as the flange side of the fixing portion 3721, and a structure in which the measurement target gas 30 is flowed to the bypass passage trenches 332 and 334 is provided. The fixing portion 3721 functions to maintain the airtightness on the bypass passage side of the gap.

The outer wall hollow portion 366 provided on the upstream-side outer wall 335 is used as the fixing portion 3723, whereby the circuit package 400 can be further firmly fixed. The fixing portion 3721 described above envelops the circuit package 400 in a direction along the flow axis of the measurement target gas 30, that is, in a direction along the long axis of the measurement surface 430 in this embodiment so as to connect the upstream-side outer wall 335 and the downstream-side outer wall 336. Meanwhile, the outer wall hollow portion 366 of the upstream-side outer wall 335 envelops the circuit package 400 across the flow axis of the measurement target gas 30. Namely, the fixing portion 3723 envelops the circuit package 400 while being formed so that the enveloping direction is different from that of the fixing portion 3721. Since the fixing portions envelop and fix the circuit package 400 from different directions, the circuit package 400 can be further firmly fixed to the housing 302.

In this embodiment, although the outer wall hollow portion 366 is constituted of a part of the upstream-side outer wall 335, there may be provided a fixing portion which envelops the circuit package 400 in a direction different from that of the fixing portion 3721 using the downstream-side outer wall 336 instead of the upstream-side outer wall 335 in order to increase the fixing force. For example, an end of the circuit package 400 may be enveloped by the downstream-side outer wall 336, or the circuit package 400 may be enveloped by forming a hollow hollowed in the upstream direction in the downstream-side outer wall 336. Alternatively, a protrusion protruding to the upstream direction from the downstream-side outer wall 336 is provided, and the circuit package 400 may be enveloped using the protrusion. In this embodiment, since the outer wall hollow portion 366 is provided in the upstream-side outer wall 335 to envelop the circuit package 400, it is possible to provide an effect of increasing a thermal resistance between the temperature detecting portion 452 and the upstream-side outer wall 335 in addition to fixation of the circuit package 400. Since the outer wall hollow portion 366 envelops and supports a neck portion of a protrusion 424 (see, FIG. 11) having the temperature detecting portion 452, the outer wall hollow portion 366 functions to protect the protrusion 424 (see, FIG. 11) having the temperature detecting portion 452.

The fixing portions 3721 and 3723 each have a thick portion and a thin portion in order to reduce a stress applied to the circuit package 400. As illustrated in FIGS. 5(A) and 5(B), the fixing portion 3721 has a thick portion 4714 and a thin portion 4710. In the formation of the thin portion 4710, a hollow along the direction of the circuit package 400 is provided to thereby reduce thickness of the resin enveloping the circuit package 400. Although a thin portion is further formed on the flange side of the thin portion 4710, the thin portion provided on the flange side of the thin portion 4710 is formed to have a shape in which the thickness of the resin enveloping the circuit package 400 is smaller than the thick portion 4714 but have a shape in which the thickness of the resin enveloping the circuit package 400 is slightly larger than the thin portion 4710. When the thin portion 4714 and the thin portion, provided on the flange side of the thin portion 4710, are provided with respect to the thick portion 4714, the fixing portion 3721 has an effect of enabling to secure a predetermined size of area for enveloping the circuit package 400 and meanwhile reduce the stress applied to the circuit package 400 with respect to the size of the area.

In FIG. 6(B) as a view of the rear surface of FIG. 5(B), the fixing portion 3721 has the thick portion 4714 and a thin portion formed by a hollow 373. As described above, when the thin portion is provided, the fixing portion 3721 has an effect of enabling to secure a predetermined size of area for enveloping the circuit package 400 and meanwhile reduce the stress applied to the circuit package 400 with respect to the size of the area. Thus, the reliability associated with fixation of the circuit package 400 is improved by the structure in which the fixing portion 3721 is constituted of the thick portion and the thin portion. Namely, the airtightness between the circuit package 400 and the fixing portion 3721 is maintained. Further, in the resin molding process, although the stress accompanied with the volumetric shrinkage occurring when the fixing portion 3721 is cooled and solidified is applied from the fixing portion 3721 to the circuit package 400, the stress can be reduced. Furthermore, when the thin portion is provided, movement of resin is suppressed in the resin molding process, and resin temperature is gradually reduced, so that time required for solidifying resin becomes longer. The resin of the fixing portion 3721 becomes easier to flow into unevennesses on the surface of the circuit package 400, and there is an effect that the airtightness between the circuit package 400 and the fixing portion 3721 is improved.

The measurement target gas 30 flows on the bypass passage side of the fixing portion 3721, and if the airtightness between the circuit package 400 and the fixing portion 3721 is broken, moisture and the like may enter inside the gap 382 inside the housing 302. By virtue of the provision of the thin portion, the contact area between the fixing portion 3721 and the resin of the circuit package 400 can be increased, and there are effects that the airtightness is improved, and intrusion of moisture and the like into the gap 382 inside the housing 302 can be further prevented.

In FIGS. 5(B) and 6(B), the upstream-side outer wall 335 has the outer wall hollow portion 366. The outer wall hollow portion 366 acts as the fixing portion 3723 for fixing the circuit package 400 to the housing 302. The fixing portion 3723 has the thick portion 4715 and the thin portion 4716. As with the fixing portion 3721, the fixing portion 3723 can secure a large contact area with the circuit package 400. In addition, since the stress applied from the thin portion 4716 to the circuit package 400 is small, the influence of the stress applied from the fixing portion 3723 to the circuit package 400 can be reduced. Since the measurement target gas 30 flows on the upstream side of the fixing portion 3723, it is important to maintain the airtightness between the fixing portion 3723 and the circuit package 400, and the thin portion 4716 and the thick portion 4715 facilitate securement of the airtightness between the fixing portion 3723 and the circuit package 400.

4.2 Structure of Housing 302 Formed by Resin Molding

Next, fixation of the circuit package 400 to the housing 302 through a resin molding process will be described again with reference to FIGS. 5(A) to 6(B). The circuit package 400 is arranged in and fixed to the housing 302 such that the measurement surface 430 formed on the front surface of the circuit package 400 is arranged in a predetermined position of the bypass passage trench for forming the bypass passage, for example, a link portion between the bypass passage trench on frontside 332 and the bypass passage trench on backside 334 in the embodiment of FIGS. 5(A) to 6(B). A portion for burying and fixing the circuit package 400 into the housing 302 through a resin molding is provided in the side slightly closer to the flange 312 from the bypass passage trench. Although described below using FIG. 16, the circuit package 400 is formed through the first resin molding process. In the circuit package 400 formed through the first resin molding process, when the housing 302 provided with the bypass passage is formed through the second resin molding process, the fixing portion 3721 is formed, and the fixing portion 3721 holds and fixes the circuit package 400 so as to cover the outer circumference of the circuit package 400 formed through the first resin molding process.

As illustrated in FIG. 5(B), a hollow 376 and the thin portion 4710 having a hollow shape are provided on the front side surface of the fixing portion 3721. As illustrated in FIG. 6(B), a hollow 373 acting as a thin portion is formed on the rear side surface of the fixing portion 3721. Those hollows can reduce resin temperature in the molding of the fixing portion 3721 and reduce an amount of shrinkage in which the volume shrinks. This fact can reduce the stress applied to the circuit package 400. When the flow of resin is restricted by a die used to form the hollows described above, the lowering speed of the resin temperature becomes moderate, and it is possible to facilitate entering of resin, forming the fixing portion 3721, deep in the unevennesses provided on the surface of the circuit package 400.

The entire surface of the circuit package 400 is not covered by a resin used to form the housing 302, but a portion where the outer wall of the circuit package 400 is exposed is provided in the flange 312 side of the fixing portion 3721. In the embodiment of FIGS. 5(A) to 6(B), the area of a portion exposed from the resin of the housing 302 but not enveloped by the housing 302 is larger than the area of a portion enveloped by the resin of the housing 302 out of the outer circumferential surface of the circuit package 400. Furthermore, a portion of the measurement surface 430 of the circuit package 400 is also exposed from the resin of the housing 302.

Since the circumference of the circuit package 400 is enveloped in the second resin molding process for forming the housing 302 by forming the hollows on the front and rear surfaces of the fixing portion 3721 which covers the outer wall of the circuit package 400 across the entire circumference in a thin band shape, it is possible to alleviate an excessive stress concentration caused by the volumetric shrinkage in the course of solidification of the fixing portion 3721. The action of the excessive stress concentration may adversely affect the circuit package 400.

4.3 Improvement of Adherence Between Housing 302 and Circuit Package 400

In order to more robustly fix the circuit package 400 with a small area by reducing the area of a portion enveloped by the resin of the housing 302 of the outer circumferential surface of the circuit package 400, it is preferable to increase adherence of the circuit package 400 to the outer wall in the fixing portion 3721. When a thermoplastic resin is used to form the housing 302, it is preferable that the thermoplastic resin be penetrated into fine unevennesses on the surface of the circuit package 400 while it has low viscosity, that is, it has high temperature, and the thermoplastic resin be solidified while it is penetrated into the fine unevennesses on the surface. In the resin molding process for forming the housing 302, it is preferable that the inlet port of the thermoplastic resin be provided in the fixing portion 3721 or in the vicinity thereof. The viscosity of the thermoplastic resin increases as the temperature decreases, so that it is solidified. Thus, by flowing the thermoplastic resin having a high temperature into the fixing portion 3721 or from the vicinity thereof, it is possible to solidify the thermoplastic resin having low viscosity while it abuts on the surface of the circuit package 400. When the hollow 376, the thin portion 4710 which is a hollow, and the hollow 373 are formed in the fixing portion 3721, an obstacle portion restricting a flow of the thermoplastic resin is formed by the die used to form these hollows, and moving speed of the thermoplastic resin in the fixing portion 3721 is reduced. As a result, a temperature decrease of the thermoplastic resin is suppressed, and a low viscosity state is maintained, so that the adherence between the circuit package 400 and the fixing portion 3721 is improved.

By roughening the surface of the circuit package 400, it is possible to improve the adherence between the circuit package 400 and the fixing portion 3721. As a method of roughening the surface of the circuit package 400, there is known a roughening method for forming fine unevennesses on the surface of the circuit package 400, such as a satin-finish treatment, after forming the circuit package 400 through the first resin molding process. As the roughening method for forming fine unevennesses on the surface of the circuit package 400, further, for example, the roughening may be achieved using sand blasting. Furthermore, the roughening may be achieved through a laser machining.

As another roughening method, an uneven sheet is attached on an inner surface of the die used in the first resin molding process, and the resin is pressed to the die having the sheet on the surface. Even using this method, it is possible to form and roughen fine unevennesses on the surface of the circuit package 400. Alternatively, unevennesses may be attached directly on an inner side of the die for forming the circuit package 400 to roughen the surface of the circuit package 400. The surface portion of the circuit package 400 for such roughening is at least a portion where the fixing portion 3721 is provided. In addition, the adherence can be further improved by roughening a surface portion of the circuit package 400 where the outer wall hollow portion 366 is provided.

When the unevenness machining is performed for the surface of the circuit package 400 using the aforementioned sheet, the depth of the trench depends on the thickness of the sheet. If the thickness of the sheet increases, the molding of the first resin molding process becomes difficult, so that the thickness of the sheet has a limitation. If the thickness of the sheet decreases, the depth of the unevenness provided on the sheet in advance has a limitation. For this reason, when the aforementioned sheet is used, it is preferable that the depth of the unevenness between the bottom and the top of the unevenness be set to 10 μm or larger and 20 μm or smaller. In the depth smaller than 10 μm, the adherence effect is degraded. The depth larger than 20 μm is difficult to obtain from the aforementioned thickness of the sheet.

In roughening methods other than the aforementioned method of using the sheet, it is preferable to set a thickness of the resin in the first resin molding process for forming the circuit package 400 to 2 mm or smaller. For this reason, it is difficult to increase the depth of the unevenness between the bottom and the top of the unevenness to 1 mm or larger. Conceptually, it is anticipated that adherence between the resin that covers the circuit package 400 and the resin used to form the housing 302 increases as the depth of the unevenness between the bottom and the top of the unevenness on the surface of the circuit package 400 increases. However, for the reason described above, the depth of the unevenness between the bottom and the top of the unevenness is preferably set to 1 mm or smaller. That is, if the unevenness having a thickness of 10 μm or larger and 1 mm or smaller is provided on the surface of the circuit package 400, it is preferable to increase adherence between the resin that covers the circuit package 400 and the resin used to form the housing 302.

A thermal expansion coefficient is different between the thermosetting resin used to form the circuit package 400 and the thermoplastic resin used to form the housing 302 having the fixing portion 3721. It is preferable to prevent an excessive stress generated from this difference of the thermal expansion coefficient from being applied to the circuit package 400. The stress applied to the circuit package 400 can be reduced by providing the hollow 373, the thin portion 4710 which is a hollow, and the hollow 376.

By forming the fixing portion 3721 that envelops the outer circumference of the circuit package 400 in a band shape and narrowing the width of the band, it is possible to alleviate a stress caused by a difference of the thermal expansion coefficient applied to the circuit package 400. A width of the band of the fixing portion 3721 is set to 10 mm or smaller, and preferably 8 mm or smaller. In this embodiment, since the outer wall hollow portion 366 as a part of the upstream-side outer wall 335 of the housing 302 as well as the fixing portion 3721 envelops the circuit package 400 to fix the circuit package 400, it is possible to further reduce the width of the band of the fixing portion 3721. The circuit package 400 can be fixed, for example, if the width is set to 3 mm or larger.

In order to reduce a stress caused by the difference of the thermal expansion coefficient, a portion covered by the resin used to form the housing 302 and an exposed portion without covering are provided on the surface of the circuit package 400. A plurality of portions where the surface of the circuit package 400 is exposed from the resin of the housing 302 are provided, and one of them is to the measurement surface 430 having the heat transfer surface exposing portion 436 described above. In addition, a portion exposed to a part of the flange 312 side relative to the fixing portion 3721 is provided. Furthermore, the outer wall hollow portion 366 is formed to expose a portion of the upstream side relative to the outer wall hollow portion 366, and this exposed portion serves as a support portion that supports the temperature detecting portion 452. A gap is formed such that a portion of the outer surface of the circuit package 400 in the flange 312 side relative to the fixing portion 3721 surrounds the circuit package 400 across its outer circumference, particularly, the side facing the flange 312 from the downstream side of the circuit package 400 and further across the upstream side of the portion close to the terminal of the circuit package 400. Since the gap is formed around the portion where the surface of the circuit package 400 is exposed, it is possible to reduce the heat amount transferred to the circuit package 400 through the flange 312 from the main passage 124 and suppress degradation of measurement accuracy caused by the heat.

A gap is formed between the circuit package 400 and the flange 312, and this gap serves as a terminal connector 320. The connection terminal 412 of the circuit package 400 and the inner socket of external terminal 361 positioned in the housing 302 side of the external terminal 306 are electrically connected to each other using this terminal connector 320 through spot welding, laser welding, and the like. The gap of the terminal connector 320 can suppress heat transfer from the housing 302 to the circuit package 400 as described above and is provided as a space that can be used to perform a connection work between the connection terminal 412 of the circuit package 400 and the inner socket of external terminal 361 of the external terminal 306.

4.4 Formation of Housing 302 Through Second Resin Molding Process and Improvement of Measurement Accuracy In the housing 302 illustrated in FIGS. 5(A) to 6(B) described above, the circuit package 400 having the air flow sensing portion 602 or the processing unit 604 is manufactured through the first resin molding process. Then, the housing 302 having, for example, the bypass passage trench on frontside 332 or the bypass passage trench on backside 334 for forming the bypass passage where the measurement target gas 30 flows are manufactured through the second resin molding process. Through this second resin molding process, the circuit package 400 is embedded into the resin of the housing 302 and is fixed to the inside of the housing 302 through resin molding. As a result, the air flow sensing portion 602 performs heat transfer with the measurement target gas 30, so that a configuration relationship such as a positional relationship or a directional relationship between the heat transfer surface exposing portion 436 for measuring the flow rate and the bypass passage including, for example, the bypass passage trench on frontside 332 or the bypass passage trench on backside 334 can be maintained with remarkably high accuracy. In addition, it is possible to suppress an error or deviation generated for each production of the circuit package 400 to a very small value. When the relationship between the circuit package 400 and the bypass passage through which the measurement target gas 30 is flowed is fixed in the second resin molding process, this relationship does not then change. When fixing is performed with an elastic adhesive or the like as in the conventional case, the relationship slightly changes after the production. Like this embodiment, when the relationship between the circuit package 400 and the bypass passage through which the measurement target gas 30 is flowed does not change, very high accuracy can be thereafter maintained by correcting variation after the production. As a result, it is possible to remarkably improve the measurement accuracy of the circuit package 400. For example, compared to a conventional method in which fixation is performed using an adhesive, it is possible to improve measurement accuracy twice or more. Since the thermal flow meter 300 is typically manufactured in large quantities, it is difficult to perform adhesion using an adhesive while strict measurement is performed in individual production processes, and there is a limitation in improvement of measurement accuracy. However, if the circuit package 400 is manufactured through the first resin molding process as in this embodiment, and the bypass passage is then formed in the second resin molding process for forming the bypass passage where the measurement target gas 30 flows while the circuit package 400 and the bypass passage are fixed, it is possible to remarkably reduce a variation of the measurement accuracy and remarkably improve the measurement accuracy of each thermal flow meter 300. This similarly applies to the following embodiments including the embodiment of FIG. 7 as well as the embodiment of FIG. 5(A), 5(B), 6(A), or 6(B).

Further referring to the embodiment of, for example, FIG. 5(A), 5(B), 6(A), or 6(B), it is possible to fix the circuit package 400 to the housing 302 such that a relationship between the bypass passage trench on frontside 332, the bypass passage trench on backside 334, and the heat transfer surface exposing portion 436 is set to a specific relationship. As a result, in each of the thermal flow meters 300 produced in large quantities, a positional relationship or a configuration relationship between the heat transfer surface exposing portion 436 of each circuit package 400 and the bypass passage can be maintained with remarkably high accuracy. Since the bypass passage trench where the heat transfer surface exposing portion 436 of the circuit package 400 is fixed, for example, the bypass passage trench on frontside 332 and the bypass passage trench on backside 334 can be formed with remarkably high accuracy. In order to form the bypass passage in this bypass passage trench, operation of covering both sides of the housing 302 using the front or rear cover 303 or 304 is required. This work is very simple and is a work process having a few factors of degrading the measurement accuracy. In addition, the front or rear cover 303 or 304 is produced through a resin molding process having high formation accuracy. Therefore, it is possible to form the bypass passage provided in a specific relationship with the heat transfer surface exposing portion 436 of the circuit package 400 with high accuracy. In this manner, it is possible to obtain high productivity in addition to improvement of measurement accuracy.

In comparison, in the related art, the thermal flow meter was produced by fabricating the bypass passage and then bonding the measuring portion for measuring the flow rate to the bypass passage using an adhesive. Such a method of using an adhesive is disadvantageous because a thickness of the adhesive is irregular, and a position or angle of the adhesive is different in each product. For this reason, there was a limitation in improvement of the measurement accuracy. If this work is performed in mass production, it is further difficult to improve the measurement accuracy.

In the embodiment according to the invention, first, the circuit package 400 having the air flow sensing portion 602 is produced through a first resin molding process, and the circuit package 400 is then fixed through resin molding while the bypass passage trench for forming the bypass passage through resin molding is formed through a second resin molding process. As a result, it is possible to form the shape of the bypass passage trench and fix the air flow sensing portion 602 of the flow rate detection circuit 601 to the bypass passage trench with significantly high accuracy.

A portion relating to the measurement of the flow rate, such as the heat transfer surface exposing portion 436 of the air flow sensing portion 602 or the measurement surface 430 installed in the heat transfer surface exposing portion 436, is formed on the surface of the circuit package 400. Then, the measurement surface 430 and the heat transfer surface exposing portion 436 are exposed from the resin used to form the housing 302. That is, the heat transfer surface exposing portion 436 and the measurement surface 430 around the heat transfer surface exposing portion 436 are not covered by the resin used to form the housing 302. The measurement surface 430 formed through the resin molding of the circuit package 400 or the heat transfer surface exposing portion 436 is directly used even after the resin molding of the housing 302 to measure a flow rate of the thermal flow meter 300 or a temperature. As a result, the measurement accuracy is improved.

In the embodiment according to the invention, the circuit package 400 is integratedly formed with the housing 302 to fix the circuit package 400 to the housing 302 having the bypass passage. Therefore, it is possible to fix the circuit package 400 to the housing 302 with a small fixation area. That is, it is possible to increase the surface area of the circuit package 400 which does not make contact with the housing 302. The surface of the circuit package 400 which does not make contact with the housing 302 is exposed to, for example, a gap. The heat of the intake pipe is transferred to the housing 302 and is then transferred from the housing 302 to the circuit package 400. Even if the contact area between the housing 302 and the circuit package 400 is reduced instead of enveloping the entire surface or most of the surface of the circuit package 400 with the housing 302, it is possible to maintain high reliability with high accuracy and fix the circuit package 400 to the housing 302. For this reason, it is possible to suppress heat transfer from the housing 302 to the circuit package 400 and suppress a decrease of the measurement accuracy due to the heat transfer.

In the embodiment illustrated in FIG. 5(A), 5(B), 6(A), or 6(B), the area A of the exposed surface of the circuit package 400 can be set to be equal to or larger than the area B covered by a molding material used to form the housing 302. In the embodiment, the area A is larger than the area B. As a result, it is possible to suppress heat transfer from the housing 302 to the circuit package 400. In addition, it is possible to reduce a stress generated by a difference between a thermal expansion coefficient of the thermosetting resin used to form the circuit package 400 and a thermal expansion coefficient of the thermoplastic resin used to form the housing 302.

4.5 Fixation of Circuit Package 400 Through Second Resin Molding Process and Effects Based Thereon In FIGS. 11(A) to 11(C), the hatching portion indicates a fixation surface 432 and a fixation surface 434 for covering the circuit package 400 using the thermoplastic resin used in the second resin molding process to fix the circuit package 400 to the housing 302 in the second resin molding process. As described above in relation to FIG. 5(A), 5(B), 6(A), or 6(B), it is important to maintain high accuracy to provide a specific relationship between the measurement surface 430, the heat transfer surface exposing portion 436 provided in the measurement surface 430, and the shape of the bypass passage. In the second resin molding process, the bypass passage is formed, and the circuit package 400 is fixed to the housing 302 which forms the bypass passage. Therefore, it is possible to maintain a relationship between the bypass passage, the measurement surface 430, and the heat transfer surface exposing portion 436 with significantly high accuracy. That is, since the circuit package 400 is fixed to the housing 302 in the second resin molding process, it is possible to position and fix the circuit package 400 into the die used to form the housing 302 having the bypass passage with high accuracy. By injecting a thermoplastic resin having a high temperature into this die, the bypass passage is formed with high accuracy, and the circuit package 400 is fixed by the fixing portion 3721 and the fixing portion 3723 with high accuracy.

In this embodiment, the entire surface of the circuit package 400 is not a fixation surface 432 covered by the resin used to form the housing 302, but the front surface is exposed to the connection terminal 412 side of the circuit package 400. That is, a portion not covered by the resin used to form the housing 302 is provided. In the embodiment illustrated in FIGS. 11(A) to 11(C), out of the front surface of the circuit package 400, the area that is not enveloped by the resin used to form the housing 302 but is exposed from the resin used to form the housing 302 is larger than the area of the fixation surfaces 432 and 434 enveloped by the resin used to form the housing 302.

A thermal expansion coefficient is different between the thermosetting resin used to form the circuit package 400 and the thermoplastic resin used to form the housing 302 having the fixing portion 3721. It is preferable to prevent a stress caused by this difference of the thermal expansion coefficient from being applied to the circuit package 400 as long as possible. By reducing the front surface of the circuit package 400 and the fixation surface 432, it is possible to reduce influence based on the difference of the thermal expansion coefficient. For example, it is possible to reduce the fixation surface 432 on the front surface of the circuit package 400 by providing a band shape having a width L. Further, as described above, by virtue of the provision of the thick portion and the thin portion in the fixing portions 3721 and 3723 covering the fixation surface 432, the stress applied to the surface of the circuit package 400 can be suppressed based on the thin portion, and it is possible to reduce the application of a large stress to the circuit package 400. When the fixation surface 432 is formed to have a relatively large width to improve the airtightness between the fixing portion 3723 and the fixation surface 432 of the circuit package 400, the influence of the stress on the circuit package 400 can also be reduced by suppression of the stress using the thin portion. The circuit package 400 is embedded with the flow rate detection circuit 601, and when a large stress is applied to the circuit package 400, the flow rate detection circuit 601 is adversely affected, so that the measurement accuracy of the flow rate may be lowered, or a failure may occur in operation itself depending on the situation. Such an influence can be reduced.

It is possible to increase a mechanical strength of the protrusion 424 by providing the fixation surface 432 in the neck portion of the protrusion 424. It is possible to more robustly fix the circuit package 400 and the housing 302 to each other by providing, on the front surface of the circuit package 400, a band-shaped fixation surface along a flow axis of the measurement target gas 30 and a fixation surface across the flow axis of the measurement target gas 30. On the fixation surface 432, a portion surrounding the circuit package 400 in a band shape having a width L along the measurement surface 430 is the fixation surface along the flow axis of the measurement target gas 30 described above, and a portion which covers the neck portion of the protrusion 424 is the fixation surface across the flow axis of the measurement target gas 30. Both the fixation surfaces are fixed to the housing 302 while being enveloped by the fixing portion 3721 or 3723 having the thick portion and the thin portion.

In FIGS. 11(A) to 11(C), the circuit package 400 is formed through the first resin molding process as described above. The hatching portion in the appearance of the circuit package 400 indicates the fixation surface 432 and the fixation surface 434 where the circuit package 400 is covered by the resin used in the second resin molding process when the housing 302 is formed through the second resin molding process after the circuit package 400 is manufactured through the first resin molding process. FIG. 11(A) is a left side view illustrating the circuit package 400, FIG. 11(B) is a front view illustrating the circuit package 400, and the FIG. 11(C) is a rear view illustrating the circuit package 400. The circuit package 400 is embedded with the air flow sensing portion 602 or the processing unit 604 described below, and they are integratedly molded using a thermosetting resin. On the surface of the circuit package 400 of FIG. 11(B), the measurement surface 430 serving as a plane for flowing the measurement target gas 30 is formed in a shape extending in a flow direction of the measurement target gas 30. In this embodiment, the measurement surface 430 has a rectangular shape extending in the flow direction of the measurement target gas 30. The measurement surface 430 is formed to be thinner than other portions as illustrated in FIG. 11(A), and a part thereof is provided with the heat transfer surface exposing portion 436. The embedded air flow sensing portion 602 performs heat transfer to the measurement target gas 30 through the heat transfer surface exposing portion 436 to measure a condition of the measurement target gas 30 such as a flow velocity of the measurement target gas 30 and output an electric signal representing the flow rate of the main passage 124.

In order to measure a condition of the measurement target gas 30 with high accuracy using the embedded air flow sensing portion 602 (refer to FIGS. 19 and 20), the gas flowing through the vicinity of the heat transfer surface exposing portion 436 preferably makes a laminar flow having a little vortex. For this reason, it is preferable that there be no height difference between the flow path side surface of the heat transfer surface exposing portion 436 and the plane of the measurement surface 430 that guides the gas. In this configuration, it is possible to suppress an irregular stress or a distortion from being applied to the air flow sensing portion 602 while maintaining high flow rate measurement accuracy. It is noted that the aforementioned height difference may be provided if it does not affect the flow rate measurement accuracy.

On the rear surface of the measurement surface 430 of the heat transfer surface exposing portion 436, a press imprint 442 of the die which supports an internal substrate or plate during the resin molding of the circuit package 400 remains as illustrated in FIG. 11(C). The heat transfer surface exposing portion 436 is used to perform heat exchange with the measurement target gas 30. In order to accurately measure a condition of the measurement target gas 30, it is preferable to appropriately perform heat transfer between the air flow sensing portion 602 and the measurement target gas 30. For this reason, it is necessary to avoid a part of the heat transfer surface exposing portion 436 from being covered by the resin in the first resin molding process. Dies are installed in both the heat transfer surface exposing portion 436 and the backside of measurement surface 431 as a rear surface thereof, and an inflow of the resin to the heat transfer surface exposing portion 436 is prevented using this die. A press imprint 442 having a concave shape is formed on the rear surface of the heat transfer surface exposing portion 436. In this portion, it is preferable to arrange a device serving as the air flow sensing portion 602 or the like in the vicinity to discharge the heat generated from the device to the outside as much as possible. The formed concave portion is less influenced by the resin and easily discharges heat.

A semiconductor diaphragm constituting the air flow sensing portion 602 is arranged in the heat transfer surface exposing portion 436, and the semiconductor diaphragm has a gap on the rear surface. If the gap is covered, the semiconductor diaphragm is deformed, and the measurement accuracy is degraded due to a change of the pressure inside the gap caused by a change of the temperature. For this reason, in this embodiment, an opening 438 communicating with the gap of the rear surface of the semiconductor diaphragm is provided on the front surface of the circuit package 400, and a link channel for linking the gap of the rear surface of the semiconductor diaphragm and the opening 438 is provided inside the circuit package 400. It is noted that the opening 438 is provided in the portion not hatched in FIGS. 11(A) to 11(C) in order to prevent the opening 438 from being covered by the resin through the second resin molding process.

The opening 438 is formed through the first resin molding process. An inflow of the resin to the portion of the opening 438 is suppressed by matching dies to both a portion of the opening 438 and a rear surface thereof and pressing the dies, and the opening 438 is formed. Formation of the opening 438 and the link channel which connects the gap on the rear surface of the semiconductor diaphragm and the opening 438 will be described below.

In the circuit package 400, the press imprint 442 remains on the rear surface of the circuit package 400 where the heat transfer surface exposing portion 436 is formed. In the first resin molding process, in order to prevent an inflow of the resin to the heat transfer surface exposing portion 436, a die such as an insertion die is installed in a portion of the heat transfer surface exposing portion 436, and a die is installed in a portion of the press imprint 442 opposite thereto, so that an inflow of the resin to the heat transfer surface exposing portion 436 is suppressed. By forming a portion of the heat transfer surface exposing portion 436 in this manner, it is possible to measure the flow rate of the measurement target gas 30 with significantly high accuracy. Since the portion of the press imprint 442 has no or little resin in the second resin molding process, the heat radiation effect is large. When a lead is used as the second plate 536, there is an effect that heat generated in circuits adjacent through the lead can be radiated.

Figure 12:
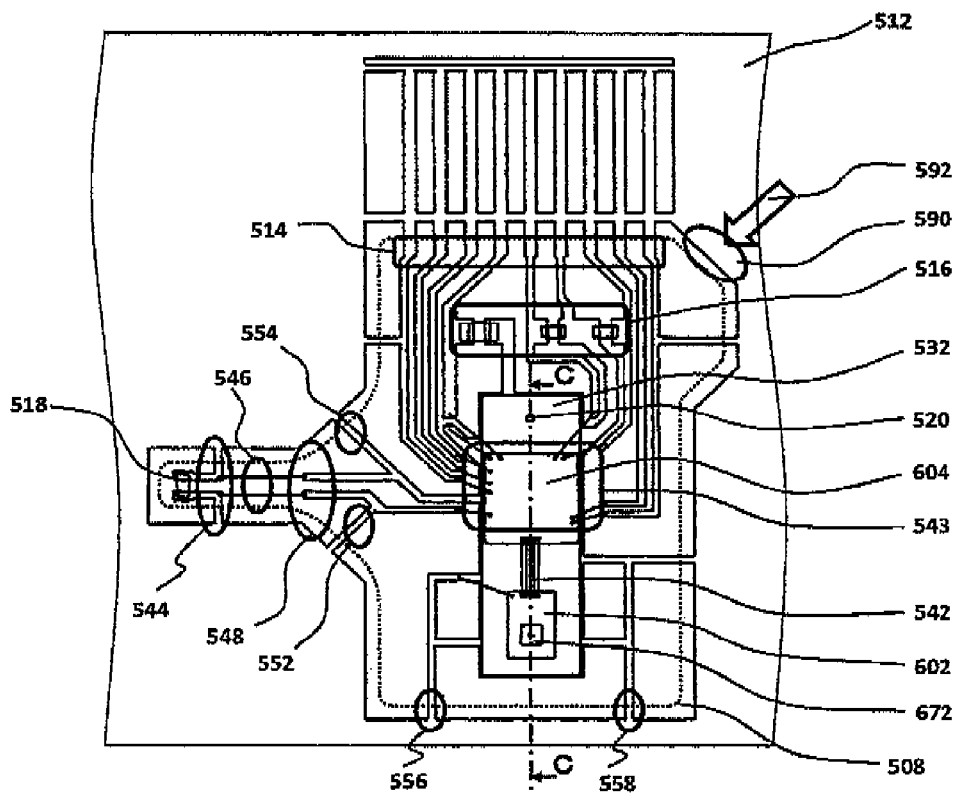
FIG. 12 is a diagram illustrating a state that circuit components are mounted on a frame of the circuit package.

5. Mounting of Circuit Components to Circuit Package 5.1 Frame of Circuit Package and Mounting of Circuit Components FIG. 12 illustrates a frame 512 of the circuit package 400 and a mounting state of a chip as a circuit component 516 mounted on the frame 512. It is noted that the dotted line 508 indicates a portion covered by the die used to mold the circuit package 400. A lead 514 is mechanically connected to the frame 512, and a plate 532 is mounted in the center of the frame 512. A chip-like air flow sensing portion 602 and a processing unit 604 as a larger scale integrated (LSI) circuit are mounted on the plate 532. A diaphragm 672 is provided in the air flow sensing portion 602. Each terminal of the air flow sensing portion 602 described below and the processing unit 604 are connected using a wire 542. Moreover, each terminal of the processing unit 604 and a corresponding lead 514 are connected using a wire 543. In addition, the lead 514 positioned between a portion corresponding to the connection terminal of the circuit package 400 and the plate 532 is connected to the chip-like circuit component 516 therebetween.

The air flow sensing portion 602 having the diaphragm 672 is arranged in the most leading end side when the circuit package 400 is obtained in this manner. The processing unit 604 is arranged in the side corresponding to the connection terminal for the air flow sensing portion 602 in an LSI state. In addition, a connection wire 543 is arranged in the terminal side of the processing unit 604. By sequentially arranging the air flow sensing portion 602, the processing unit 604, the wire 543, the circuit component 516, and the connection lead 514 in this order from the leading end side of the circuit package 400 to the connection terminal, the entire circuit package 400 becomes simple and concise.

A thick lead is provided to support the plate 532, and this lead is fixed to the frame 512 using the lead 556 or 558. It is noted that a lead surface having the same area as that of the plate 532 connected to the thick lead is provided on the lower surface of the plate 532, and the plate 532 is mounted on the lead surface. This lead surface is grounded. As a result, it is possible to suppress noise by commonly grounding the circuit of the air flow sensing portion 602 or the processing unit 604 using the lead surface, so that measurement accuracy of the measurement target gas 30 is improved. In addition, a lead 544 is provided in the upstream side of the flow path from the plate 532, that is, so as to protrude along an axis directed across the axis of the air flow sensing portion 602, the processing unit 604, or the circuit component 516 described above. A temperature detection element 518, for example, a chip-like thermistor is connected to this lead 544. In addition, a lead 548 is provided in the vicinity of the processing unit 604 which is a base of the protrusion, and the leads 544 and 548 are electrically connected using a thin connection line 546. As the leads 548 and 544 are directly connected, the heat is transferred to the temperature detection element 518 through the leads 548 and 544, so that it may be difficult to accurately measure a temperature of the measurement target gas 30. For this reason, by connecting a wire having a small cross-sectional area and a large thermal resistance, it is possible to increase a thermal resistance between the leads 548 and 544. As a result, it is possible to improve temperature measurement accuracy of the measurement target gas 30 so as to prevent influence of the heat from reaching the temperature detection element 518.

The lead 548 is fixed to the frame 512 through the lead 552 or 554. A connection portion between the lead 552 or 554 and the frame 512 is fixed to the frame 512 while it is inclined against the protruding direction of the protruding temperature detection element 518, and the die is also inclined in this area. As the molding resin flows along in this inclination in the first resin molding process, the molding resin of the first resin molding process smoothly flows to the leading end portion where the temperature detection element 518 is provided, so that reliability is improved.

In FIG. 12, an arrow 592 indicates a resin injection direction. The lead frame where a circuit component is mounted is covered by the die, and a pressed fitting hole 590 for resin injection to the die is provided in a circled position, so that a thermosetting resin is injected into the die along the direction of the arrow 592. The circuit component 516 or the temperature detection element 518 and the lead 544 for holding the temperature detection element 518 are provided along the direction of the arrow 592 from the pressed fitting hole 590. In addition, the plate 532, the processing unit 604, and the air flow sensing portion 602 are arranged in a direction close to the arrow 592. In this arrangement, the resin smoothly flows in the first resin molding process. In the first resin molding process, a thermosetting resin is used, so that it is important to widen the resin before solidification. For this reason, arrangement of a circuit component of the lead 514 or a wire and a relationship between the pressed fitting hole 590 and the injection direction become important.

Figure 13:
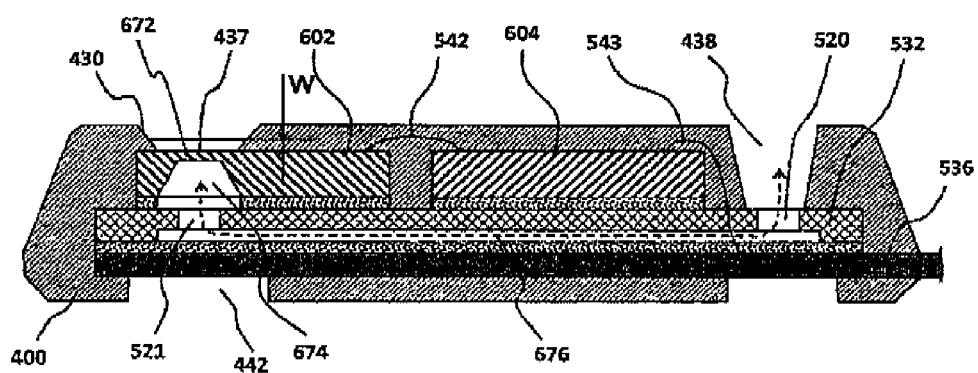
FIG. 13 is an explanatory diagram illustrating a diaphragm and a link channel that connects an opening and a gap inside the diaphragm.

5.2 Structure for Connecting Gap on Rear Surface of Diaphragm and Opening and Effects Based Thereon FIG. 13 is a diagram illustrating a part of the cross section taken along a line C-C of FIG. 12 for describing a communication hole 676 which connects a gap 674 provided inside the diaphragm 672 and the air flow sensing portion (flow rate detecting element) 602 and the hole 520.

As described below, the air flow sensing portion 602 for measuring the flow rate of the measurement target gas 30 is provided with a diaphragm 672, and a gap 674 is provided on the rear surface of the diaphragm 672. Although not illustrated, the diaphragm 672 is provided with an element for exchanging heat with the measurement target gas 30 and measuring the flow rate thereby. If the heat is transferred to the elements formed in the diaphragm 672 through the diaphragm 672 separately from the heat exchange with the measurement target gas 30, it is difficult to accurately measure the flow rate. For this reason, it is necessary to increase a thermal resistance of the diaphragm 672 and form the diaphragm 672 as thin as possible.

The air flow sensing portion (flow rate detection element) 602 is buried and fixed into thermosetting resin of the circuit package 400 formed through the first resin molding process such that the heat transfer surface 437 of the diaphragm 672 is exposed. The surface of the diaphragm 672 is provided with the elements (not illustrated) described above, and the elements perform heat transfer with the measurement target gas 30 (not illustrated) through the heat transfer surface 437 on the surfaces of the elements in the heat transfer surface exposing portion 436 corresponding to the diaphragm 672. The heat transfer surface 437 may be provided on the surface of each element or may be provided with a thin protection film thereon. It is preferable that heat transfer between the elements and the measurement target gas 30 be smoothly performed, and direct heat transfer between the elements should be reduced as much as possible.

A portion of the air flow sensing portion (flow rate detection element) 602 where the elements are provided is arranged in the heat transfer surface exposing portion 436 of the measurement surface 430, and the heat transfer surface 437 is exposed from the resin used to form the measurement surface 430. The outer circumference of the air flow sensing portion (flow rate detection element) 602 is covered by the thermosetting resin used in the first resin molding process for forming the measurement surface 430. If only the side face of the air flow sensing portion (flow rate detection element) 602 is covered by the thermosetting resin, and the surface side of the outer circumference of the air flow sensing portion (flow rate detection element) 602 is not covered by the thermosetting resin, a stress generated in the resin used to form the measurement surface 430 is received only by the side face of the air flow sensing portion (flow rate detection element) 602, so that a distortion may generated in the diaphragm 672, and characteristics may be deteriorated. The distortion of the diaphragm 672 is reduced by covering the outer circumference portion of the air flow sensing portion (flow rate detection element) 602 with the thermosetting resin as illustrated in FIG. 13. Meanwhile, if a height difference between the heat transfer surface 437 and the measurement surface 430 where the measurement target gas 30 flows is large, the flow of the measurement target gas 30 is disturbed, so that measurement accuracy is degraded. Therefore, it is preferable that a height difference W between the heat transfer surface 437 and the measurement surface 430 where the measurement target gas 30 flows be small.

The diaphragm 672 is formed thin in order to suppress heat transfer between each element, and a gap 674 in the rear surface of the air flow sensing portion (flow rate detection element) 602 is obtained. If this gap 674 is sealed, a pressure of the gap 674 formed on the rear surface of the diaphragm 672 changes depending on a temperature change. As a pressure difference between the gap 674 and the surface of the diaphragm 672 increases, the diaphragm 672 receives the pressure, and a distortion is generated, so that high accuracy measurement becomes difficult. For this reason, a hole 520 connected to the opening 438 (refer to FIGS. 11(A), 11(B), 11(C), 15(A), and 15(B)) opened to the outside is provided in the plate 532, and a communication hole 676 that connects this hole 520 and the gap 674 is provided. This communication hole 676 consists of, for example, a pair of plates including first and second plates 534 and 536. The first plate 534 is provided with holes 520 and 521 and a trench for forming the communication hole 676. The communication hole 676 is formed by covering the trench and the holes 520 and 521 with the second plate 536. Using the communication hole 676 and the hole 520, the pressures applied to the front and rear surfaces of the diaphragm 672 becomes approximately equal, so that the measurement accuracy is improved.

As described above, the communication hole 676 can be formed by covering the trench and the holes 520 and 521 with the second plate 536. Alternatively, the lead frame may be used as second plate 536. As described in relation to FIG. 12, the diaphragm 672 and the LSI circuit serving as the processing unit 604 are provided on the plate 532. A lead frame for supporting the plate 532 where the diaphragm 672 and the processing unit 604 are mounted is provided thereunder. Therefore, using the lead frame, the structure becomes simpler. In addition, the lead frame may be used as a ground electrode. If the lead frame serves as the second plate 536, and the communication hole 676 is formed by covering the holes 520 and 521 formed in the first plate 534 using the lead frame and covering the trench formed in the first plate 534 using the lead frame in this manner, it is possible to simplify the entire structure. In addition, it is possible to reduce influence of noise from the outside of the diaphragm 672 and the processing unit 604 because the lead frame serves as a ground electrode.

In the circuit package 400 illustrated in FIGS. 11(A) to 11(C), the press imprint 442 remains on the rear surface of the circuit package 400 where the heat transfer surface exposing portion 436 is formed. In the first resin molding process, in order to prevent an inflow of the resin to the heat transfer surface exposing portion 436, a die such as an insertion die is installed in a portion of the heat transfer surface exposing portion 436, and a die is installed in a portion of the press imprint 442 opposite thereto, so that an inflow of the resin to the heat transfer surface exposing portion 436 is suppressed. By forming a portion of the heat transfer surface exposing portion 436 in this manner, it is possible to measure the flow rate of the measurement target gas 30 with significantly high accuracy.

Figure 14:
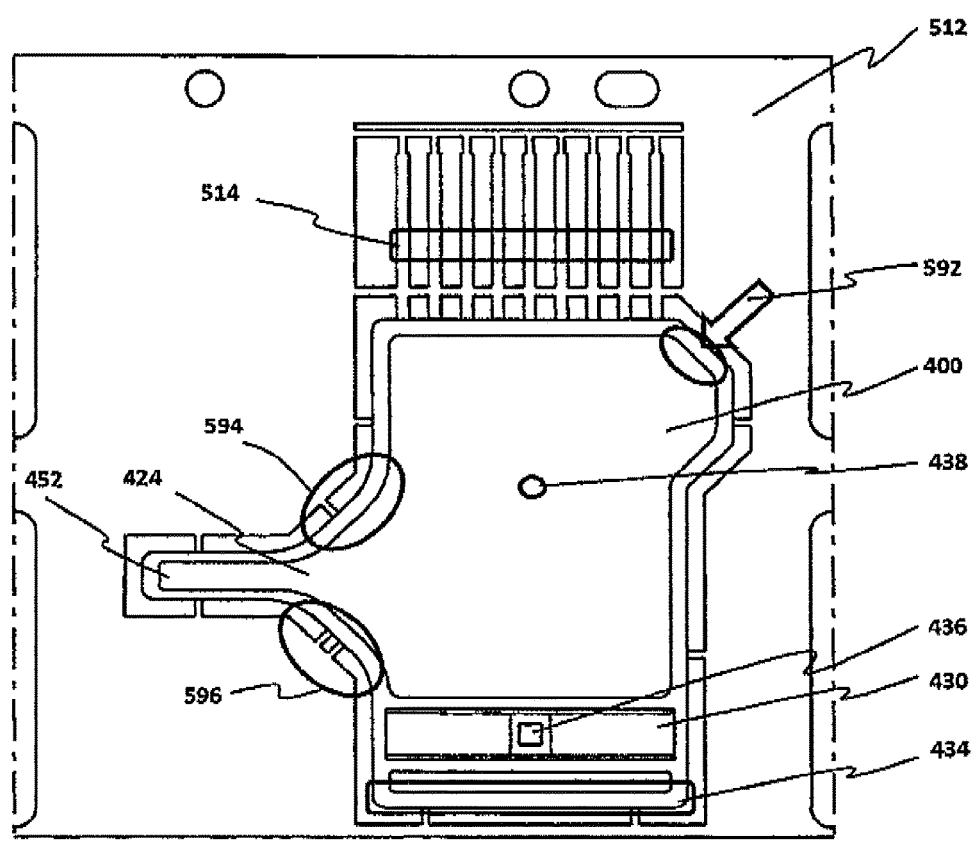
FIG. 14 is a diagram illustrating a condition of the circuit package after a first resin molding process.

FIG. 14 illustrates a state that the frame of FIG. 12 is molded with a thermosetting resin through the first resin molding process and is covered by the thermosetting resin. Through this molding, the measurement surface 430 is formed on the front surface of the circuit package 400, and the heat transfer surface exposing portion 436 is provided on the measurement surface 430. In addition, the gap 674 on the rear surface of the diaphragm 672 arranged in the heat transfer surface exposing portion 436 is connected to the opening 438. The temperature detecting portion 452 for measuring a temperature of the measurement target gas 30 is provided in the leading end of the protrusion 424, and the temperature detection element 518 (see, FIG. 12) is embedded inside. As illustrated in FIG. 12, inside the protrusion 424, in order to suppress heat transfer, a lead for extracting the electric signal of the temperature detection element 518 is segmented, and a connection line 546 having a large thermal resistance is arranged. As a result, it is possible to suppress heat transfer from the neck portion of the protrusion 424 to the temperature detecting portion 452 and influence from the heat.

A slope portion 594 or 596 is formed in the base of the protrusion 424 in FIG. 14. A flow of the resin in the first resin molding process becomes smooth. In addition, the measurement target gas 30 measured by the temperature detecting portion 452 smoothly flows from the protrusion 424 to its base using the slope portion 594 or 596 while the temperature detecting portion 452 is installed and operated in a vehicle, so as to cool the base of the protrusion 424. Therefore, it is possible to reduce influence of the heat to the temperature detecting portion 452. After the state of FIG. 14, the lead 514 is separated from each terminal so as to be the connection terminal 412 or the terminal 414.

In the first resin molding process, it is necessary to prevent an inflow of the resin to the heat transfer surface exposing portion 436 or the opening 438. For this reason, in the first resin molding process, an inflow of the resin is suppressed in a position of the heat transfer surface exposing portion 436 or the opening 438. For example, an insertion die larger than the diaphragm 672 is installed, and a press is installed in the rear surface thereof, so that it is pressed from both surfaces. In FIG. 11(C), the press imprint 442 or 441 remains on the rear surface corresponding to the heat transfer surface exposing portion 436 or the opening 438 of FIG. 14 or the heat transfer surface exposing portion 436 or the opening 438 of FIG. 11(B).

In FIG. 14, a cutout surface of the lead separated from the frame 512 is exposed from the resin surface, so that moisture or the like may intrude into the inside on the cutout surface of the lead during the use. It is important to prevent such a problem from the viewpoint of durability or reliability. For example, the portion of the fixation surface 434 of FIG. 14 is covered by the resin through the second resin molding process, and the cutout surface is not exposed. The lead cutout portion of the slope portion 594 or 596 is covered by the resin through the second resin molding process, and the cutout surface between the lead 552 or 554 and the frame 512 illustrated in FIG. 12 is covered by the resin. As a result, it is possible to prevent erosion of the cutout surface of the lead 552 or 554 or intrusion of water from the cutout portion. The cutout surface of the lead 552 or 554 adjoins an important lead portion which transmits the electric signal of the temperature detecting portion 452. Accordingly, it is preferable that the cutout surface be covered in the second resin molding process.

5.3 Another Embodiment of Circuit Package 400 and Effects Thereof

FIGS. 15(A) and 15(B) illustrate another embodiment of the circuit package 400. FIG. 15(A) is a front view of the circuit package 400, and FIG. 15(B) is a rear view of the circuit package 400. Like reference numerals denote like elements as in other drawings, and in order to avoid complexity, only some components will be described. In the embodiment described above in relation to FIGS. 11(A) to 11(C), the connection terminal 412 and the terminal 414 of the circuit package 400 are provided in the same side of the circuit package 400. In comparison, in the embodiment of FIGS. 15(A) and 15(B), the connection terminal 412 and the terminal 414 are provided in different sides. The terminal 414 is a terminal not connected to the connection terminal connected to the outside in the thermal flow meter 300. If the connection terminal 412 connected to the outside in the thermal flow meter 300 and the terminal 414 not connected to the outside are provided in different directions in this manner, it is possible to widen a distance between the connection terminal 412 and the terminal and improve workability. In addition, if the terminal 414 extends to a direction different from that of the connection terminal 412, it is possible to prevent the lead inside the frame 512 of FIG. 12 from being concentrated on a part and facilitate arrangement of the lead inside the frame 512. In particular, a chip capacitor as the circuit component 516 is connected to a portion of the lead corresponding to the connection terminal 412. A slightly large space is necessary to provide such a circuit component 516. In the embodiment of FIGS. 15(A) and 15(B), it is possible to easily obtain a space for the lead corresponding to the connection terminal 412.

In the circuit package 400 illustrated in FIGS. 15(A) and 15(B), as with the circuit package 400 illustrated in FIGS. 11(A) to 11(C), the slope portion 462 or 464 whose thickness gently changes is formed in the neck portion of the protrusion 424 protruding from the circuit package body 422. The effects obtained therefrom are similar to those described in FIGS. 11(A) to 11(C). Namely, in FIGS. 15(A) and 15(B), the protrusion 424 protrudes from the side surface of the circuit package body 422 in a shape extending in the upstream direction of the measurement target gas 30. The temperature detecting portion 452 is provided in the leading end portion of the protrusion 424, and the temperature detection element 518 is buried in the temperature detecting portion 452. The slope portions 462 and 464 are provided in a connecting portion between the protrusion 424 and the circuit package body 422. The neck portion of the protrusion 424 is thicken by the slope portion 462 or 464, and a shape in which thickness is reduced as it goes in the leading end direction is formed in the neck portion of the protrusion 424. Namely, when the protruding direction is an axis, the protrusion 424 has in its neck portion a shape in which a cross-sectional area across the axis in the protruding direction gradually decreases as it goes to the leading end of the protrusion 424.

Since the protrusion 424 has the shape described above, when the circuit package 400 is formed by resin molding, there can be used a method of flowing a resin by placing a sheet on the inside of the die for the purpose of, for example, protecting the elements, and the adherence between the sheet and the inside of the die is improved, so that the reliability of the obtained circuit package 400 is improved. The mechanical strength of the protrusion 424 is small, and the protrusion 424 is likely to be broken in the neck portion. The neck portion of the protrusion 424 is thicken, and the protrusion 424 has a shape in which the thickness is gradually reduced as it goes in the leading end direction, whereby it is possible to alleviate a stress concentration applied to the neck portion, and an excellent mechanical strength is obtained. When the protrusion 424 is formed by resin molding, warpage or the like is likely to occur due to the influence of a volume change or the like occurring when resin is solidified. Such an influence can be reduced. In order to detect the temperature of the measurement target gas 30 as accurate as possible, it is preferable that the protruding length of the protrusion 424 is increased. The heat transfer from the circuit package body 422 to the temperature detection element 518 provided in the temperature detecting portion 452 is easily reduced by increasing the protruding length of the protrusion 424.

As illustrated in FIGS. 11(B) and 11(C), in another embodiment shown in FIGS. 15(A) and 15(B), the neck portion of the protrusion 424 is thicken, and the circuit package 400 is fixed to the housing 302 so that the neck portion of protrusion 424 is surrounded by the housing 302. When the neck portion of the protrusion 424 is thus covered by the resin of the housing 302, it is possible to prevent the protrusion 424 from being broken by mechanical impact. In addition to this effect, various effects described in FIGS. 11(A) to 11(C) are provided.

Descriptions for the opening 438, the heat transfer surface exposing portion 436, the measurement surface 430, the press imprint 441, and the press imprint 442 in FIGS. 15(A) and 15(B) are similar to those described above, and they have the same functional effects. Detailed descriptions will not be repeated for simplicity purposes.

6. Process of Producing Thermal Flow Meter 300

6.1 Process of Producing Circuit Package 400

Figure 16:
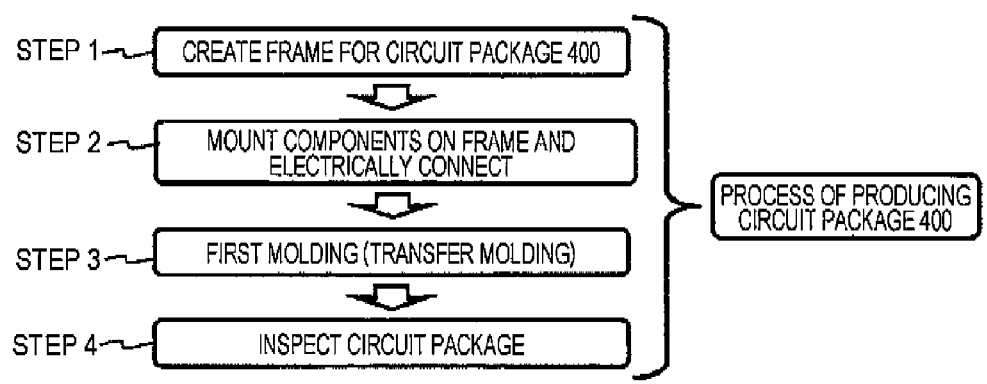
FIG. 16 is a view illustrating a production process of the circuit package.
Figure 17:
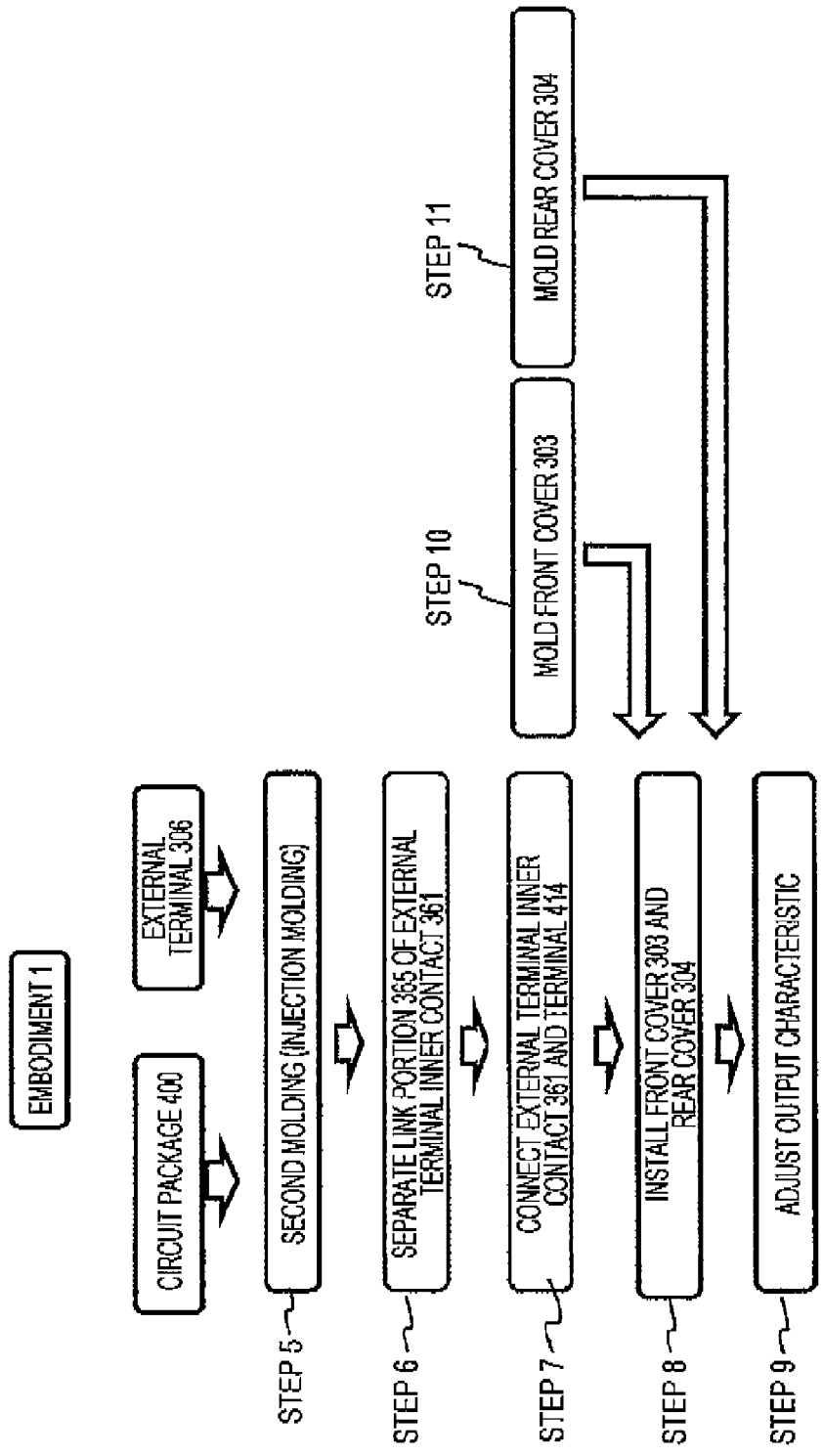
FIG. 17 is a view illustrating a production process of the thermal flow meter.
Figure 18:
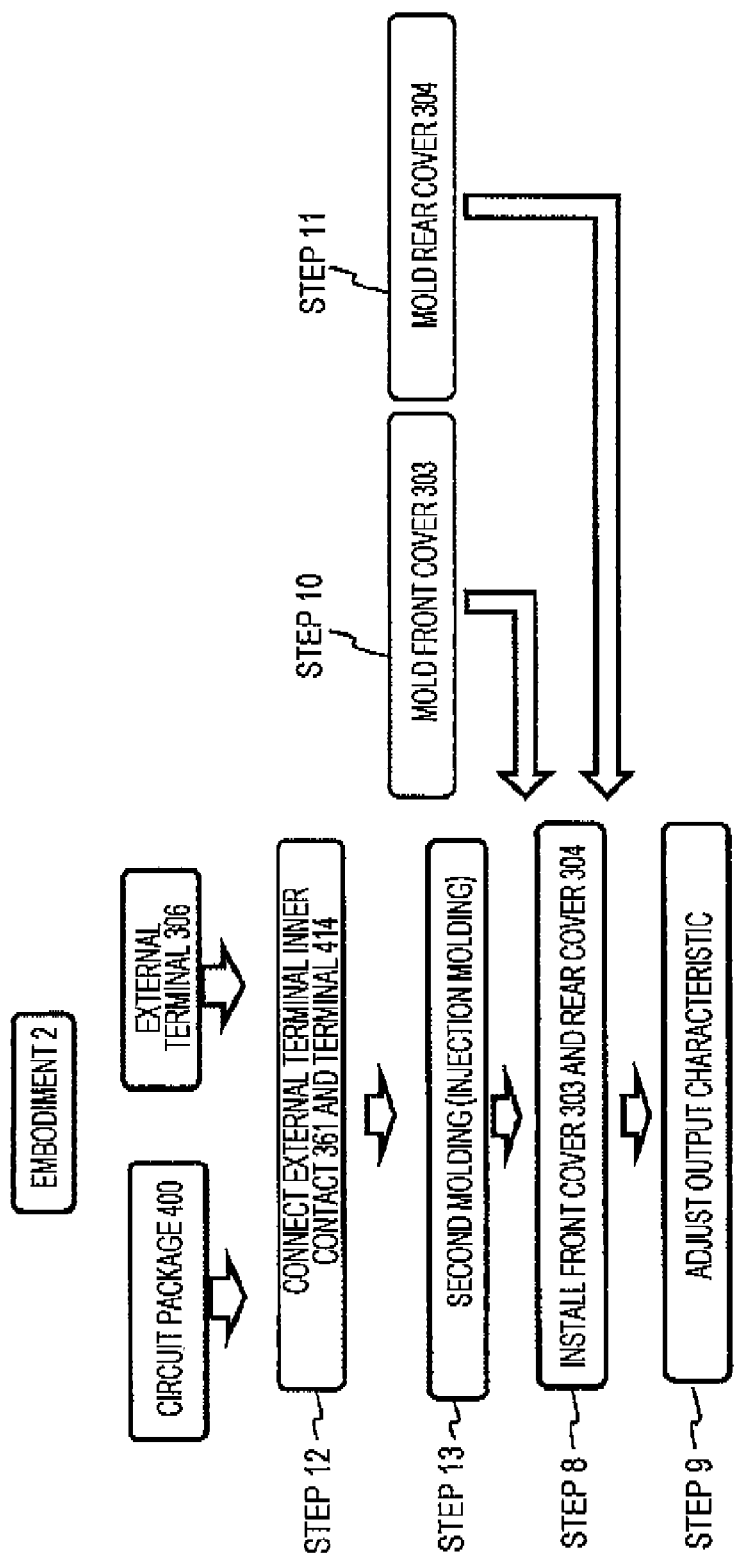
FIG. 18 is a view illustrating another embodiment of the production process of the thermal flow meter.

FIG. 16 illustrate a process of producing the circuit package 400 in a process of producing the thermal flow meter 300. FIG. 17 illustrates a process of producing a thermal flow meter 300, and FIG. 18 illustrates a process of producing the thermal flow meter 300 according to another embodiment. In FIG. 16, step 1 shows a process of producing a frame of FIG. 12. This frame is formed, for example, through press machining.

In step 2, the plate 532 is first mounted on the frame obtained through the step 1, and the air flow sensing portion 602 or the processing unit 604 is further mounted on the plate 532. Then, the temperature detection element 518 and the circuit component such as a chip capacitor are mounted. In step 2, electrical wiring is performed between circuit components, between the circuit component and the lead, and between the leads. In step 2, the leads 544 and 548 are connected using a connection line 546 for increasing a thermal resistance. In step 2, the circuit component illustrated in FIG. 12 is mounted on the frame 512, and the electrical wiring is further performed, so that an electric circuit is formed.

Then, in step 3, through the first resin molding process, an electric circuit illustrated in FIG. 12 mounted with circuit components and electrically connected is molded using a thermosetting resin, and the circuit package 400 is produced. The circuit package 400 in a state of being molded is illustrated in FIG. 14. In addition, in step 3, each of the connected leads is separated from the frame 512, and the leads are separated from each other, so that the circuit package 400 of FIGS. 11(A) to 11(C) and 15(A) and 15(B) is obtained. In this circuit package 400, as illustrated in FIGS. 11(A) to 11(C) and 15(A) and 15(B), the measurement surface 430 or the heat transfer surface exposing portion 436 is formed. Regarding another embodiment of the circuit package 400 illustrated in FIGS. 15(A) and 15(B), the basic production method is the same.

In step 4, a visual inspection or an operational inspection is performed for the obtained circuit package 400. In the first resin molding process of step 3, transfer molding is performed. The electric circuit obtained in step 2 is fixed to the inside of the die, and a high temperature resin is injected into the die with a high pressure. Therefore, it is preferable to inspect whether or not there is an abnormality in the electric component or the electric wiring. For this inspection, the terminal 414 is used in addition to the connection terminal 412 of FIG. 11(A) to 11(C) or 15(A) and 15(B). It is noted that, because the terminal 414 is not used thereafter, it may be cut out from the base after this inspection. For example, referring to FIGS. 15(A) and 15(B), the terminal 414 is cut out from the base after the use.

6.2 Process of Producing Thermal Flow Meter 300 and Adjustment of Measurement Characteristics In FIG. 17, the circuit package 400 already produced as illustrated in FIG. 16 and the external terminal 306 produced by an unillustrated method are used. In step 5, the housing 302 is formed through the second resin molding process. In this housing 302, a bypass passage trench formed of resin, the flange 312, or the external connector 305 are formed, and the hatching portion of the circuit package 400 illustrated in FIGS. 11(A) to 11(C) is covered by the resin in the second resin molding process, so that the circuit package 400 is fixed to the housing 302. By combining the production (step 3) of the circuit package 400 through the first resin molding process and the formation of the housing 302 of the thermal flow meter 300 through the second resin molding process, the flow rate detection accuracy is remarkably improved. In step 6, each inner socket of external terminal 361 of FIG. 10 is separated. In step 7, the connection terminal 412 and the inner socket of external terminal 361 are connected.

As described above using FIGS. 5(B) and 6(B), the fixing portions 3721 and 3723 for fixing the circuit package 400 to the housing 302 have the thin portion 4710 or the thin portion 4716 in addition to the thin portions 4714 and 4715. When the entire fixing portion 3721 or 3723 enveloping the circuit package 400 is constituted of a thick portion, in the second resin molding process in step 5 of FIG. 17, due to shrinkage of resin caused by lowering of the temperature of injected resin, a large force is applied to the surface of the circuit package 400. When a large force is applied to the surface of the circuit package 400 by the shrinkage of resin used to form the fixing portion 3721 or 3723, the electrical circuit illustrated in FIG. 12 and embedded in the circuit package 400 may be damaged. In this embodiment, the fixing portion 3721 or 3723 is not constituted of only the thick portion, but the fixing portion 3721 or 3723 partially has a thin shape, and the thickness of a resin layer covering the surface of the circuit package 400 and formed through the second resin molding process is reduced in the thin portion. According to this constitution, the force applied to the surface of the circuit package 400 is reduced. Alternatively, the force applied per unit area of the circuit package 400 is reduced. Consequently, the risk of damaging the electrical circuit illustrated in FIG. 12 and embedded in the circuit package 400 is reduced.

In the housing 302 itself, when the portion of the fixing portion 3721 or 3723 of the housing 302 significantly shrinks, warpage or twist of the housing 302 may occur. In particular, the fixing portion 3721 or 3723 is connected to the upstream-side outer wall 335 or the downstream-side outer wall 336 connecting the bypass passage and the flange 312, and the force exerted by the shrinkage of the fixing portion 3721 and 3723 is applied to the upstream-side outer wall 335 and the downstream-side outer wall 336. Since the upstream-side outer wall 335 and the downstream-side outer wall 336 each have an elongated shape, twist or warpage is likely to occur. By virtue of the provision of the thin portion described above, the force applied to the upstream-side outer wall 335 and the downstream-side outer wall 336 can be reduced or dispersed, and occurrence of the warpage or twist of the upstream-side outer wall 335 and the downstream-side outer wall 336 can be suppressed.

The housing 302 is obtained in step 7. Then, in step 8, the front and rear covers 303 and 304 are installed in the housing 302, so that the inside of the housing 302 is sealed with the front and rear covers 303 and 304, and the bypass passage for flowing the measurement target gas 30 is obtained, thereby the thermal flow meter 300 is obtained. In addition, an orifice structure described in relation to FIG. 7 is formed by the protrusion 356 or 358 provided in the front or rear cover 303 or 304. It is noted that the front cover 303 is formed through the molding of step 10, and the rear cover 304 is formed through the molding of step 11. In addition, the front and rear covers 303 and 304 are formed through separate processes using different dies.

In step 9, a flow rate measurement characteristic test is applied to the measurement target gas 30 by guiding a known amount of air to the bypass passage of the obtained thermal flow meter 300 in practice. Since a relationship between the bypass passage and the air flow sensing portion is maintained with high accuracy as described above, significantly high measurement accuracy is obtained by performing measurement characteristic calibration so that accurate measurement characteristics are obtained based on the flow rate measurement characteristic test. In addition, since the molding is performed with a positioning or configuration relationship between the bypass passage and the air flow sensing portion is determined through the first resin molding process and the second resin molding process, the characteristic does not change much even in a long time use, and high reliability is obtained in addition to the high accuracy.

6.3 Another Embodiment of Process of Producing Thermal Flow Meter 300

FIG. 18 illustrates another embodiment in which the thermal flow meter 300 is produced. Referring to FIG. 18, using the circuit package 400 already produced as illustrated in FIG. 16 and the external terminal 306 produced by an unillustrated method, in step 12 before the second resin molding process, the connection terminal 412 of the circuit package 400 and the inner socket of external terminal 361 are connected. In this case or in the process prior to step 12, each inner socket of external terminal 361 illustrated in FIG. 10 is separated. In step 13, the housing 302 is formed through the second resin molding process. In the housing 302, the resin bypass passage trench, the flange 312, or the external connector 305 is formed, and the hatching portion of the circuit package 400 illustrated in FIGS. 11(A) to 11(C) is covered by the resin in the second resin molding process, so that the circuit package 400 is fixed to the housing 302. By combining production (step 3) of the circuit package 400 through the first resin molding process and formation of the housing 302 of the thermal flow meter 300 through the second resin molding process, the flow rate detection accuracy is remarkably improved as described above.

As the housing 302 is obtained in step 13, then, in step 8, the front and rear covers 303 and 304 are installed in the housing 302, and the inside of the housing 302 is sealed with the front and rear covers 303 and 304, so that the bypass passage for flowing the measurement target gas 30 is obtained. In addition, the orifice structure described in relation to FIG. 7 is formed by the protrusion 356 or 358 provided in the front or rear cover 303 or 304. It is noted that the front cover 303 is formed through the molding of step 10, and the rear cover 304 is formed through the molding of step 11. In addition, the front and rear covers 303 and 304 are formed through separate processes using different dies.

In step 9, a characteristic test is performed by guiding a defined amount of air to the bypass passage in practice. Since a relationship between the bypass passage and the air flow sensing portion is maintained with high accuracy as described above, significantly high measurement accuracy is obtained by performing a characteristic calibration through a characteristic test. In addition, since the molding is performed with a positioning or configuration relationship between the bypass passage and the air flow sensing portion is determined through the first resin molding process and the second resin molding process, the characteristic does not change much even after using for a long time, and high reliability is obtained in addition to the high accuracy. In addition, various effects described above using FIG. 17 are obtained.

7. Circuit Configuration of Thermal Flow Meter 300

7.1 Overview of Circuit Configuration of Thermal Flow Meter 300

Figure 19:
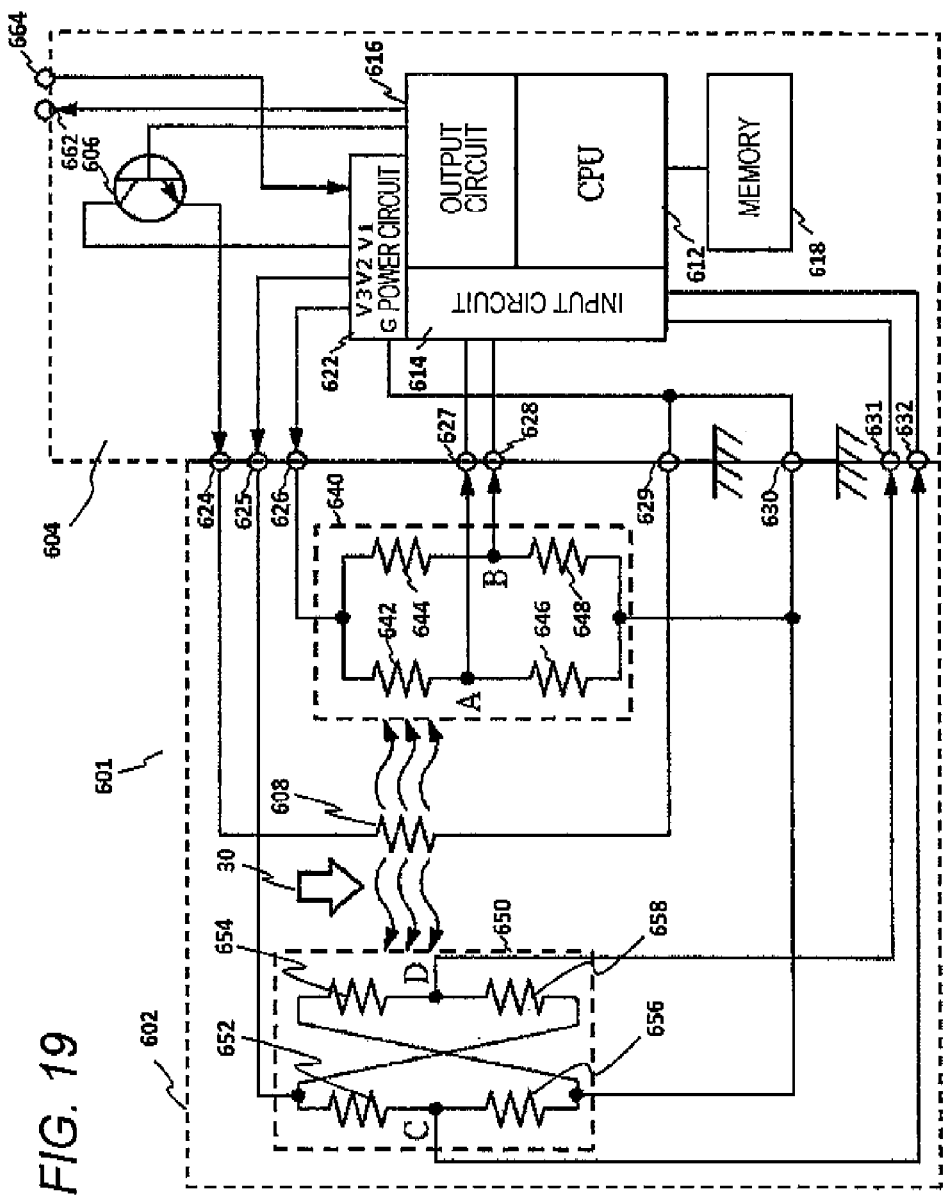
FIG. 19 is a circuit diagram illustrating a flow rate detection circuit of the thermal flow meter.

FIG. 19 is a circuit diagram illustrating the flow rate detection circuit 601 of the thermal flow meter 300. It is noted that the measurement circuit relating to the temperature detecting portion 452 described in the aforementioned embodiment is also provided in the thermal flow meter 300, but is not illustrated intentionally in FIG. 19. The flow rate detection circuit 601 of the thermal flow meter 300 includes the air flow sensing portion 602 having the heat generator 608 and the processing unit 604. The processing unit 604 control a heat amount of the heat generator 608 of the air flow sensing portion 602 and outputs a signal representing the flow rate through the terminal 662 based on the output of the air flow sensing portion 602. For this processing, the processing unit 604 includes a central processing unit (hereinafter, referred to as "CPU") 612, an input circuit 614, an output circuit 616, a memory 618 for storing data representing a relationship between the calibration value or the measurement value and the flow rate, and a power circuit 622 for supplying a certain voltage to each necessary circuit. The power circuit 622 is supplied with DC power from an external power supply such as a vehicle-mount battery through a terminal 664 and a ground terminal (not illustrated).

The air flow sensing portion 602 is provided with a heat generator 608 for heating the measurement target air 30. A voltage V1 is supplied from the power circuit 622 to a collector of a transistor 606 included in a current supply circuit of the heat generator 608, and a control signal is applied from the CPU 612 to a base of the transistor 606 through the output circuit 616. Based on this control signal, a current is supplied from the transistor 606 to the heat generator 608 through the terminal 624. The current amount supplied to the heat generator 608 is controlled by a control signal applied from the CPU 612 to the transistor 606 of the current supply circuit of the heat generator 608 through the output circuit 616. The processing unit 604 controls the heat amount of the heat generator 608 such that a temperature of the measurement target air 30 increases by a predetermined temperature, for example, 100° C. from an initial temperature by heating using the heat generator 608.

The air flow sensing portion 602 includes a heating control bridge 640 for controlling a heat amount of the heat generator 608 and a bridge circuit of air flow sensing 650 for measuring a flow rate. A predetermined voltage V3 is supplied to one end of the heating control bridge 640 from the power circuit 622 through the terminal 626, and the other end of the heating control bridge 640 is connected to the ground terminal 630. In addition, a predetermined voltage V2 is applied to one end of the bridge circuit of air flow sensing 650 from the power circuit 622 through the terminal 625, and the other end of the bridge circuit of air flow sensing 650 is connected to the ground terminal 630.

The heating control bridge 640 has a resistor 642 which is a resistance temperature detector having a resistance value changing depending on the temperature of the heated measurement target air 30, and the resistors 642, 644, 646, and 648 constitute a bridge circuit. A potential difference between a node A between the resistors 642 and 646 and a node B between the resistors 644 and 648 is input to the input circuit 614 through the terminals 627 and 628, and the CPU 612 controls the current supplied from the transistor 606 to control the heat amount of the heat generator 608 such that the potential difference between the nodes A and B is set to a predetermined value, for example, zero voltage in this embodiment. The flow rate detection circuit 601 illustrated in FIG. 19 heats the measurement target air 30 using the heat generator 608 such that a temperature increases by a predetermined temperature, for example, 100° C. from an initial temperature of the measurement target air 30 at all times. In order to perform this heating control with high accuracy, resistance values of each resistor of the heating control bridge 640 are set such that the potential difference between the nodes A and B becomes zero when the temperature of the measurement target air 30 heated by the heat generator 608 increases by a predetermined temperature, for example, 100° C. from an initial temperature at all times. Therefore, in the flow rate detection circuit 601 of FIG. 19, the CPU 612 controls the electric current supplied to the heat generator 608 such that the potential difference between the nodes A and B becomes zero.

The bridge circuit of air flow sensing 650 includes four resistance temperature detectors of resistors 652, 654, 656, and 658. The four resistance temperature detectors are arranged along the flow of the measurement target air 30 such that the resistors 652 and 654 are arranged in the upstream side in the flow path of the measurement target air 30 with respect to the heat generator 608, and the resistors 656 and 658 are arranged in the downstream side in the flow path of the measurement target air 30 with respect to the heat generator 608. In addition, in order to increase the measurement accuracy, the resistors 652 and 654 are arranged such that distances to the heat generator 608 are approximately equal, and the resistors 656 and 658 are arranged such that distances to the heat generator 608 are approximately equal.

A potential difference between a node C between the resistors 652 and 656 and a node D between the resistors 654 and 658 is input to the input circuit 614 through the terminals 631 and 632. In order to increase the measurement accuracy, each resistance of the bridge circuit of air flow sensing 650 is set, for example, such that a positional difference between the nodes C and D is set to zero while the flow of the measurement target air 30 is set to zero. Therefore, while the potential difference between the nodes C and D is set to, for example, zero, the CPU 612 outputs, from the terminal 662, an electric signal indicating that the flow rate of the main passage 124 is zero based on the measurement result that the flow rate of the measurement target air 30 is zero.

When the measurement target air 30 flows along the arrow direction in FIG. 19, the resistor 652 or 654 arranged in the upstream side is cooled by the measurement target air 30, and the resistors 656 and 658 arranged in the downstream side of the measurement target air 30 are heated by the measurement target air 30 heated by the heat generator 608, so that the temperature of the resistors 656 and 658 increases. For this reason, a potential difference is generated between the nodes C and D of the bridge circuit of air flow sensing 650, and this potential difference is input to the input circuit 614 through the terminals 631 and 632. The CPU 612 searches data indicating a relationship between the flow rate of the main passage 124 and the aforementioned potential difference stored in the memory 618 based on the potential difference between the nodes C and D of the bridge circuit of air flow sensing 650 to obtain the flow rate of the main passage 124. An electric signal indicating the flow rate of the main passage 124 obtained in this manner is output through the terminal 662. It is noted that, although the terminals 664 and 662 illustrated in FIG. 19 are denoted by new reference numerals, they are included in the connection terminal 412 of FIG. 5(A), 5(B), 6(A), 6(B), or 10 described above.

The thermal flow meter 300 is mounted in the intake pipe of the internal combustion engine as described in FIG. 1 and is used to measure the intake air amount of the internal combustion engine. Pulsation of intake air flowing through the intake pipe occurs in a specified operation state of the internal combustion engine, and the intake air does not just flow toward an intake valve of the internal combustion engine, but a phenomenon in which the intake air flows back occurs. In FIG. 19, in the flowing back state described above, there occurs a negative flow, that is, a reverse flow occurs with respect to the direction shown by the arrow of the measurement target gas 30. In the back flow, resistors 652 and 654 are heated by the measurement target gas 30 heated by the heat generator 608, and meanwhile, the resistors 656 and 658 are cooled by the flowing back measurement target gas 30. As described above, the operation opposite to the operation in the forward direction of the flow of the measurement target gas 30 is performed, and a potential difference with an opposite polarity to the flow rate in the forward direction is generated between the nodes C and D. The flowing direction of the measurement target gas 30 can be detected from the polarity of a voltage detected through the terminals 631 and 632, and the intake air flow rate actually taken in the internal combustion engine can be calculated by reducing the flow rate in the reverse direction detected from the detected flow rate in the forward direction.

The memory 618 stores the data indicating a relationship between the potential difference between the nodes C and D and the flow rate of the main passage 124, including the backflow state. The memory 618 further stores calibration data for reducing a measurement error such as a variation, obtained based on the actual measurement value of the gas after production of the thermal flow meter 300. It is noted that the actual measurement value of the gas after production of the thermal flow meter 300 and the calibration value based thereon are stored in the memory 618 using the external terminal 306 or the calibration terminal 307 illustrated in FIGS. 4(A) and 4(B). In this embodiment, the thermal flow meter 300 is produced while an arrangement relationship between the bypass passage for flowing the measurement target gas 30 and the measurement surface 430 or an arrangement relationship between the bypass passage for flowing the measurement target gas 30 and the heat transfer surface exposing portion 436 is maintained with high accuracy and a little variation. Therefore, it is possible to obtain a measurement result with remarkably high accuracy through calibration using the calibration value.

7.2 Configuration of Flow Rate Detection Circuit 601

Figure 20:
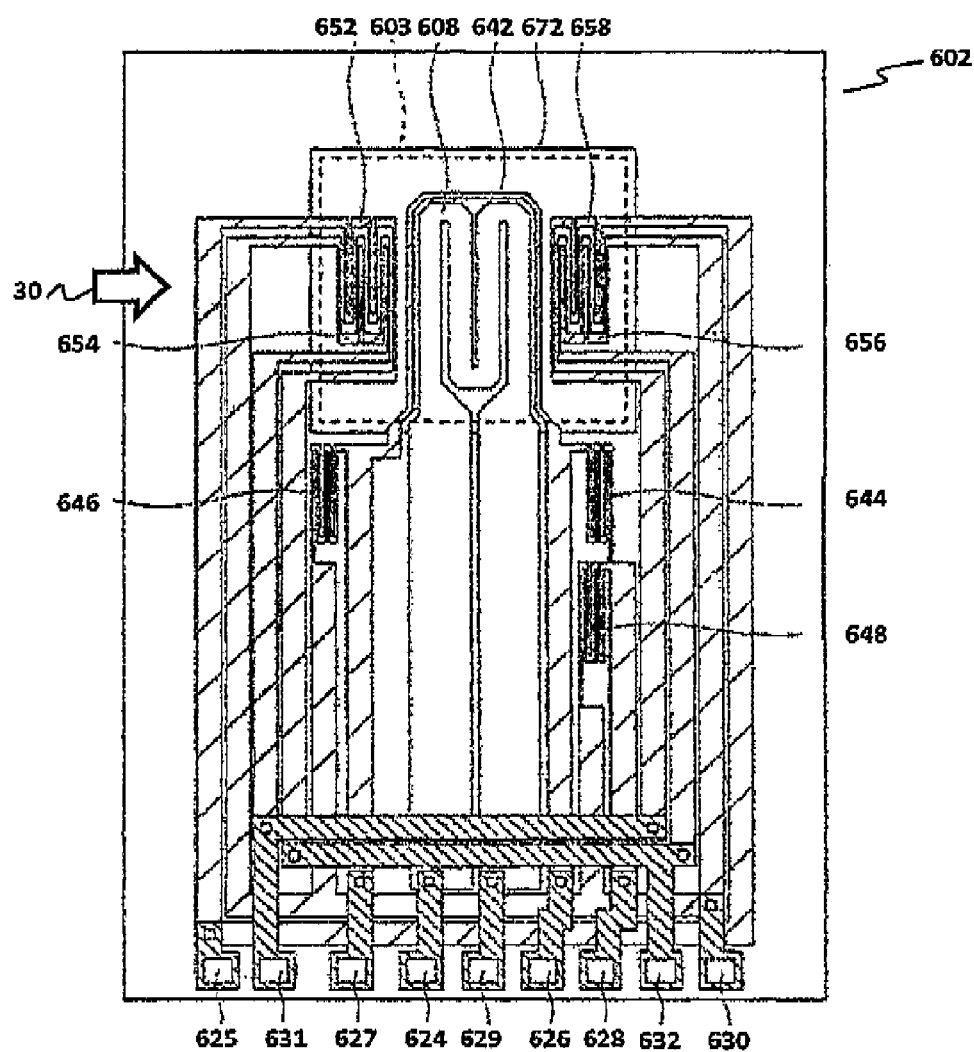
FIG. 20 is an explanatory diagram illustrating an air flow sensing portion of the flow rate detection circuit.

FIG. 20 is a circuit configuration diagram illustrating a circuit arrangement of the air flow sensing portion 602 of FIG. 19 described above. The air flow sensing portion 602 is manufactured as a semiconductor chip having a rectangular shape, and the measurement target gas 30 flows along the arrow direction from the left side to the right side of the air flow sensing portion 602 illustrated in FIG. 20. However, in such a state that the back flow occurs, the negative flow, that is, the reverse flow occurs in the arrow direction described above. The air flow sensing portion 602 illustrated in FIG. 20 performs heat transfer with the measurement target gas 30 and thereby can detect not only the flow rate of the flow in the forward direction but also the flow rate in the flowing state in the reverse direction. A diaphragm 672 having a rectangular shape is formed in the air flow sensing portion 602. The diaphragm 672 is provided with a thin area 603 with the thin semiconductor chip indicated by the dotted line. The gap is formed in the rear surface side of the thin area 603 and communicates with the opening 438 illustrated in FIGS. 11(A) to 11(C), 5(A), 5(B), and so on, so that the gas pressure inside the gap depends on the pressure of the gas guided from the opening 438.

By reducing the thickness of the thin area 603 of the diaphragm 672, the thermal conductivity is lowered, and heat transfer to the resistors 652, 654, 658, and 656 provided in the thin area 603 through the diaphragm 672 is suppressed, so that the temperatures of the resistors are approximately set through heat transfer with the measurement target gas 30.

The heat generator 608 is provided in the center of the thin area 603 of the diaphragm 672, and the resistor 642 of the heating control bridge 640 is provided around the heat generator 608. In addition, the resistors 644, 646, and 648 of the heating control bridge 640 are provided in the outer side of the thin area 603. The resistors 642, 644, 646, and 648 formed in this manner constitute the heating control bridge 640.

In addition, the resistors 652 and 654 as upstream resistance temperature detectors and the resistors 656 and 658 as downstream resistance temperature detectors are arranged to interpose the heat generator 608. The resistors 652 and 654 as upstream resistance temperature detectors are arranged in the upstream side in the arrow direction where the measurement target gas 30 flows with respect to the heat generator 608. The resistors 656 and 658 as downstream resistance temperature detectors are arranged in the downstream side in the arrow direction where the measurement target gas 30 flows with respect to the heat generator 608. In this manner, the bridge circuit of air flow sensing 650 is formed by the resistors 652, 654, 656, and 658 arranged in the thin area 603. It is noted that in the aforementioned description, it is premised that the measurement target gas 30 flows in the forward direction, and when the back flow occurs, the actual flow of the measurement target gas 30 flows from downstream to upstream.

Both ends of the heat generator 608 are connected to each of the terminals 624 and 629 illustrated in the lower half of FIG. 20. Here, as illustrated in FIG. 19, the current supplied from the transistor 606 to the heat generator 608 is applied to the terminal 624, and the terminal 629 is grounded.

The resistors 642, 644, 646, and 648 of the heating control bridge 640 are connected to each other and are connected to the terminals 626 and 630. As illustrated in FIG. 19, the terminal 626 is supplied with a predetermined voltage V3 from the power circuit 622, and the terminal 630 is grounded. In addition, the node between the resistors 642 and 646 and the node between the resistors 646 and 648 are connected to the terminals 627 and 628, respectively. As illustrated in FIG. 20, the terminal 627 outputs an electric potential of the node A between the resistors 642 and 646, and the terminal 627 outputs an electric potential of the node B between the resistors 644 and 648. As illustrated in FIG. 19, the terminal 625 is supplied with a predetermined voltage V2 from the power circuit 622, and the terminal 630 is grounded as a ground terminal. In addition, a node between the resistors 654 and 658 is connected to the terminal 631, and the terminal 631 outputs an electric potential of the node B of FIG. 19. The node between the resistors 652 and 656 is connected to the terminal 632, and the terminal 632 outputs an electric potential of the node C illustrated in FIG. 19.

As illustrated in FIG. 20, since the resistor 642 of the heating control bridge 640 is formed in the vicinity of the heat generator 608, it is possible to measure the temperature of the gas heated by the heat from the heat generator 608 with high accuracy. Meanwhile, since the resistors 644, 646, and 648 of the heating control bridge 640 are arranged distant from the heat generator 608, they are not easily influenced by the heat generated from the heat generator 608. The resistor 642 is configured to respond sensitively to the temperature of the gas heated by the heat generator 608, and the resistors 644, 646, and 648 are configured not to be influenced by the heat generator 608. For this reason, the detection accuracy of the measurement target gas 30 using the heating control bridge 640 is high, and the control for heating the measurement target gas 30 by only a predetermined temperature from its initial temperature can be performed with high accuracy.

In this embodiment, a gap is formed in the rear surface side of the diaphragm 672 and communicates with the opening 438 illustrated in FIG. 11(A) to 11(C) or 5(A) and 5(B), so that a difference between the pressure of the gap in the rear side of the diaphragm 672 and the pressure in the front side of the diaphragm 672 does not increase. It is possible to suppress a distortion of the diaphragm 672 caused by this pressure difference. This contributes to improvement of the flow rate measurement accuracy.

As described above, the heat conduction through the diaphragm 672 is suppressed as small as possible by forming the thin area 603 and reducing the thickness of the thin area 603 in the diaphragm. Therefore, while influence of the heat conduction through the diaphragm 672 is suppressed, the bridge circuit of air flow sensing 650 or the heating control bridge 640 more strongly tends to operate depending on the temperature of the measurement target gas 30, so that the measurement operation is improved. For this reason, high measurement accuracy is obtained.

8. Temperature Measurement for Measurement Target Gas 30

8.1 Structure of Temperature Detecting Portion 452 and Effects Based Thereon As illustrated in FIGS. 2 to 6, the temperature of the measurement target gas 30 is measured by the temperature detecting portion 452 provided in the thermal flow meter 300. The temperature detecting portion 452 has a structure protruding outside toward the upstream side from the housing 302 and is directly in contact with the measurement target gas 30. According to this structure, the accuracy of the temperature measurement for the measurement target gas 30 is improved. The temperature detecting portion 452 further has a structure in which a temperature of the gas flowing to the inlet port 343 from the upstream side of the direction along the flow of the measurement target gas 30 is measured by the temperature detecting portion 452, and, furthermore, the gas flows toward a neck portion of the temperature detecting portion 452 for supporting the temperature detecting portion 452, so that it lowers the temperature of the portion for supporting the temperature detecting portion 452 to the vicinity of the temperature of the measurement target gas 30. According to this structure, the measurement accuracy is improved.

The temperature of the intake pipe serving as the main passage 124 is considerably higher than the temperature of the measurement target gas 30, and the heat is transferred to the portion for supporting the temperature detecting portion 452 through the upstream-side outer wall inside the measuring portion 310 from the flange 312 or the thermal insulation 315, so that the temperature measurement accuracy may be influenced. The aforementioned support portion is cooled as the measurement target gas 30 is measured by the temperature detecting portion 452 and then flows along the support portion of the temperature detecting portion 452. Therefore, it is possible to suppress the heat from being transferred to the portion for supporting the temperature detecting portion 452 through the upstream-side outer wall inside the measuring portion 310 from the flange 312 or the thermal insulation 315.

In particular, in the support portion of the temperature detecting portion 452, the upstream-side outer wall inside the measuring portion 310 has a shape concave to the downstream side, and therefore, it is possible to increase a length between the upstream-side outer wall inside the measuring portion 310 and the temperature detecting portion 452. While the heat transfer length increases, a length of the cooling portion using the measurement target gas 30 increases. Accordingly, it is possible to also reduce influence of the heat from the flange 312 or the thermal insulation 315. Consequently, the measurement accuracy is improved.

Since the upstream-side outer wall has a shape concaved to the downstream side, that is, to the inside of the housing 302, fixation can be performed by the upstream-side outer wall 335 of the housing 302, so that it is possible to easily fix the circuit package 400. In addition, the protrusion 424 (see, FIG. 11) having the temperature detecting portion 452 is reinforced.

As described above in relation to FIGS. 2 and 3, the inlet port 343 is provided on the upstream side of the measurement target gas 30 in the case 301, and the measurement target gas guided through the inlet port 343 passes around the temperature detecting portion 452 and is guided to the main passage 124 through the front side outlet port 344 and the rear side outlet port 345. The temperature detecting portion 452 measures the temperature of the measurement target gas 30, and an electrical signal representing the measured temperature is output from the external terminal 306 of the external connector 305. The case 301 of the thermal flow meter 300 is provided with the front cover 303, the rear cover 304, and the housing 302. The housing 302 has a hollow used to form the inlet port 343, and the hollow is formed by the outer wall hollow portion 366 (see, FIGS. 5(A), 5(B), 6(A) and 6(B)). The front side outlet port 344 and the rear side outlet port 345 are formed by holes provided in the front cover 303 and the rear cover 304. As described as follows, the temperature detecting portion 452 is provided at the leading end portion of the protrusion 424 and is weak mechanically. The front cover 303 and the rear cover 304 serve to protect the protrusion 424 from mechanical impact.

The front protection portion 322 or the rear protection portion 325 is formed in the front or rear cover 303 or 304 illustrated in FIG. 8(A) to 8(C) or 9(A) to 9(C). As illustrated in FIG. 2(A), 2(B), 3(A), or 3(B), the front protection portion 322 provided in the front cover 303 is arranged on the front side surface of the inlet port 343, and the rear protection portion 325 provided in the rear cover 304 is arranged in the rear side surface of the inlet port 343. The temperature detecting portion 452 arranged inside the inlet port 343 is protected by the front protection portion 322 and the rear protection portion 325, so that it is possible to prevent a mechanical damage of the temperature detecting portion 452 caused when the temperature detecting portion 452 collides with something during production or loading on a vehicle.

As illustrated in FIGS. 11(A) to 11(C), 15(A) and 15(B), the neck portion of the protrusion 424 supporting the temperature detecting portion 452 is gradually thicker as it goes to the leading end. Since the measurement target gas 30 entering through the inlet port 343 flows along the gradually thickening neck portion, the cooling effect increases. The neck portion of the protrusion 424 is provided near the flow rate detection circuit and is likely to be affected by heat generation of the flow rate detection circuit. The lead 548 used to connect the temperature detection element 518 provided in the temperature detecting portion 452 is buried in the neck portion of the protrusion 424. Thus, heat may be transferred through the lead 548. The neck portion of the protrusion 424 is thicken to increase the contact area with the measurement target gas 30, whereby the cooling effect can be increased.

8.2 Formation of Temperature Detecting Portion 452 and Protrusion 424 and Effects Based Thereon The circuit package 400 has the circuit package body 422 embedded with the aforementioned air flow sensing portion 602 used to measure the flow rate and the processing unit 604 and the protrusion 424. As illustrated in FIGS. 2(A) and 2(B), the protrusion 424 protrudes from the side surface of the circuit package body 422 in a shape extending in the upstream direction of the measurement target gas 30. The protrusion 424 has the temperature detecting portion 452 at the leading end portion, and the temperature detection element 518 is buried in the temperature detecting portion 452 as illustrated in FIG. 12. The slope portions 462 and 464 are provided in the connecting portion between the protrusion 424 and the circuit package body 422, as illustrated in FIGS. 11(A) to 11(C), 15(A), and 15(B). The neck portion of the protrusion 424 is thicken by the slope portion 462 or 464, and the shape in which thickness is gradually reduced as it goes in the leading end direction is formed in the neck portion of the protrusion 424. The protrusion 424 has a shape in which the cross-sectional area across the axis in the protruding direction with respect to the axis gradually decreases as it goes to the leading end direction in the neck portion of the protrusion 424.

As described above, since the circuit package 400 and the protrusion 424 are connected by the structure gradually changing in the connecting portion between the surface of the circuit package 400 and the surface of the protrusion 424, when the circuit package 400 is formed by resin molding, there can be used a method of flowing a resin by placing a sheet on the inside of the die for the purpose of, for example, protecting the elements, and the adherence between the sheet and the inside of the die is improved, so that the reliability is improved. When the surface rapidly changes, an excessive force is applied to the sheet, and deviation or the like occurs in a contact portion between an inner wall surface of the die and the sheet, and there is a problem that resin molding cannot be performed well. The mechanical strength of the protrusion 424 is small, and the protrusion 424 is likely to be broken in the neck portion. The neck portion of the protrusion 424 is thicken, and the protrusion 424 has a shape in which the thickness is gradually reduced as it goes in the leading end direction, whereby it is possible to alleviate the stress concentration applied to the neck portion, and an excellent mechanical strength is obtained. When the protrusion 424 is formed by resin molding, warpage or the like is likely to occur due to the influence of a volume change or the like occurring when resin is solidified. Such an influence can be reduced. In order to detect the temperature of the measurement target gas 30 as accurate as possible, it is preferable that the protruding length of the protrusion 424 is increased. The heat transfer from the circuit package body 422 to the temperature detection element 518 provided in the temperature detecting portion 452 is easily reduced by increasing the protruding length of the protrusion 424.

As illustrated in FIGS. 11(B) and 11(C), the neck portion of the protrusion 424 is thicken, and the circuit package 400 is fixed to the housing 302 so that the neck portion of protrusion 424 is surrounded by the resin of the housing 302. The neck portion of the protrusion 424 is thus covered by the resin of the housing 302, whereby it is possible to prevent the protrusion 424 from being broken by the mechanical impact.

In order to detect a temperature of the measurement target gas 30 with high accuracy, it is preferable to reduce heat transfer to portions other than the measurement target gas 30 as much as possible. The protrusion 424 which supports the temperature detecting portion 452 has a shape having a leading end thinner than the base thereof and is provided with the temperature detecting portion 452 in its leading end portion. Because of such a shape, it is possible to reduce influence of the heat from the neck portion of the protrusion 424 to the temperature detecting portion 452.

After the temperature of the measurement target gas 30 is detected using the temperature detecting portion 452, the measurement target gas 30 flows along the protrusion 424 to approximate the temperature of the protrusion 424 to the temperature of the measurement target gas 30. As a result, it is possible to suppress influence of the temperature of the neck portion of the protrusion 424 to the temperature detecting portion 452. In particular, in this embodiment, the temperature detecting portion 452 is thinner in the vicinity of the protrusion 424 having the temperature detecting portion 452 and is thickened toward the neck of the protrusion 424. For this reason, the measurement target gas 30 flows along the shape of the protrusion 424 to efficiently cool the protrusion 424.

In FIGS. 11(A) to 11(C), the hatching portion of the neck portion of the protrusion 424 is a fixation surface 432 covered by the resin used to form the housing 302 in the second resin molding process. A hollow is provided in the hatching portion of the neck portion of the protrusion 424. This shows that a portion of the hollow shape not covered by the resin of the housing 302 is provided. If such a portion having a hollow shape not covered by the resin of the housing 302 in the neck portion of the protrusion 424 is provided in this manner, it is possible to further easily cool the protrusion 424 using the measurement target gas 30. Illustration of the hatching portion is omitted in FIGS. 15(A) and 15(B) but is similar to that of FIGS. 11(A) to 11(C).

The circuit package 400 is provided with the connection terminal 412 in order to supply electric power for operating the embedded air flow sensing portion 602 or the processing unit 604 and output the flow rate measurement value or the temperature measurement value. In addition, a terminal 414 is provided in order to inspect whether or not the circuit package 400 is appropriately operated, or whether or not an abnormality is generated in a circuit component or connection thereof. In this embodiment, the circuit package 400 is formed by performing transfer molding for the air flow sensing portion 602 or the processing unit 604 using a thermosetting resin through the first resin molding process. By performing the transfer molding, it is possible to improve dimensional accuracy of the circuit package 400. However, in the transfer molding process, since a high pressure resin is pressed into the inside of the sealed die where the air flow sensing portion 602 or the processing unit 604 is embedded, it is preferable to inspect whether or not there is a defect in the air flow sensing portion 602 or the processing unit 604 and such a wiring relationship for the obtained circuit package 400. In this embodiment, an inspection terminal 414 is provided, and inspection is performed for each of the produced circuit packages 400. Since the inspection terminal 414 is not used for measurement, the terminal 414 is not connected to the inner socket of external terminal 361 as described above. In addition, each connection terminal 412 is provided with a curved portion 416 in order to increase a mechanical elastic force. If a mechanical elastic force is provided in each connection terminal 412, it is possible to absorb a stress caused by a difference of the thermal expansion coefficient between the resin of the first resin molding process and the resin of the second resin molding process. That is, each connection terminal 412 is influenced by thermal expansion caused by the first resin molding process, and the inner socket of external terminal 361 connected to each connection terminal 412 are influenced by the resin of the second resin molding process. Therefore, it is possible to absorb generation of a stress caused by the difference of the resin.

8.3 Action of Slope Portions 462 and 464 Formed in Neck Portion of Protrusion 424 and Effects Thereof As already described based on FIGS. 11(A) to 11(C), 14, 15(A), and 15(B), the slope portions 462 and 464 are provided in the neck portion of the protrusion 424. The neck portion of the protrusion 424 is thicken by the slope portion 462 or 464, and the shape in which the thickness is reduced as it goes in the leading end direction is formed in the neck portion of the protrusion 424. Namely, when the protruding direction is the axis, the protrusion 424 has in its neck portion the shape in which the cross-sectional area across the axis in the protruding direction gradually decreases.

In the case of where the circuit package 400 is formed by resin molding, when resin is flowed while a sheet is placed on the inside of the die in order to, for example, protect the elements, the adherence between the sheet and the inside of the die is improved, so that the reliability is improved. The mechanical strength of the protrusion 424 is small, and the protrusion 424 is likely to be broken in the neck portion. The neck portion of the protrusion 424 is thicken, and the protrusion 424 has the shape in which the thickness is gradually reduced as it goes in the leading end direction, whereby it is possible to alleviate the stress concentration applied to the neck portion, and an excellent mechanical strength is obtained. When the protrusion 424 is formed by resin molding, warpage or the like is likely to occur due to the influence of the volume change or the like occurring when the resin is solidified. In order to detect the temperature of the measurement target gas 30 as accurate as possible, it is preferable that the protruding length of the protrusion 424 is increased. The heat transfer from the circuit package body 422 to the temperature detection element 518 provided in the temperature detecting portion 452 is easily reduced by increasing the protruding length of the protrusion 424.

As illustrated in FIGS. 11(B) and 11(C), the neck portion of the protrusion 424 is thicken, and the circuit package 400 is fixed to the housing 302 so that the neck portion of the protrusion 424 is surrounded by the housing 302. The neck portion of the protrusion 424 is thus covered by the resin of the housing 302, whereby it is possible to prevent the protrusion 424 from being broken by the mechanical impact.

By virtue of the provision of the slope portion 463 in the neck portion of the protrusion 424, the neck portion of the protrusion 424 can be thickened, and the neck portion of the protrusion 424 can have the shape in which the thickness is gradually reduced as it goes in the leading end direction. Since the neck portion of the protrusion 424 has such a shape, when the circuit package 400 is formed by resin molding, there can be used a method of flowing a resin by placing a sheet on the inside of the die for the purpose of, for example, protecting the elements, and the adherence between the sheet and the inside of the die is improved, so that the reliability is improved. The mechanical strength of the protrusion 424 is small, and the protrusion 424 is likely to be broken in the neck portion. The neck portion of the protrusion 424 is thicken, and the protrusion 424 has a shape in which the thickness is gradually reduced as it goes in the leading end direction, whereby it is possible to alleviate the stress concentration applied to the neck portion, and an excellent mechanical strength is obtained. When the protrusion 424 is formed by resin molding, warpage or the like is likely to occur due to the influence of the volume change or the like occurring when resin is solidified. Such an influence can be reduced. In order to detect the temperature of the measurement target gas 30 as accurate as possible, it is preferable that the protruding length of the protrusion 424 is increased. The heat transfer from the circuit package body 422 to the temperature detection element 518 provided in the temperature detecting portion 452 is easily reduced by increasing the protruding length of the protrusion 424.

In FIGS. 11(A) to 11(C), 21(A), and 21(B), the neck portion of the protrusion 424 is thicken, and the neck portion of the protrusion 424 is covered by the resin of the housing 302 forming the bypass passage so that the neck portion of the protrusion 424 is surrounded by the fixing portion 3723 of the housing 302, whereby strength against the mechanical impact is increased, and it is possible to prevent the protrusion 424 from being broken. In FIGS. 11(A) to 11(C), it is noted that the hatching portion in the appearance of the circuit package 400 indicates the fixation surface 432, the fixing portion 3723, and the fixation surface 434 where the circuit package 400 is covered by the resin used in the second resin molding process when the housing 302 is formed through the second resin molding process after the circuit package 400 is manufactured through the first resin molding process. Namely, those fixation surfaces can increase the mechanical strength of the circuit package 400, and, in particular, the fixation surface 432 can improve the mechanical strength of the neck portion of the protrusion 424. In addition to this effect, various effects described in FIGS. 11(A) to 11(C) are provided.

9. Fixing Portion for Fixing Circuit Package 400 to Housing 302

9.1 Structure of Fixing Portion 3712 or 3723 and Effects Based Thereon

The fixing portions 3721 and 3723 for fixing the circuit package 400 to the housing 302 will be described by using FIGS. 5(A) to 6(B) described above. The housing 302 holding the circuit package 400 has the flange 312 used to fix the thermal flow meter 300 to the main passage 124 and the bypass passage trench through which the measurement target gas 30 flowing through the main passage 124 is taken and flowed. The bypass passage trench is supported by the flange 312 through the upstream-side outer wall 335 and the downstream-side outer wall 336. It is noted that the upstream-side outer wall 335 is located on the upstream side in the flow of the measurement target gas 30 flowing through the main passage 124, and the downstream-side outer wall 336 is located on the downstream side. The fixing portion 3721 is provided to connect the upstream-side outer wall 335 and the downstream-side outer wall 336, and the fixing portion 3721 envelops the circuit package 400 across the entire circumference, whereby the circuit package 400 is fixed to the housing 302.

The outer wall hollow portion 366 provided in the upstream-side outer wall 335 is used as the fixing portion 3723, whereby the circuit package 400 can be further firmly fixed to the housing 302. The fixing portion 3721 described above envelops the circuit package 400 in a direction along the flow axis of the measurement target gas 30, that is, in a direction along the long axis of the measurement surface 430 in this embodiment so as to connect the upstream-side outer wall 335 and the downstream-side outer wall 336. Meanwhile, the outer wall hollow portion 366 of the upstream-side outer wall 335 envelops the circuit package 400 across the flow axis of the measurement target gas 30. Namely, the fixing portion 3723 is formed so that the direction of enveloping the circuit package 400 is different from that in the fixing portion 3721, and since these fixing portions envelop and fix the circuit package 400 in different directions, the circuit package 400 can be further firmly fixed to the housing 302.

The fixing portions 3721 and 3723 have the thick portion and the thin portion in order to reduce the stress applied to the circuit package 400. As illustrated in FIGS. 5(A) and 5(B), the fixing portion 3721 has the thick portion 4714 and the thin portion 4710. In the formation of the thin portion 4710, the hollow in the direction of the circuit package 400 is provided to reduce the thickness of the resin enveloping the circuit package 400, and, thus, to form the thin portion 4710. In addition to the thick portion 4714, the thin portion 4710 is formed. In this embodiment, although a thin portion having a different thickness is further formed on the flange side of the thin portion 4710. According to this constitution, while the fixing portion 3721 secures a predetermined size of area for enveloping the circuit package 400, the fixing portion 3721 has an effect of enabling to reduce the stress applied to the circuit package 400 with respect to the size of the area.

In FIG. 6(B) as a view of the rear surface of FIG. 5(B), the fixing portion 3721 has the thick portion 4714 and a thin portion formed by a hollow 373. As described above, when the thin portion is provided, the fixing portion 3721 has an effect of enabling to secure a predetermined size of area for enveloping the circuit package 400 and meanwhile reduce the stress applied to the circuit package 400 with respect to the size of the area. The reliability associated with the fixation of the circuit package 400 is improved by the structure in which the fixing portion 3721 is constituted of the thick portion and the thin portion. Namely, the airtightness between the circuit package 400 and the fixing portion 3721 is maintained.

In the resin molding process, although the stress accompanied with the volumetric shrinkage occurring when the fixing portion 3721 is cooled and solidified is applied from the fixing portion 3721 to the circuit package 400, the stress can be reduced by providing the thin portion. Further, when the thin portion is provided, movement of resin is suppressed in the resin molding process, and the resin temperature is gradually reduced, so that time required for solidifying the resin becomes longer. When the solidification of the resin is thus suppressed, the resin used to form the fixing portion 3721 becomes easier to flow to the unevennesses on the surface of the circuit package 400, and the adherence and the airtightness between the circuit package 400 and the fixing portion 3721 can be improved.

The measurement target gas 30 flows on the bypass passage side of the fixing portion 3721, and if the airtightness between the circuit package 400 and the fixing portion 3721 is broken, moisture and the like may enter inside the gap 382 inside the housing 302. By virtue of the provision of the thin portion, the contact area between the fixing portion 3721 and the resin of the circuit package 400 can be increased, and the airtightness is improved, so that intrusion of moisture and the like into the gap 382 inside the housing 302 is further reliably prevented. This contributes to improvement of the reliability of the thermal flow meter 300.

In FIGS. 5(B) and 6(B), the upstream-side outer wall 335 has the outer wall hollow portion 366. The outer wall hollow portion 366 acts as the fixing portion 3723 for fixing the circuit package 400 to the housing 302. The fixing portion 3723 has the thick portion 4715 and the thin portion 4716. As with the fixing portion 3721, the fixing portion 3723 can secure a large contact area with the circuit package 400. In addition, since the stress applied from the thin portion 4716 to the circuit package 400 is small, the influence of the stress applied from the fixing portion 3723 to the circuit package 400 can be reduced. Since the measurement target gas 30 flows on the upstream side of the fixing portion 3723, it is important to maintain the airtightness between the fixing portion 3723 and the circuit package 400, and securement of the airtightness between the fixing portion 3723 and the circuit package 400 is facilitated by combining the thin portion 4716 and the thick portion 4715.

9.2 Resin Injection Position for Formation of Housing 302

In FIGS. 5(B), 6(A), and 6(B), the resin injection position in the second resin molding process for the formation of the housing 302 is illustrated by a broken line arrow a, a broken line arrow b, a broken line arrow c, or a broken line arrow d. The resin may be injected from at least one of those resin injection positions, or the resins may be simultaneously injected from a plurality of the resin injection positions. The broken line arrow a represents the injection of resin to the portion of the flange 312, and since the resin volume in the portion of the flange 312 is large, the resin is injected to a portion having a large volume, and the resin is flowed from the upstream-side outer wall 335 and the downstream-side outer wall 336 toward the bypass passage, whereby the resin can be smoothly flowed in the die. The broken line arrow b represents the injection of the resin to the vicinity of the fixing portion 3721, and the broken line arrow c represents the injection of the resin to the thin portion of the fixing portion 3721. When the resin is injected from the vicinity of the fixing portion 3721, a high temperature resin can be flowed into the fixing portion 3721, and the surface of the circuit package 400 is covered by a high temperature resin having a low viscosity, whereby the resin in the low viscosity state easily enters deep in the unevennesses shape of the surface of the circuit package 400, so that the adherence between the circuit package 400 and the fixing portion 3721 can be improved.

As illustrated by the broken line arrow c, when the resin is injected to the thin portion of the fixing portion 3721, since the cross-sectional area in which the resin can be move is small in the thin portion, the flow of the injected resin can be suppressed. Namely, in the thin portion, the cross-sectional area in which the resin flows is small, and the high temperature resin can be retained for a long period of time. Thus, the resin used to form the fixing portion 3721 easily enters deep in the unevennesses on the surface of the circuit package 400, so that the adherence between the circuit package 400 and the fixing portion 3721 is improved.

The broken line arrow d represents the resin injection to the thin portion 4716 of the fixing portion 3723 for fixing the circuit package 400. As with the broken line arrow c, in the thin portion 4716, the cross-sectional area in which the resin flows is small, and when the resin is injected to the thin portion 4716, a high temperature resin can be retained on the surface of the circuit package 400 for a long period of time, so that the resin used to form the fixing portion 3721 easily enters deep in the unevennesses on the surface of the circuit package 400.

9.3 Structure of Another Embodiment and Effects Based Thereon

Figure 21:
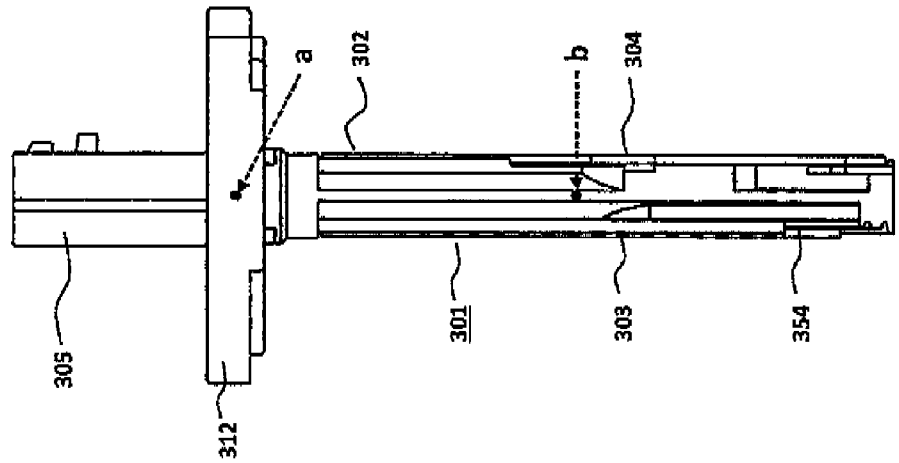
FIGS. 21(A) and 21(B) are views illustrating another embodiment of the housing illustrated in FIG. 5.
Figure 21:
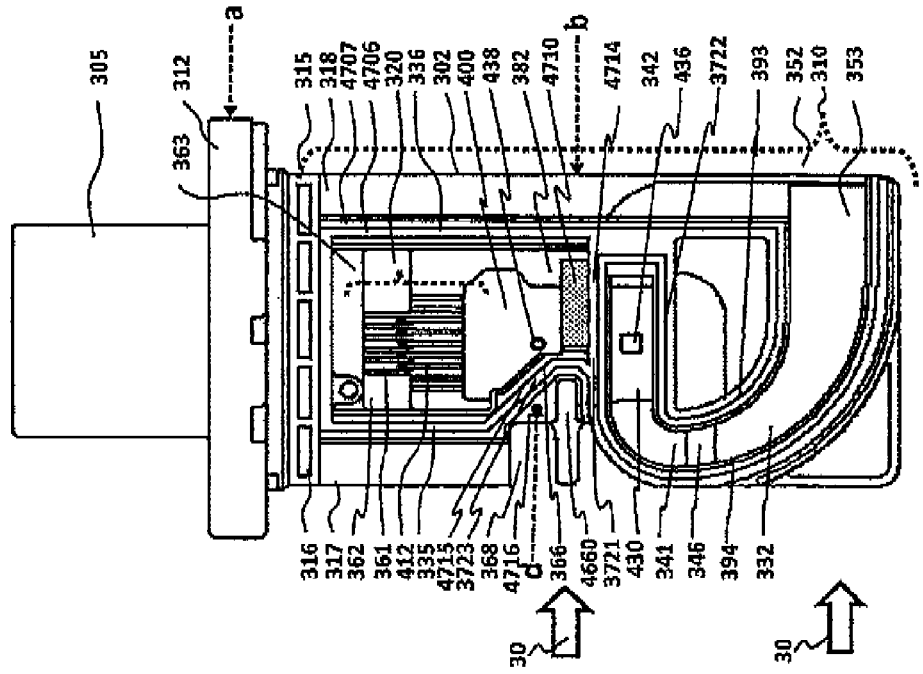

FIGS. 21(A), 21(B), 22(A), and 22(B) are views showing another embodiment of the fixing portion 3721 for fixing the circuit package 400 to the housing 302 described in FIGS. 5(A) to 6(B), and FIGS. 22(A) and 22(B) is a partially enlarged view of FIGS. 21(A) and 22(B). It is noted that another embodiment of the fixing portion 3721 is applicable to the fixing portion 3723 described in FIGS. 5(A) to 6(B). Here, there will be described below a case in which another embodiment is applied to the fixing portion 3721 as a representative of the fixing portions 3721 and 3723 illustrated in FIGS. 5(A) to 6(B).

In FIGS. 21(A) and 21(B), FIG. 21(A) is a plan view of the housing 302, and FIG. 21(B) is aright side view. FIG. 22(A) is a partially enlarged view of the periphery of the fixing portion 3721 illustrated in FIG. 21(A), and FIG. 22(B) is a B-B cross-sectional view of FIG. 22(A). However, FIGS. 21(A) and 22(A) show a state in which the front cover 303 and the rear cover 304 are detached so that the internal structure of the housing 302 can be understood. Meanwhile, in FIGS. 21(B) and 22(B), in order to help the understanding of the overall structure, a state in which the front cover 303 and the rear cover 304 are attached to both the front and rear sides of the housing 302 is shown. In FIGS. 21(A), 21(B), 22(A), and 22(B), reference numerals that are the same as those in other drawings show the same configuration, and they have the same functions. In order to avoid complexity, explanations for the reference numerals that are the same as those in other drawings are omitted to avoid the repetition of the explanation. Although cross sections of leads and circuit components illustrated in FIGS. 12 and 13 appear in the cross section of the circuit package 400 in practice, the detailed structure of the inside of the cross section of the circuit package 400 is omitted.

In FIGS. 21(A), 21(B), 22(A), and 22(B), the fixing portion 3721 is provided with the thick portion 4715 and the thin portion 4710. Although the thin portion 4710 is formed by a hollow in FIGS. 5(A) to 6(B), the thin portion is formed not to have the hollow but to have a shape having a thin flat surface. Those flat surfaces are provided to face the front and rear sides of the housing 302. The flat surface of the thin portion 4710 is illustrated in FIG. 22(A), and in order to distinguish from other portions, and, for ease of understanding, many black spots are illustrated on the flat surface of the thin portion 4710. The cross section of the flat surface is illustrated in FIG. 22(B).

In FIGS. 22(A) and 22(B), the circuit package 400 is fixed while being covered by the fixing portion 3721 having the thick portion 4715 and the thin portion 4710. In FIG. 22(B), a surface outside the thick portion 4715 of the fixing portion 3721, that is, a top portion has an adhesion surface 4706 to be adhered to the corresponding front cover 303 or the corresponding rear cover 304 and an adhesive groove 4707, and the adhesion surface 4706 is adhered to the internal surface of the corresponding front cover 303 or the corresponding rear cover 304, whereby airtightness is maintained. The adhesion is performed by making a temperature of an adhesion portion between the front cover 303 or the rear cover 304 and the housing 302 high in part through irradiation with laser light. Since not only the adhesion surface 4706 but also the adhesive groove 4707 are provided, it is possible to prevent dispersion of heat through the irradiation with laser light, and adhesion is facilitated. The upstream-side outer wall 335 and the downstream-side outer wall 336 are similarly provided with the adhesion surface 4706 and the adhesive groove 4707. By virtue of the provision of the adhesive groove 4707 in the adhesion portion with the front cover 303 or the rear cover 304, by similar reasoning, adhesion can be easily performed, and both the productivity and the reliability are improved. In FIG. 22(B), in order to avoid complexity, specific description in the cross section of the circuit package 400 is omitted.

In FIGS. 21(A), 21(B), 22(A), and 22(B), the resin injection position in the second resin molding process for the formation of the housing 302 is shown by a broken line arrow a, a broken line arrow b, a broken line arrow c, or a broken line arrow d. The resin may be injected from at least one of those resin injection positions, or the resins may be simultaneously injected from a plurality of the resin injection positions. The broken line arrow a represents the injection of resin to the portion of the flange 312, and since the resin volume in the portion of the flange 312 is large, the resin is injected to a portion having a large volume, and the resin is flowed from the upstream-side outer wall 335 and the downstream-side outer wall 336 toward the bypass passage, whereby the resin can be smoothly flowed in the die.

9.4 Injection of Resin for Molding in Another Embodiment

In FIGS. 21(A), 21(B), 22(A), and 22(B), the broken line arrow b shows the injection of the resin to the vicinity of the fixing portion 3721, and the broken line arrow c shows the injection of the resin to the thin portion of the fixing portion 3721. When the resin is injected from the vicinity of the fixing portion 3721, a high temperature resin can be flowed into the fixing portion 3721, and the surface of the circuit package 400 is covered by a high temperature resin having a low viscosity, whereby the resin in the low viscosity state easily enters deep in the unevennesses shape of the surface of the circuit package 400, so that the adherence between the circuit package 400 and the fixing portion 3721 can be improved.

As illustrated by the broken line arrow c, when the resin is injected to the thin portion of the fixing portion 3721, since the cross-sectional area in which the resin can move is small in the thin portion, the flow of the injected resin can be suppressed. Namely, in the thin portion, the cross-sectional area in which the resin flows is small, and the high temperature resin can be retained for a long period of time. Thus, the resin used to form the fixing portion 3721 easily enters deep in the unevennesses on the surface of the circuit package 400, so that the adherence between the surface of the circuit package 400 and the fixing portion 3721 is improved. The broken line arrow d represents the resin injection to the thin portion 4716 of the fixing portion 3723 for fixing the circuit package 400. As with the broken line arrow c, in the thin portion 4716, the cross-sectional area in which the resin flows is small, and when the resin is injected to the thin portion 4716, a high temperature resin can be retained on the surface of the circuit package 400 for a long period of time, and the resin used to form the fixing portion 3721 easily enters deep in the unevennesses on the surface of the circuit package 400.

9.5 Still Another Embodiment

Figure 23:
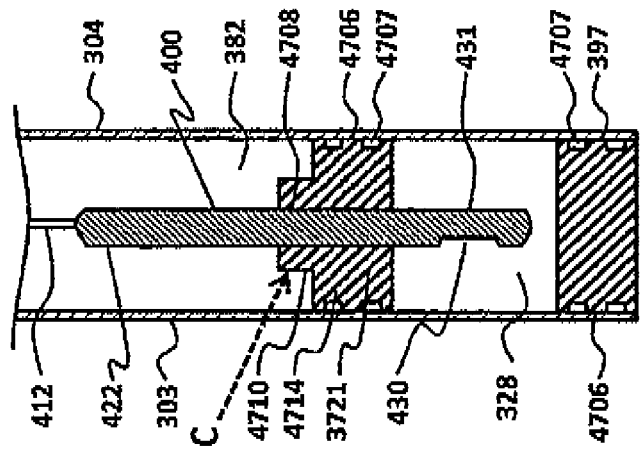
FIGS. 23(A) and 23(B) are partially enlarged views illustrating a still another embodiment.
Figure 23:
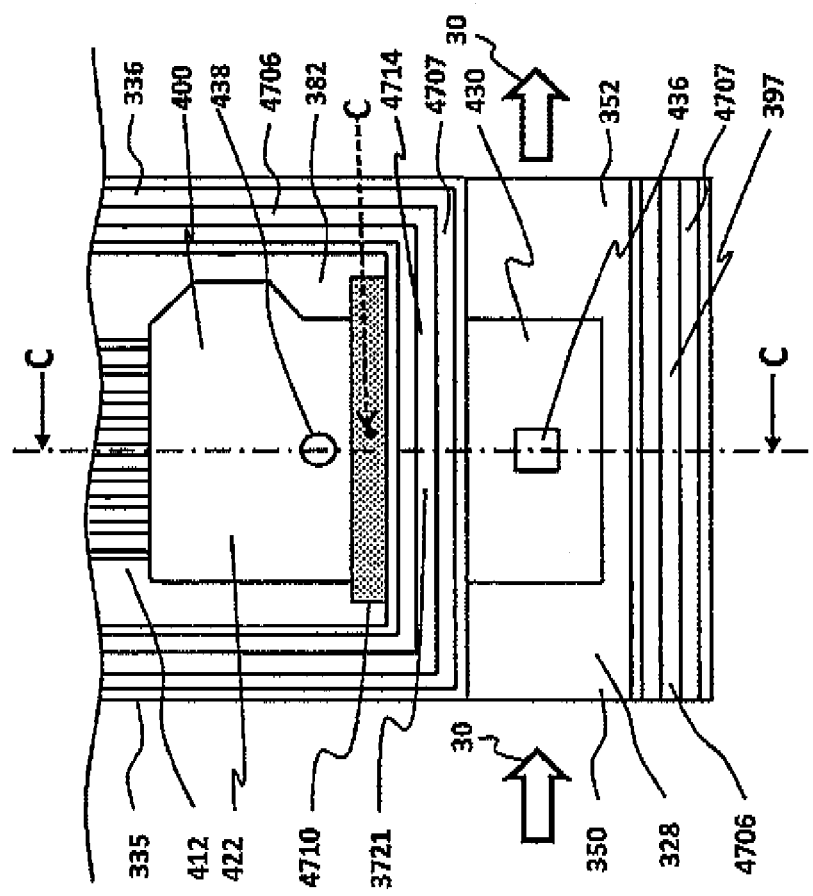

FIGS. 23(A) and 23(B) are views illustrating a still another embodiment and shows the structure of the fixing portion 3721 for fixing the circuit package 400 when the protrusion 424 provide with the temperature detecting portion 452 which detects the temperature of the measurement target gas 30 is not provided, that is, when the circuit package 400 is constituted of only the circuit package body 422. FIG. 23(A) is a plan view, and FIG. 23(B) is a C-C cross-sectional view of FIG. 23(A). It is noted that although the cross sections of the structures illustrated in FIGS. 12 and 13 appear in the cross section of the circuit package 400 in practice, the detail of the cross section of the circuit package 400 is omitted in FIG. 23(B). FIG. 23(A) shows an outer wall 1400 enveloping a part of the circuit package 400. The structure of the fixing portion 3721 shown in the embodiment of FIGS. 23(A) and 23(B) can be combined with bypass passages having various shapes. The bypass passages may be formed by the bypass passage trench described in FIGS. 5(A) to 6(B) or may have another structure. FIGS. 23(A) and 23(B) show as an example a bypass passage trench 328 having an inlet port 350 and an outlet port 352 provided on the left and right sides, and the bypass passage is formed by providing the front cover 303 and the rear cover 304 in the bypass passage trench 328. FIG. 23(B) shows a first distance $D_1$ and a second distance $D_2$ to the processing unit 604.

As in the already described embodiments, the fixing portion 3721 for fixing the circuit package 400 provided in the housing 302 is constituted of the thick portion 4714 and the thin portion 4710, and in the thin portion 4710, the thickness of the resin covering the circuit package 400 is smaller than that in the thick portion 4714. By virtue of the provision of the thin portion 4710, as described above, the stress generated due to the volumetric shrinkage due to temperature reduction occurring when the resin of the fixing portion 3721 is solidified in the second resin molding process and applied to the circuit package 400 can be reduced. On the other hand, there is an effect that the airtightness between the bypass passage trench 328 and the gap 382 is easily maintained. Namely, since the fixing portion 3721 can suppress the stress applied to the circuit package 400, the area covered by the fixing portion 3721 can be increased, and an adhesion surface 4708 provided between the bypass passage trench 328 and the gap 382 and between the surface of the circuit package 400 and the fixing portion 3721 can be enlarged. The width of the fixing portion 3721 formed between the upstream-side outer wall 335 and the downstream-side outer wall 336 along the bypass passage trench 328 can be increased, and the airtightness between the surface of the circuit package 400 and the fixing portion 3721 can be improved.

As illustrated in FIG. 23(B), in the thick portion 4714 of the fixing portion 3721, a surface outside thereof, that is, a top portion is adhered to the front cover 303 or the rear cover 304, and the airtightness is maintained. Also in a passage wall 397 forming the bypass passage trench 328, a top portion which is a surface outside thereof is adhered to the front cover 303 of the rear cover 304, and the airtightness is maintained. The portion to be adhered to the front cover 303 of the rear cover 304 is provided with the adhesion surface 4706 and the adhesive groove 4707 and has a structure facilitating the adhesion using laser machining.

Thermoplastic resin is injected to the fixing portion 3721 described in FIGS. 23(A) and 23(B) in the second resin molding process. When the high temperature resin is injected to the surface of the circuit package 400, the thermoplastic resin can enter deep in the unevennesses on the surface of the circuit package 400, and the adherence between the surface of the circuit package 400 and the fixing portion 3721 is improved. In addition, the airtightness between the bypass passage trench 328 and the gap 382 is easily maintained. As illustrated by the broken line arrow c in the thin portion 4710 of the fixing portion 3721, when the thermoplastic resin is injected, the cross-sectional area in which the resin moves is small in the thin portion 4710, and therefore, flowing out of the thermoplastic resin from the thin portion 4710 to other portions is suppressed, so that the high temperature resin injected to the surface of the circuit package 400 is retained in the thin portion 4710 for a long period of time. For this reason, the thermoplastic resin easily enters deep in the unevennesses on the surface of the circuit package 400, so that the adherence between the surface of the circuit package 400 and the fixing portion 3721 is improved.

9.6 Another Embodiment

Figure 24:
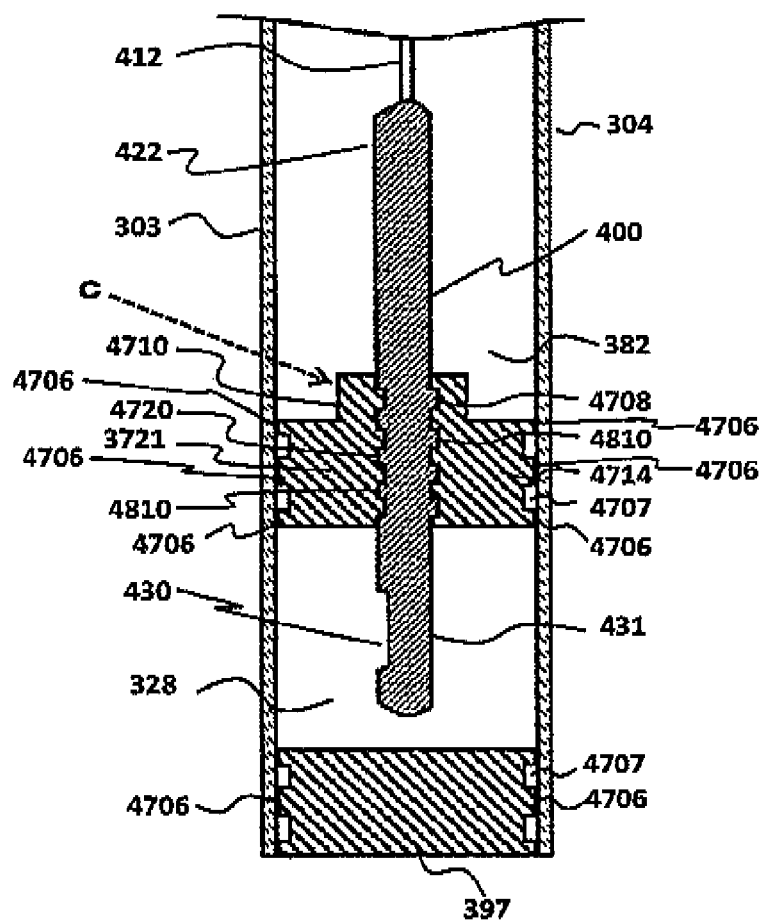
FIG. 24 is a partially cross-sectional view illustrating a part of another embodiment of a fixing portion of the housing.

FIG. 24 is a view illustrating another embodiment of the fixing portion 3721. In this embodiment, reference numerals the same as those of FIGS. 22(A) to 23(B) represent the same components, and this embodiment has similar functions and effects to those of the embodiment of FIGS. 22(A) to 23(B). This embodiment is different from the embodiment of FIGS. 22(A) to 23(B) in that in order to improve the adherence between a surface of the circuit package 400 and the fixing portion 3721, unevennesses 4810 are provided on a resin surface of the circuit package 400, for example, whereby the resin surface of the circuit package 400 is roughen. Although the roughening method is as described above, examples of the roughening method include a satin-finish treatment in which sand or the like is sprayed, formation of a groove or unevennesses using laser machining, a method of providing unevennesses in a die in a first resin molding process and performing molding, and a method of applying a sheet having unevennesses to the inside of the die.

When the surface of the circuit package 400 is roughen as described above, a resin in a second resin molding process enters inside the unevennesses on the surface of the circuit package 400, and an adhesion surface of the fixing portion 3721 and the circuit package 400 has an unevenness shape 4720, and the adherence is improved. Since the surface of the circuit package 400 is roughened, it is possible to prevent the circuit package 400 from coming off from the fixing portion 3721. While the resin of the fixing portion 3721 is a thermoplastic resin, the circuit package 400 is formed of a thermosetting resin, so that the adherence between those resins is not good. Therefore, it is preferable that the adherence surface is roughened to form the unevenness shape on the surface of the circuit package 400 so that the thermoplastic resin of the fixing portion 3721 enters inside the unevenness shape of the surface of the circuit package 400. As described above, the adherence can be improved by roughening the surface of the circuit package 400, and the measures to improve the adherence can be applied to the above and below embodiments.

In FIG. 24, when the molding resin is injected to the fixing portion 3721 as shown by the broken line arrow c, a high temperature thermoplastic resin can be injected to the roughen surface of the circuit package 400. As described above, the thermoplastic resin can enter deep in the unevennesses 4810 of the roughen surface of the circuit package 400. Particularly when the resin is injected to the thin portion 4710 shown by the broken line arrow c, a high temperature thermoplastic resin can be retained on the roughen surface of the circuit package 400 for a long period of time, the thermoplastic resin on the roughen surface of the circuit package 400 is gradually cooled, and namely, the cooling speed can be slowed. According to this constitution, the thermoplastic resin used to form the fixing portion 3721 can enter deep in the unevennesses 4810 of the roughened surface of the circuit package 400. Consequently, the adherence between the fixing portion 3721 and the surface of the circuit package 400 can be improved, and the airtightness can be improved. In addition, it is possible to prevent the circuit package 400 from coming off from the fixing portion 3721.

9.7 Still Another Embodiment

Figure 25:
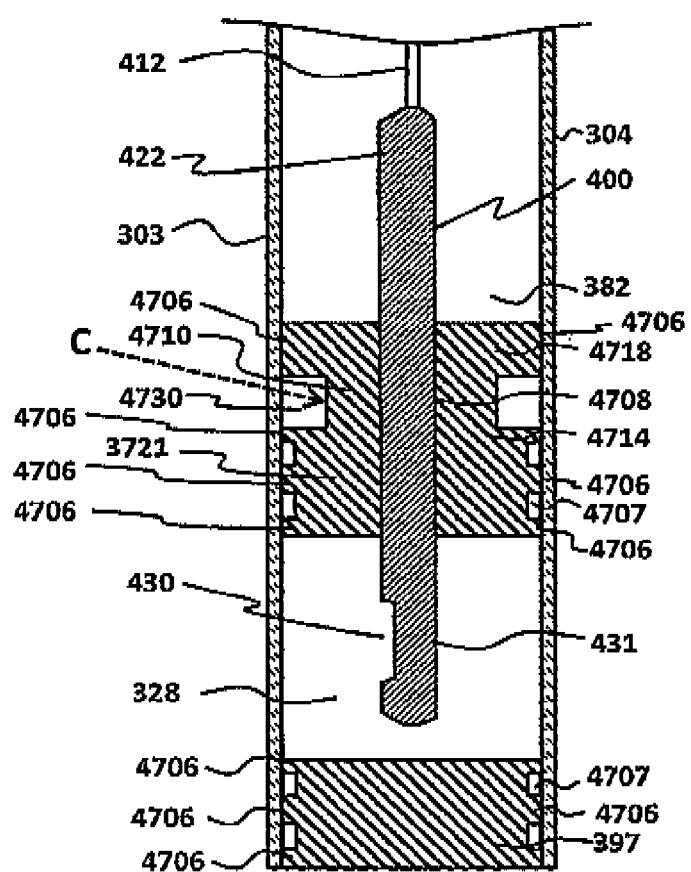
FIG. 25 is a partially cross-sectional view illustrating a part of a still another embodiment of the fixing portion of the housing.
Figure 26:
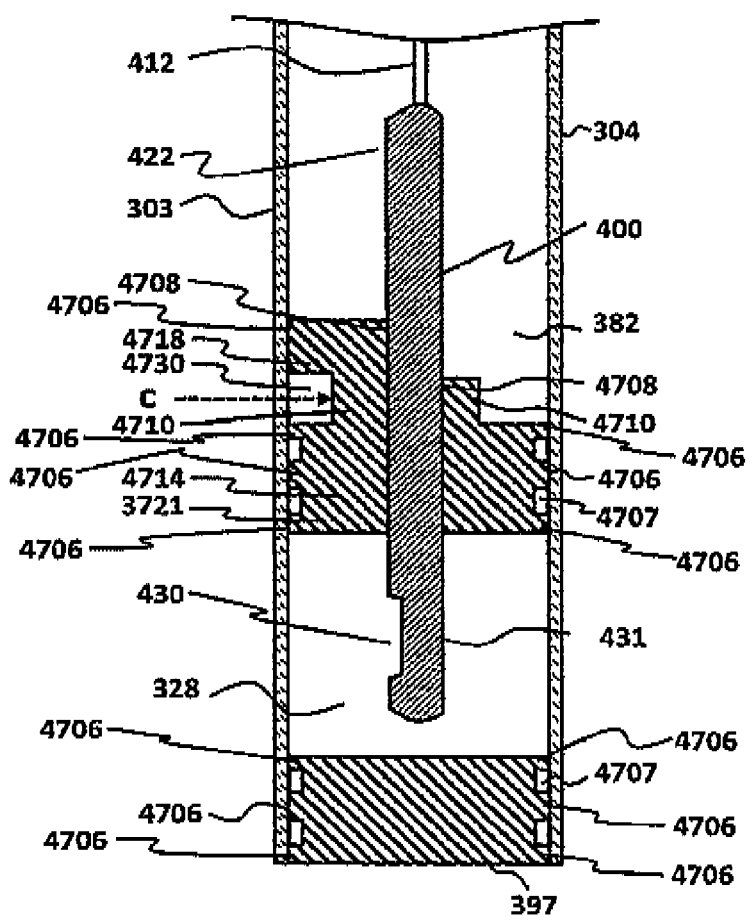
FIG. 26 is a partially cross-sectional view illustrating a part of a still another embodiment of the fixing portion of the housing.

FIGS. 25 and 26 are views illustrating a still another embodiment, and a second thick portion 4718 is provided on the side closer to the gap 382 relative to the thin portion 4710 illustrated in FIGS. 22(A) to 23(B). In the cross-sectional view of a circuit package 400, specific description of a cross-sectional structure of the circuit package 400 is omitted. In FIG. 25, a fixing portion 3721 is provided between a bypass passage trench 328 and the gap 382, and the fixing portion 3721 has a thick portion 4714 and a thin portion 4710 and is provided with the second thick portion 4718 on the gap 382 side of the thin portion 4710. The fixing portion 3721 enveloping the circuit package 400 has the thick portions 4714 and 4718 on both sides so that the thin portion 4710 lies between those. The thick portions 4714 and 4718 each have a structure in which the outside is adhered to the rear cover 304 and the front cover 303. Accordingly, the circuit package 400 has a structure in which the circuit package 400 is adhered firmly to the rear cover 304 and the front cover 303 through the thick portions 4714 and 4718 on the both sides through the thin portion 4710, and the mechanical strength is improved by mutual cooperation. The mechanical strength is improved against twist and so on.

As illustrated in FIGS. 21(A), 21(B), 23(A), and 23(B), the fixing portion 3721 acts to connect the downstream-side outer wall 336 and the upstream-side outer wall 335. The downstream-side outer wall 336 and the upstream-side outer wall 335 are connected by the fixing portion 3721 having a structure having the thick portions 4714 and 4718 on the both sides through the thin portion 4710, whereby not only the fixing strength of the circuit package 400 but also the strength of the housing 302 having the downstream-side outer wall 336 and the upstream-side outer wall 335 can be improved. The flow rate measurement characteristics are determined by a relationship between the state of the measurement target gas 30 flowing in the bypass passage trench 328 and the measurement surface 430 of the circuit package 400. When the fixing portion 3721 of the housing 302 and the circuit package 400 are firmly fixed, the state of the bypass passage trench 328 and the state of the measurement surface 430 of the circuit package 400 are stabilized, and stable measurement characteristics can be maintained.

The fixing portion 3721, the downstream-side outer wall 336 and the upstream-side outer wall 335 of the housing 302, the rear cover 304, and the front cover 303 are cooperated with each other, so that the mechanical strength is strengthened, and twist and warpage are suppressed. Consequently, the stable state between the state of the bypass passage trench 328 and the state of the measurement surface 430 of the circuit package 400 is easily maintained to reduce the influences of temporal change and so on. It is noted that in FIG. 25, the adhesion surface 4706 of the fixing portion 3721 and the adhesion surface 4706 of the passage wall 397 are adhered firmly to the inside of the rear cover 304 and the inside of the front cover 303.

The broken line arrow c represents the resin injection position in the second resin molding process. A resin is injected to the thin portion 4710 to move the resin injected from the thin portion 4710 to the thick portion 4714 and the second thick portion 4718, and, thus, to easily retain the high temperature resin on the surface of the circuit package 400.

As described above, the adherence between the surface of the circuit package 400 and the fixing portion 3721 can be improved.

In FIG. 25, although the shape of the fixing portion 3721 is substantially the same on the front and rear sides of the circuit package 400, the shape may be different on the front and rear sides of the circuit package 400. FIG. 26 is a view illustrating still another embodiment, and the second thick portion 4718 is not provided on the rear side of the circuit package 400. The second thick portion 4718 is provided on the broken line arrow c side that is the resin injection position and not provided on the rear side thereof. The resin injected to a thin portion 4710 in FIG. 26 moves inside a die through a thick portions 4714 and the second thick portion 4718, to move to other portions of the housing 302, and, thus, to form them. However, it is preferable that a force generated based on a temperature change due to a difference of the thermal expansion coefficient between a thermoplastic resin used to form the circuit package 400 and a thermoplastic resin used to form the housing 302 is balanced on the front and rear sides of the circuit package 400, and the shapes on the front and rear sides of the circuit package 400 should not be significantly different from each other. In FIG. 26, the thick portion 4714 and the thin portion 4710 are significantly the same, and only the second thick portion 4718 is different. As described above, it is preferable that the area occupied by the shapes conforming to each other on the front and rear sides of the circuit package 400 is larger.

10. Adhesion Structure Between Housing 302 and Front Cover 303 or Rear Cover 304

Figure 27:
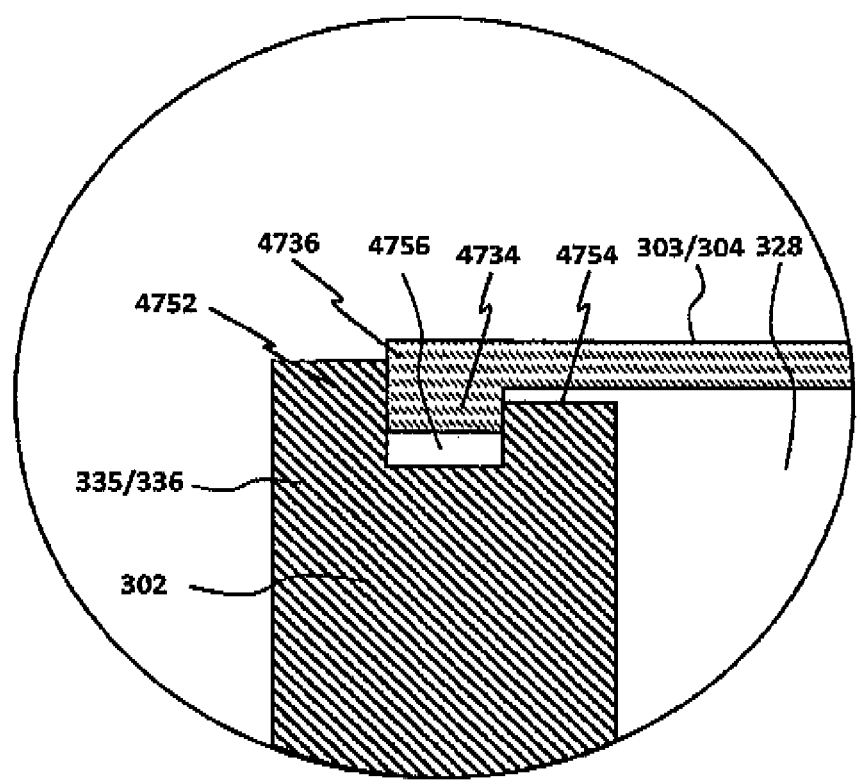
FIG. 27 is a partially cross-sectional view for explaining a shape of a connecting portion between a hollow provided in an outer wall of the housing and a cover.

FIG. 27 shows an adhesion structure between the housing 302 constituting the thermal flow meter 300 and the front cover 303 or the rear cover 304. As illustrated in FIGS. 2(A) to 3(B), the periphery of the housing 302 and the front cover 303 or the rear cover 304 are adhered firmly to each other, and the gap 382 illustrated in FIGS. 5(A) to 6(B) is formed therein. Similarly, an inside wall of bypass passage on frontside 393 and an outside wall of bypass passage on frontside 394 or an inside wall of bypass passage on backside 391 and an outside wall of bypass passage on backside 392 forming the bypass passage trench on frontside 332 or the bypass passage trench on backside 334 of the housing 302 and the front cover 303 or the rear cover 304 are adhered firmly to each other, and the bypass passage is formed.

In the upstream-side outer wall 335 or the downstream-side outer wall 336 provided around the housing 302, the leading end portion in the height direction has a shape illustrated in FIG. 27. Namely, the upstream-side outer wall 335 or the downstream-side outer wall 336 has a first convex portion 4752 and a second convex portion 4754, and a groove 4756 is provided between the first convex portion 4752 and the second convex portion 4754. The height of the second convex portion 4754 located on the inner peripheral side is larger than the height of the first convex portion 4752 located on the outer peripheral side. In FIGS. 8(A) to 9(C), although a protrusion 4734 of a cover outer end 4736 of the front cover 303 or the rear cover 304 is omitted, the protrusion 4734 is provided in practice.

The protrusion 4734 provided in the cover outer end 4736 of each cover has a shape fitted into the groove 4756. When the protrusion 4734 is completely inserted into the groove 4756, the second convex portion 4754 is formed to have a height smaller than that of the first convex portion 4752, and therefore, the height of an outer surface of the front cover 303 is smaller than the height of the leading end surface of the first convex portion 4752. Namely, the height of the second convex portion 4754 is smaller by not less than the thickness of the front cover 303 or the rear cover 304 than the height of the first convex portion 4752.

The front cover 303 or the rear cover 304 and the first convex portion 4752 are welded in such a state that the protrusion 4734 is completely inserted in the groove 4756. Since the leading end of the first convex portion 4752 protrudes outside more than the outer surface of the front cover 303 or the rear cover 304, even if an end of the thermal flow meter 300 is in contact with something during the operation of mounting the thermal flow meter 300, there is no possibility that the front cover 303 or the rear cover 304 is peeled. Accordingly, the reliability is improved.

INDUSTRIAL AVAILABILITY

The present invention is applicable to a measurement apparatus for measuring a gas flow rate as described above.

REFERENCE SIGNS LIST 300 thermal flow meter
302 housing
303 front cover
304 rear cover
305 external connector
306 external terminal
307 calibration terminal
310 measuring portion
320 terminal connector
332 bypass passage trench on frontside
334 bypass passage trench on backside
356, 358 protrusion
359 resin portion
361 inner socket of external terminal
365 link portion
400 circuit package
412 connection terminal
414 terminal
422 package body
424 protrusion
430 measurement surface
432, 434 fixation surface
436 heat transfer surface exposing portion
438 opening
452 temperature detecting portion
590 pressed fitting hole
594, 596 slope portion
601 flow rate detection circuit
602 air flow sensing portion
604 processing unit
608 heat generator
640 heating control bridge
650 bridge circuit of air flow sensing
672 diaphragm
3721,3723 fixing portion
4710, 4716 thin portion

The invention claimed is:
1. A flow meter comprising:
a processing unit configured to processing a signal of a flow sensing element;
a circuit package molding the processing unit with a first resin,
wherein a part of the circuit package is molded with a second resin, a thermal expansion coefficient of the second resin is larger than that of the first resin, wherein the second resin comprising a thick portion and a thin portion that is thinner than the thick portion, the thin portion is formed closer to the processing unit than the thick portion.

2. The flow meter according to claim 1, wherein an area of a surface of the circuit package where the thin portion covers the circuit package is larger than that of the circuit package where the thick portion covers the circuit package.

3. The flow meter according to claim 1, further comprising:

A bypass passage in which the flow sensing element is disposed, and wherein the thick portion and the thin portion fix the flow sensing element in the bypass passage.

4. The flow meter according to claim 1, wherein the first resin is thermosetting and the second resin is thermoplastic.

5. The method for forming the flow meter according to claim 1, comprising:

a first molding process in which the circuit package is formed by molding with the first resin, a second molding process in which the part of the circuit package is molded with the second resin, after the first molding process.

\* \* \* \* \*